(12) United States Patent
Lu

(10) Patent No.: US 7,613,177 B1
(45) Date of Patent: Nov. 3, 2009

(54) METHOD OF ADDING STAGES TO A SCALABLE SWITCHING NETWORK

(76) Inventor: Haw-minn Lu, 10733 Calston Way, San Diego, CA (US) 92126

( * ) Notice: Subject to any disclaimer, the term of this patent is extended or adjusted under 35 U.S.C. 154(b) by 748 days.

(21) Appl. No.: 11/141,789

(22) Filed: May 31, 2005

(51) Int. Cl.
*H04L 12/50* (2006.01)
*H04Q 11/00* (2006.01)

(52) U.S. Cl. .................. 370/360; 370/387; 370/388
(58) Field of Classification Search .......... 370/229, 370/235–237, 351, 357, 389, 400, 427, 255, 370/360, 386–388
See application file for complete search history.

(56) References Cited

U.S. PATENT DOCUMENTS

| | | | | |
|---|---|---|---|---|
| 5,648,963 | A * | 7/1997 | Miyake et al. | 370/218 |
| 5,841,775 | A * | 11/1998 | Huang | 370/422 |
| 6,049,542 | A * | 4/2000 | Prasad | 370/386 |
| 6,784,802 | B1 | 8/2004 | Stanescu | |
| 6,901,071 | B2 | 5/2005 | Lu | |
| 7,075,942 | B2 | 7/2006 | Lu | |
| 7,123,612 | B2 | 10/2006 | Lu | |
| 7,440,448 | B1 | 10/2008 | Lu | |
| 2002/0004390 | A1 | 1/2002 | Cutaia et al. | |
| 2003/0002437 | A1 * | 1/2003 | Lu | 370/228 |
| 2003/0152071 | A1 | 8/2003 | Lu | |
| 2003/0163754 | A1 | 8/2003 | Lu | |

OTHER PUBLICATIONS

Cizek, et al. "Tradeoff Between Cost and Reliability in Packet Switching MultiStage Interconnection Networks," Africon '92 Proceedings., 3rd Africon Conference, Sep. 22-24, 1992, pp. 365 -368, IEEE, South Africa (Reprinted US).
Agrawal, "Testing and Fault-Tolerance of Multistage Interconnection Networks," Computer, Apr. 1982, pp. 41-53, vol. 15, No. 4, IEEE, US.
Bhuyan, et al., "Design and Performance of Generalized Interconnection Networks." IEEE Transactions on Computers, Dec. 1983, pp. 1081-1090, vol. 32, No. 12, IEEE, US.
Blake, et al., "Multistage Interconnection Network Reliability," IEEE Transactions on Computers, Nov. 1989, pp. 1600-1603, vol. 38, No. 11, IEEE, US.

(Continued)

*Primary Examiner*—Seema S Rao
*Assistant Examiner*—Wanda Z Russell

(57) ABSTRACT

Extra stages can be added to a switching network to provide pathwise redundancy for fault tolerance and to alleviate traffic blocking. Also, the addition of extra stages can alleviate the loss of pathwise redundancy when the width of switching networks is increased. An in-service method of upgrading a switching network by adding stages allows the addition of redundancy to an existing network without the need to take the network out of service. From an operational point of view, it is often desirable for the upgrade process to be performed by a plurality of sequential steps. However, it is also desirable to minimize the number of steps performed. Because the insertion of extra stages into an existing network calls. for the rewiring of interconnection networks above and below the insertion point, the number of steps can be minimized while also minimizing the impact to network traffic by concurrently rewiring those interconnection networks through a plurality of disconnection and connection steps.

19 Claims, 51 Drawing Sheets

OTHER PUBLICATIONS

Chin, et al. "Packet Switching Networks for Multiprocessors and Data Flow Computers," IEEE Transactions on Computers, Nov. 1984, pp. 991-1003, vol. 33, No. 11, IEEE, US.

Kumar, et al.,"Failure Dependent Performance Analysis of a Fault-Tolerant Multistage Interconnection Network," IEEE Transactions on Computers, Dec. 1989, pp. 1703-1713, vol. 38, No. 12, IEEE, US.

Tzeng, et al.,"Realizing Fault-Tolerant Interconnection Network via Chaining," IEEE Transactions on Computers, Apr. 1988, pp. 458-462, vol. 37. No. 4, IEEE, US.

Varma, et al., "Fault-Tolerant Routing in Multistage Interconnection Networks," IEEE Transactions on Computers, Mar. 1989, pp. 385-393, vol. 38, No. 3, IEEE, US.

Patel, et al., "Performance of processor-memory interconnections for multiprocessors", IEEE Transactions on Computers, Oct. 1981, pp. 771-780, vol. 30, No. 10, IEEE, US.

Goke, et al., "Banyan Network for partitioning multiprocessor systems," First Annual International Symposium on Computer Architecture, Dec. 1973, pp. 21-28, ACM Press, US.

Kumar, et al., "Augmented shuffle-exchange multistage interconnection networks". Computer, Jun. 1987, pp. 30-40, vol. 20, No. 6, IEEE, US.

Adams, et al., "The Extra Stage Cube: A Fault-Tolerant Interconnection Network for Supersystems," IEEE Transactions on Computers, May 1982, pp. 443-454, vol. 31, No. 5, IEEE, US.

Benes, Permutation Groups, Complexes, and Rearrangeble Connecting Networks, Bell System Telephone Journal, Jul. 1964, pp. 1619-1640, vol. 44, AT&T, US.

Hamid, et al., "A new fast control mechanism for Benes rearrangable interconnection network useful for supersystems,". Transactions of the Institute of Electronics, Information and Communication Engineers, Oct. 1987, p. 997-1008, vol. E70, No.10, IEICE, Japan.

Dudgeon, et al., "Multidimensional Signal Processing, 1984, pp. 60-111, Prentice Hall, Englewood Cliffs, New Jersey."

Oppenhiem, et al., "Digital Signal Processing," 1975, pp. 284-328, Prentice Hall, Englewood Cliffs, New Jersey.

* cited by examiner

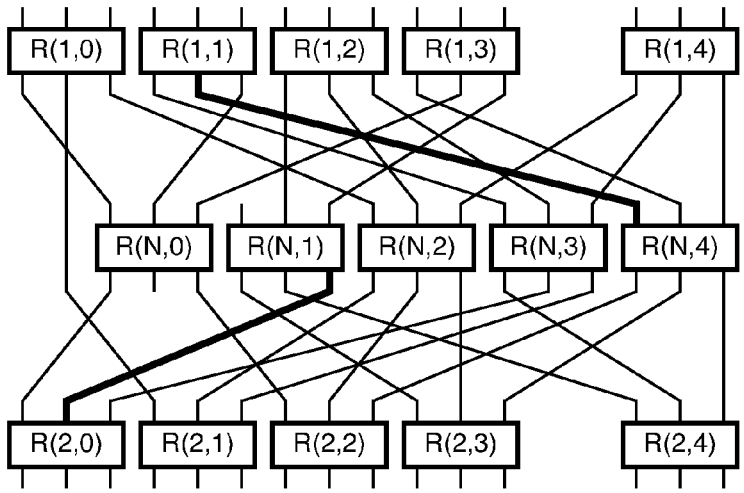
FIG. 12K
FIG. 12L
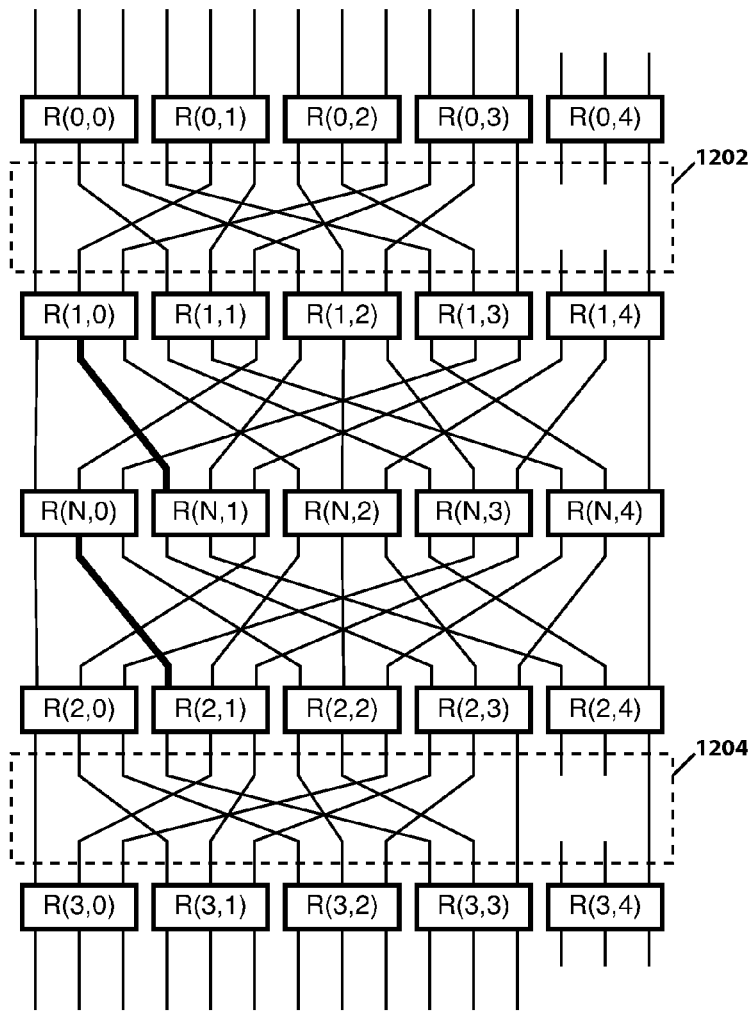

METHOD OF ADDING STAGES TO A SCALABLE SWITCHING NETWORK

BACKGROUND OF THE INVENTION

1. Field of the Inventions

This invention relates to scalable multistage switching networks, specifically to the in-service method of adding one or more stages to a scalable multistage switching network.

2. Background Information

The addition of an extra stage to the design of a multistage interconnection network has numerous benefits to a switching network. The extra stage can be used to add fault tolerance. For example, FIG. 1 depicts an extra stage cube network which comprises extra stage 102 and hypercube network 104. If a failure occurs in a connection within the hypercube network, the extra stage can be used to route traffic around the fault. Traditionally, in an extra stage cube network the extra stage is activated only upon the detection of a fault.

Huang showed in U.S. Pat. No. 5,841,775, issued on Nov. 24, 1998 entitled "Scalable Switching Network" which is hereby incorporated by reference as if set forth in full, that in a redundant blocking compensated cyclic group (RBCCG) network extra rows can be added to the network to give fault tolerance and blocking tolerance to a switching network, by introducing additional paths within the network. Unlike the extra stage cube network, the extra rows in the RBCCG network are active at all times. With a proper routing algorithm, the network can automatically detect and reroute around any faults introduced by either a broken connection or a broken switching element.

In networks such as the RBCCG network as well as others, the degree of fault tolerance and blocking tolerance is often related to the number of extra stages within the network. As a result, there is a need to upgrade a network by adding stages. There are several approaches to upgrades.

In a "system down" upgrade where the network is shutdown, all connections between switching elements that need to be made in accordance to the desired post-upgrade topology can be made in any order at any time. For example, all connections can be disconnected and then new connections can be made in accordance with the desired post-upgrade topology. The network can then be restarted once the new post-upgrade topology is implemented. The draw back to this method is that the network is unusable during the upgrade process.

Prasad in U.S. Pat. No. 6,049,542, issued on Apr. 11, 2000 entitled "Scalable Multistage Interconnection Network Architecture and Method for Performing In-service Upgrade Thereof," teaches an upgrade where a core section of switching elements can be "hot-swapped" out for an upgrade core section. By the use of a hot-swap, the network is in service during the upgrade. The draw back to this method is that multiplexers for use in the hot-swap must be in place. Additionally, a core section of switching elements must be taken out of service, so as more stages are desired, more hardware must be removed. For example, initially there might be one stage, which is then swapped for three stages, so initially one stage is removed. Then the three core stages might later be upgraded to five stages, leaving the three old stages removed. Even with reuse of hardware, this method is not economical as more and more stages are involved. Furthermore, this method is not readily compatible with other modes of upgrade such as a width upgrade or a fanout upgrade, which are available for some forms of switching networks such as described by Lu in U.S. patent application Ser. No. 10/074,174 filed on Feb. 10, 2002 entitled "Width Upgrade for a Scalable Switching Network", which is hereby incorporated by reference as if set forth in full (henceforth referred to as the '174 application), and U.S. patent application Ser. No. 10/075,086 filed on Feb. 10, 2002 entitled "Fanout Upgrade for a Scalable Switching Network", which is hereby incorporated by reference as if set forth in full, Lu in U.S. patent application Ser. No. 09/897,263, filed on Jul. 2, 2001 entitled "Row Upgrade for a Scalable Switching Network" which is hereby incorporated by reference as if set forth in full, henceforth referred to as the '263 application, teaches an upgrade through the addition of extra stages in the middle of a redundant multistage interconnection network. As an example, FIG. 2A depicts a 24-port RBCCG switching network. In accordance with the '263 application, an insertion point between stage 202 and 204 is selected. Conceptually, as shown in FIG. 2B, new stage 206 and interconnection network 210a can be inserted between stage 202 and interconnection network 210. Although in reality, connections within interconnection network 210 have been disconnected and reformed as interconnection network 210b. Equivalently, new stage 206 could have been inserted between interconnection network 210 and stage 204, resulting in interconnection network 210a as the reformed instance of interconnection network 210 and interconnection network 210b as the newly introduced interconnection network.

Lu and Huang in U.S. patent application Ser. No. 10/786,874, filed on Feb. 24, 2004 entitled "Systems and Methods for Upgradeable Scalable Switching" which is hereby incorporated by, references as if set forth in full, henceforth referred to as the '874 application, extend the upgrade method to apply other types of network which are not technically redundant multistage network such as the network shown in FIG. 3 which is the result of the orthogonal overlay of two RBCCG networks, also referred to as a double RBCCG overlaid network. The method also is applicable to less traditional multistage networks such as the augmented shuttle exchange network shown in FIG. 4A, which is really a banyan network with additional connections between switching elements within each stage.

The upgrade methods described in the '263 application and the '874 application show a two phase process. The first phase inserts the new stage that preserves one adjacent interconnection network topology and produces a second interconnection network with parallel connections. Referring to FIG. 4B, new stage 406 is inserted between stages 402 and 404. In this example, interconnection network 410's topology is preserved and interconnection network 412 is introduced which has a set of parallel connections. After new stage 406 is properly inserted, in the second phase, interconnection network 412 is then rewired into the desired post-upgrade topology resulting in interconnection network 414, as shown in FIG. 4C. Though the new stage is now properly integrated into the new network completing the "row upgrade", the new network is not complete. Finally, as shown in FIG. 4D, new intra-stage interconnections 416 are added to form an extended form of an augmented shuffle exchange network. Though in this example, intra-stage interconnections 416 are added after the insertion of the new stage, they can be added at any time since they are independent to the "row upgrade". In fact, since they addition of these interconnections does not cause the breaking of any other connections, it is desirable to add them as soon as feasible as they can be used to bolster the fault tolerance of the network during the upgrade process.

The advantage of this upgrade method is that each connection that is broken and each connection that is made can be performed in a sequential manner. The fault tolerance of the network accommodates the broken connections, which occur during the upgrade process. While steps can still occur simultaneously, there is not overriding necessity of a simultaneous switch over as described by Prasad.

The intermediary phase of creating a set of parallel connections was designed to simplify the complexity of routing during the upgrade process and to prevent the loss of connectivity between any two external ports during the upgrade process. However, the price of this intermediary phase introduces additional steps during the upgrade process.

The methods disclosed herein address the elimination of the intermediary phase in a "stage upgrade", that is an upgrade where one or more stages are added. Furthermore, in during more complex upgrade procedures where additional stages are added, the methods disclosed herein can be substituted for the splicing phase as described in the '874 application with the added benefit of eliminating additional rewiring steps.

BRIEF DESCRIPTION OF THE DRAWINGS

Features, aspects, and embodiments of the inventions are described in conjunction with the attached drawings, in which:

FIGS. 12A-12L is a sequence of diagrams showing the iteration-by-iteration sequence of intermediate topologies that occur during the stage upgrade procedure from a 24-port 4-stage RBCCG network to a 30-port 5-stage RBCCG network with FIG. 12L showing the result of the completed stage upgrade;

SUMMARY OF INVENTION

Figure 1:
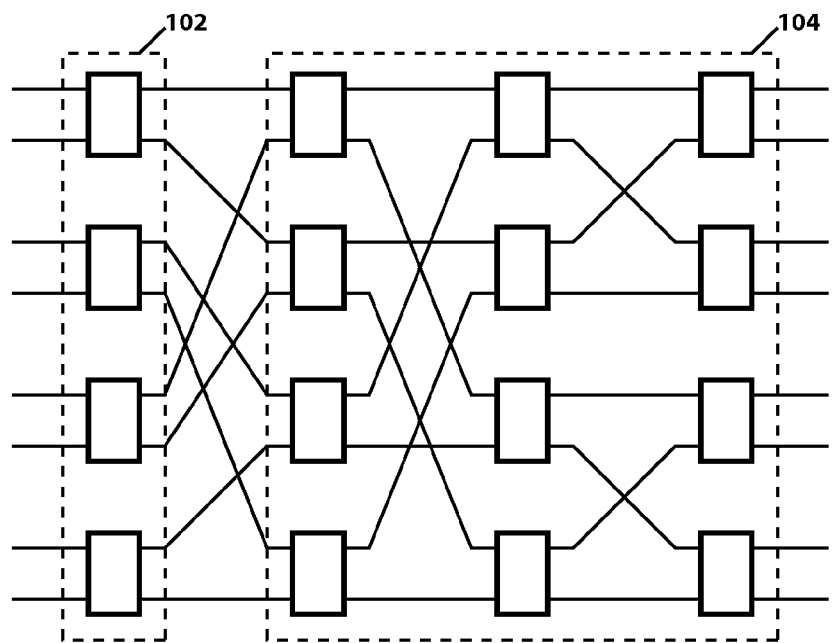
FIG. 1 is a diagram showing a 16-port extra stage cube network.

A multistage switching network can be upgraded by increasing the number of stages in the network. One or more stages can be inserted by rewiring the interconnection network above and below the insertion point, as prescribed by the desired post-upgrade topology. Both interconnection networks can be rewired concurrently, that is, the rewiring of each interconnection network can comprise a plurality of steps, while these steps can be performed sequentially, the cumulative processes of rewiring each interconnection network need not be performed sequentially. Furthermore, the need to rewire one of the interconnection networks into a set of parallel connections is eliminated.

One embodiment of the stage upgrade can iterate through all the connections of the interconnection network above (or equivalently below) the insertion point and disconnects them while reconnecting the two ports on the endpoint of the connection to their respective ports in the new stages. Another aspect of the stage upgrade procedure is that a variety of criteria can be used to select the order of iteration of the connections of the interconnection network above the insertion point. Another aspect of the stage upgrade procedure is that sacrificial connections can be added to improve the fault tolerance of the switching network during the upgrade procedure.

One use of the stage upgrade procedures is that it can increase the number of stages in a multistage interconnection network whether redundant or not, while minimizing the disruption to service. Another use of the stage upgrade procedure is to splice in new stages within a complex upgrade such as a simultaneous stage and width upgrade. Another use of the stage upgrade procedure is to merge two multistage networks together. Another use of the stage upgrade procedure is to insert a stage to a double RBCCG overlaid network along either of its axes.

These and other features, aspects, and embodiments of the invention are described below in the section entitled "Detailed Description."

DETAILED DESCRIPTION

As discussed above, the addition of extra stages introduces additional redundancies. The concern addressed by the first phase in the upgrade process in the '263 application and the '874 application is that during the upgrade process the topology of the network is no longer a well formed topology for which connectivity properties are known. It is feared that an ad hoc approach to a stage upgrade, can introduce a temporary topology during the upgrade process where full connectivity (i.e., the property in which any two external ports can communicate with each other) is lost. Because of the additional redundancy, especially path redundancy, introduced during the stage upgrade process the possibility of losing full connectivity can be avoided by careful choice of upgrade steps, without the need to use a two phase process such as that described in the '263 application and the '874 application.

In terms of terminology, a switching element is any component, which can receive data through one port and transmit it through another port in accordance to destination information in that data. Examples of a switching element include a switch and a router. In the context of a multistage network or an extended version of multistage networks, such as an overlaid network, ports are labeled according to their topology, for example, top ports, and bottom ports. Though they can be physically implemented in any fashion, labeling is used for logically assigning each port to a location as explained below.

Figure 5A:
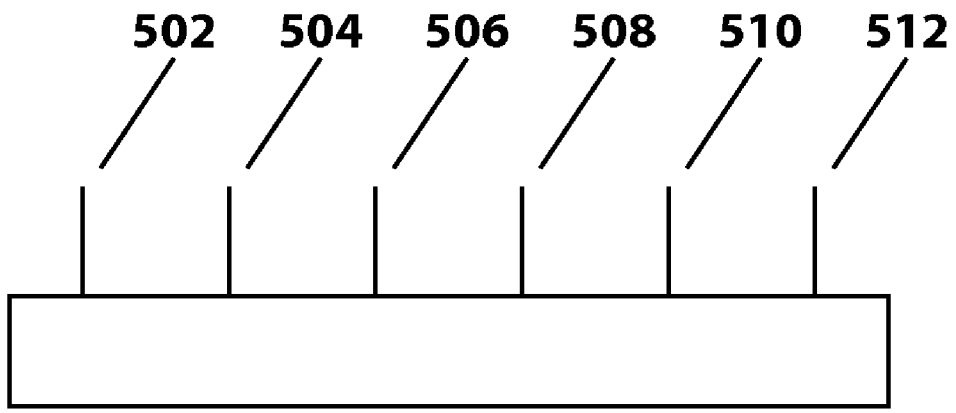
FIG. 5A is a diagram showing a symbolic representation of a switching element.
Figure 5B:
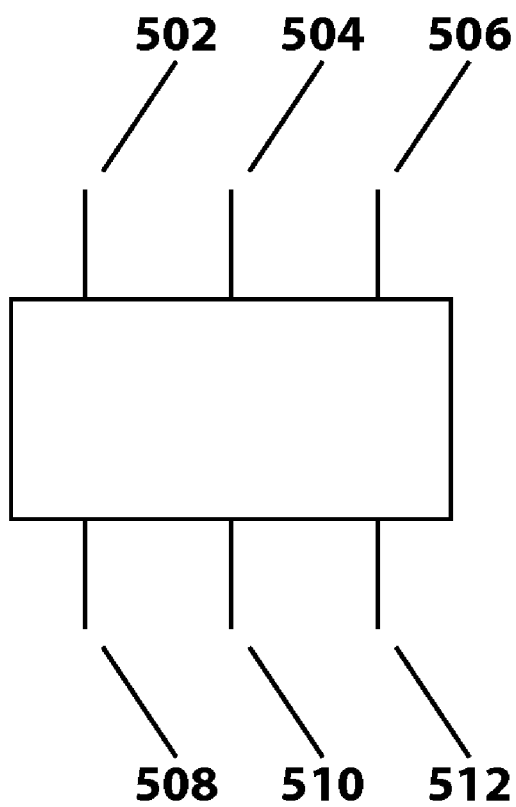
FIG. 5B is a diagram showing the switching element organized logically with top and bottom ports.

FIG. 5A shows a six-port switching element with ports 502, 504, 506, 508, 510, and 512. In a physical embodiment, this can be a router with all the ports in the front panel. FIG. 5B shows the same six-port switching element logically represented for use in a multistage interconnection network. In this representation, ports 502, 504, and 506 are designated as top ports and ports 508, 510, and 512 are designated as bottom ports. The choice is completely arbitrary if the ports serve as both input and output ports and the networks considered are bidirectional. In a unidirectional network, the choice of top ports and bottom ports can not be so arbitrary. For example, if top ports are input ports and bottom ports are output ports then only input ports can be labeled top ports and only output ports can be labeled bottom ports.

For convenience, the ports in the examples are labeled from left to right, starting at 0, so ports 502, 504, and 506 are referred to as top port 0, top port 1, and top port 2, respectively. Likewise, ports 508, 510, and 512 are referred to as bottom port 0, bottom port 1, and bottom port 2, respectively.

The switching elements can have routing capabilities internally, such as a router running a routing protocol such as Open Shortest Path First (OSPF), Border Gateway Protocol (BGP) or Routing Information Protocol (RIP). Alternatively, the switching elements can have the routing designated from an outside source, such as downloading of a routing table from a central server. During the upgrade process, traffic can be diverted away from a port, which is to be disconnected. This can be automatic when a port is disconnected as in the case of a router running a routing protocol, which can detect a failed connection and automatically reroute traffic away from that port. Furthermore, once the routers exchange routing tables, routing paths involving the disconnected port is disregarded. Alternatively, the switching elements can be instructed to divert traffic away from the disconnected port. Furthermore, a skilled artisan can supply to routing instructions to the switching elements, which discards paths involving the disconnected port.

Figure 2A:
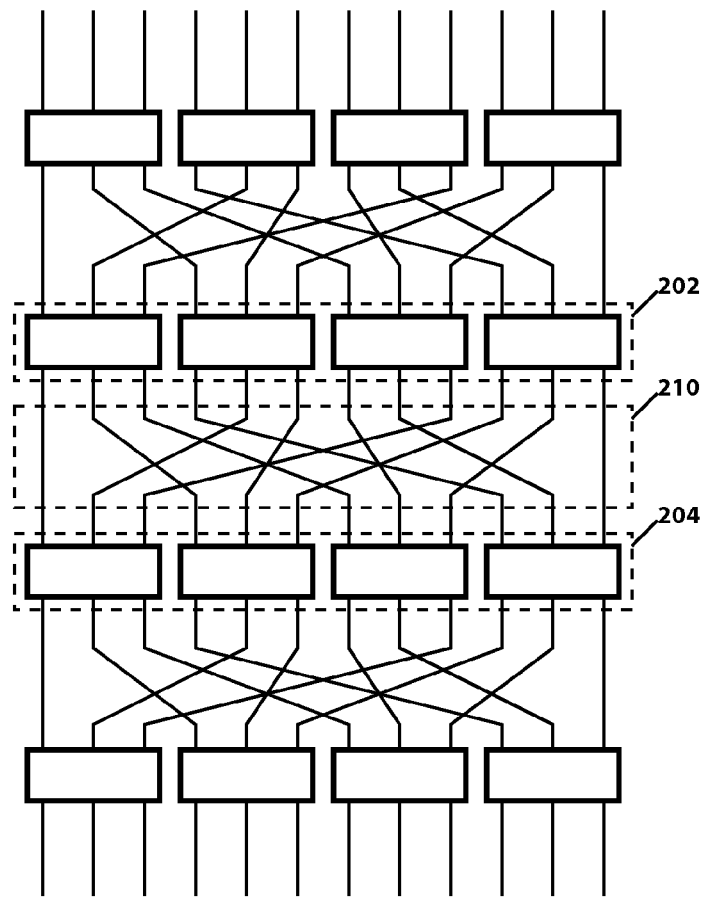
FIG. 2A is a diagram showing a 24-port 4-stage RBCCG network.
Figure 2B:
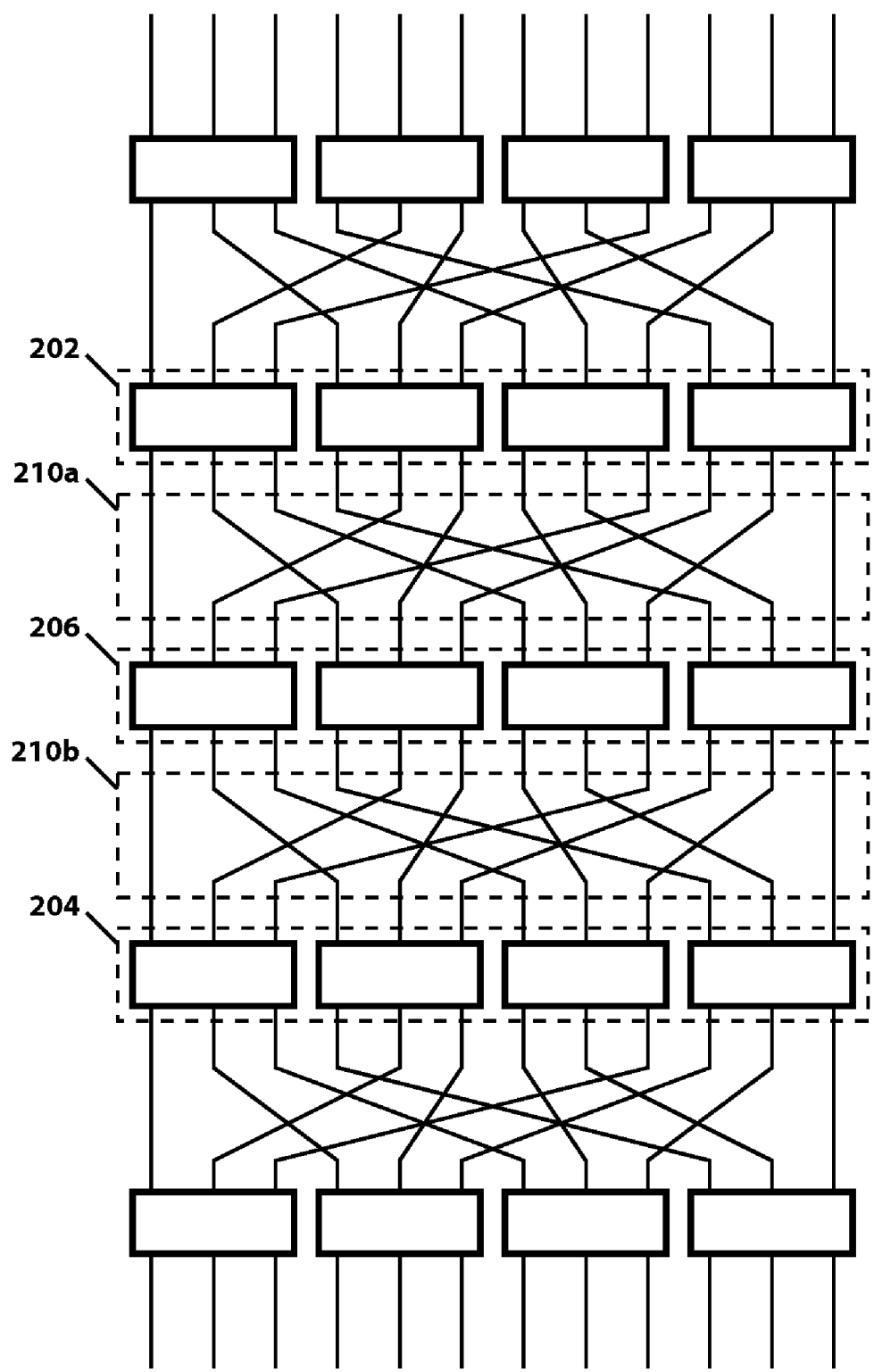
FIG. 2B is a diagram showing a 24-port 5-stage RBCCG network upgraded from the network shown in FIG. 2A.
Figure 3:
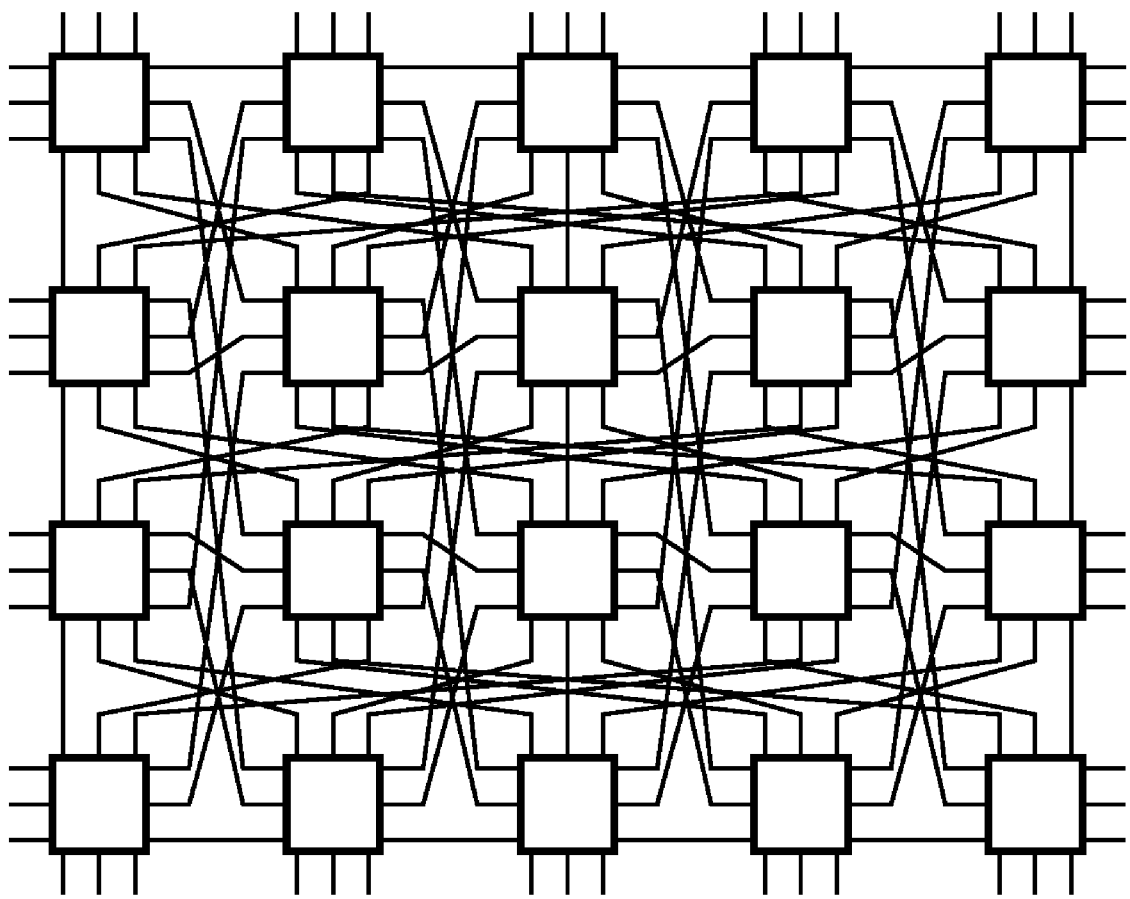
FIG. 3 is a diagram showing a 5×4 RBCCG network overlaid on a 4×5 RBCCG network, also referred to as a 5×4 double RBCCG overlaid network.
Figure 4A:
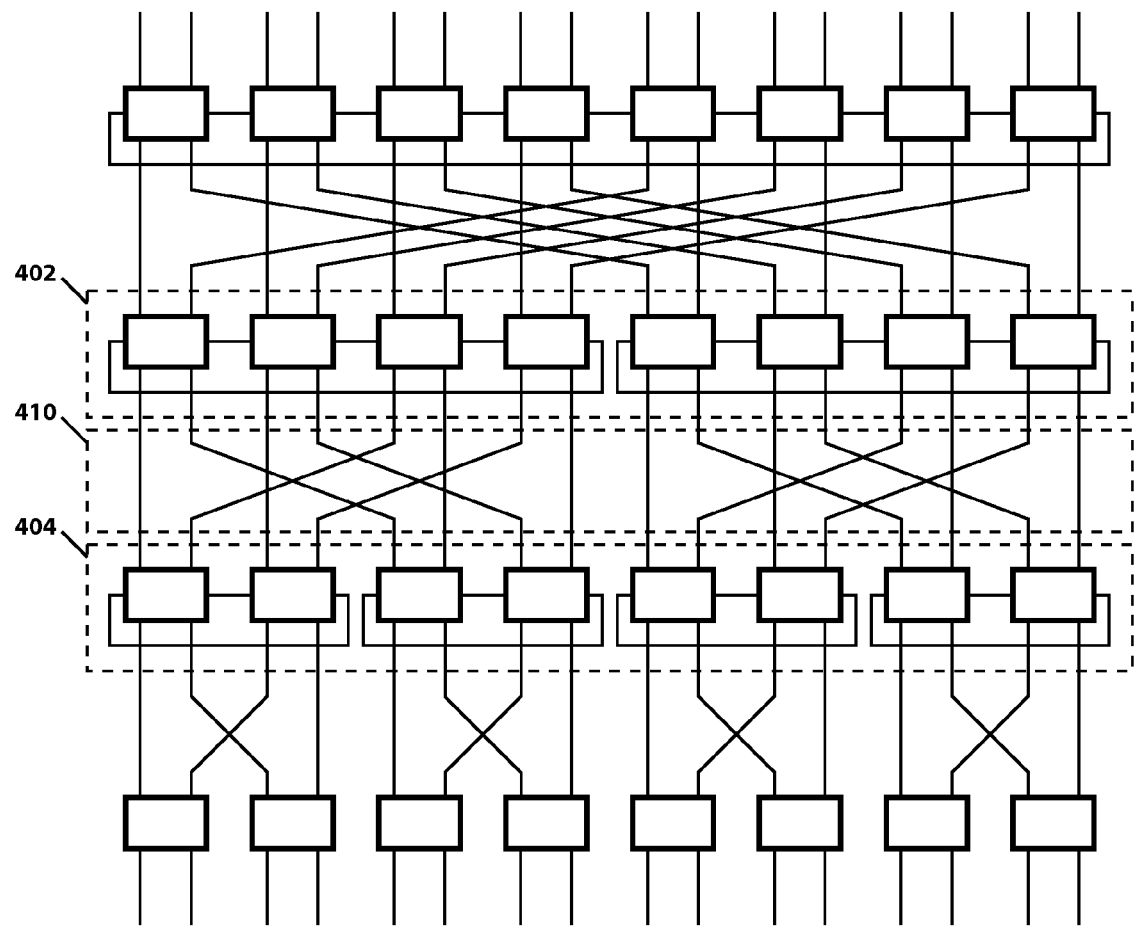
FIG. 4A is a diagram showing a 32-port augmented shuffle exchange network.
Figure 4B:
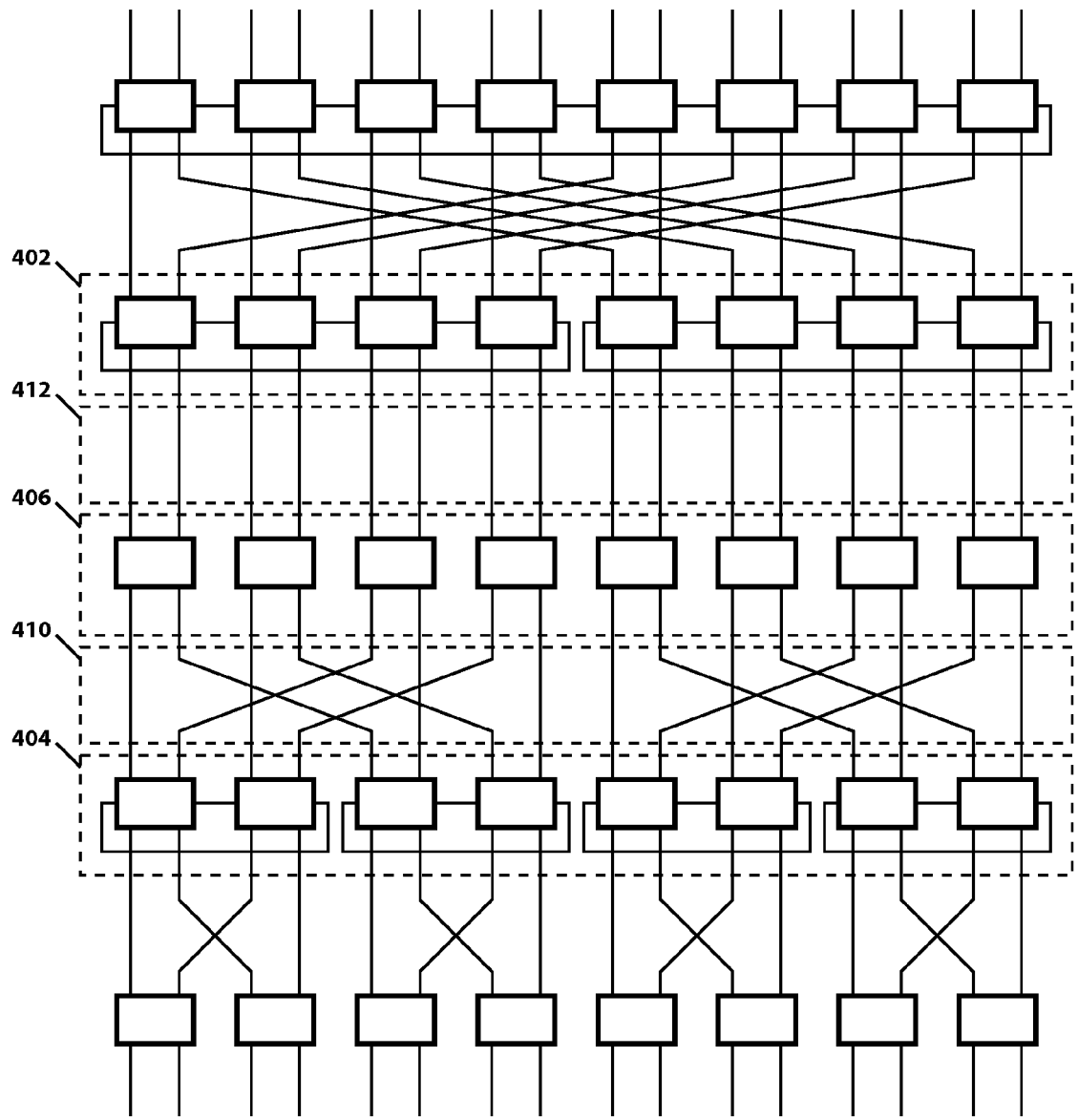
FIG. 4B is a diagram showing the network of FIG. 4A after the first phase of the upgrade disclosed in the '263 application.
Figure 4C:
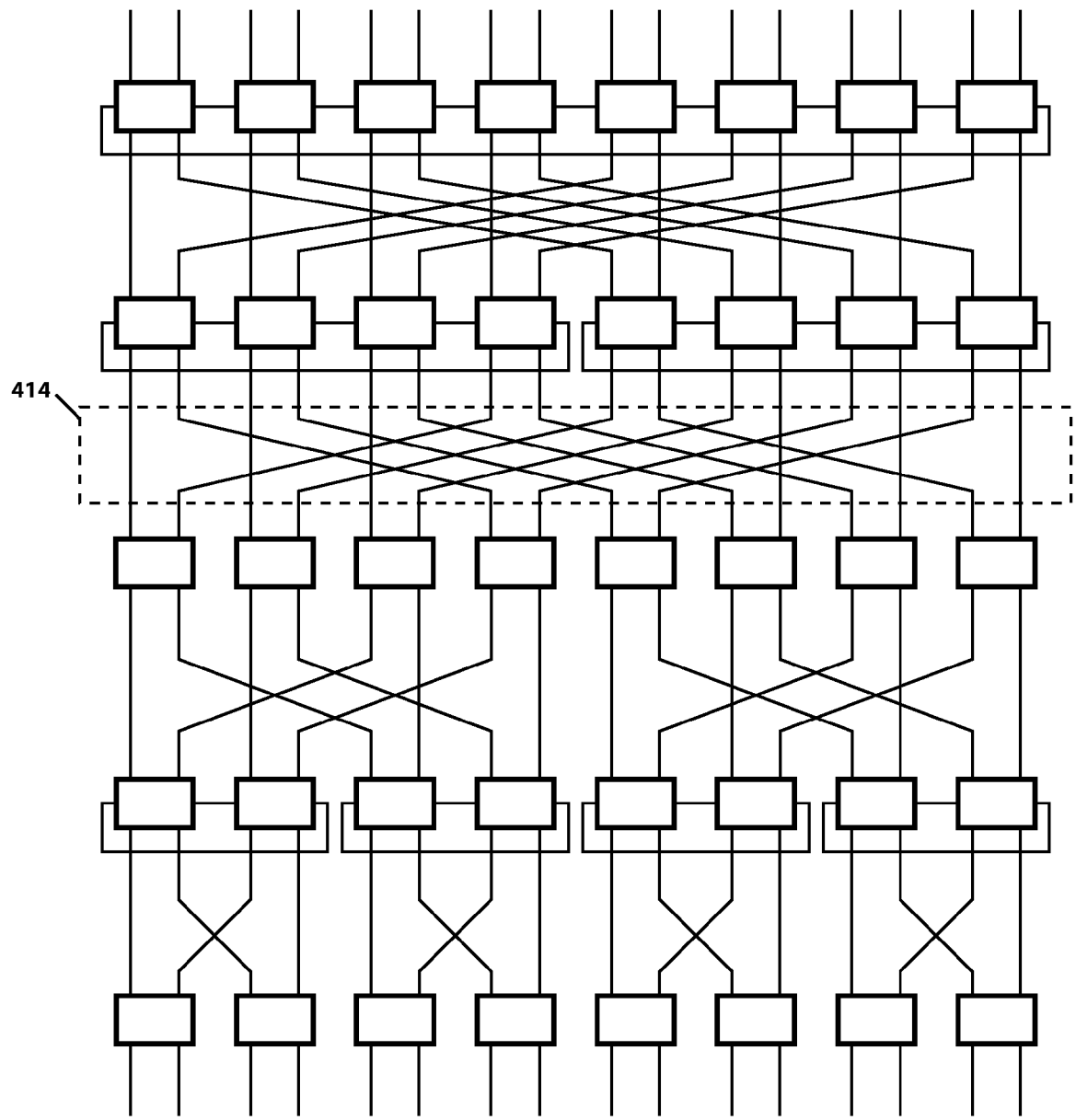
FIG. 4C is a diagram showing the network of FIG. 4A after the extra stage has been incorporated.
Figure 4D:
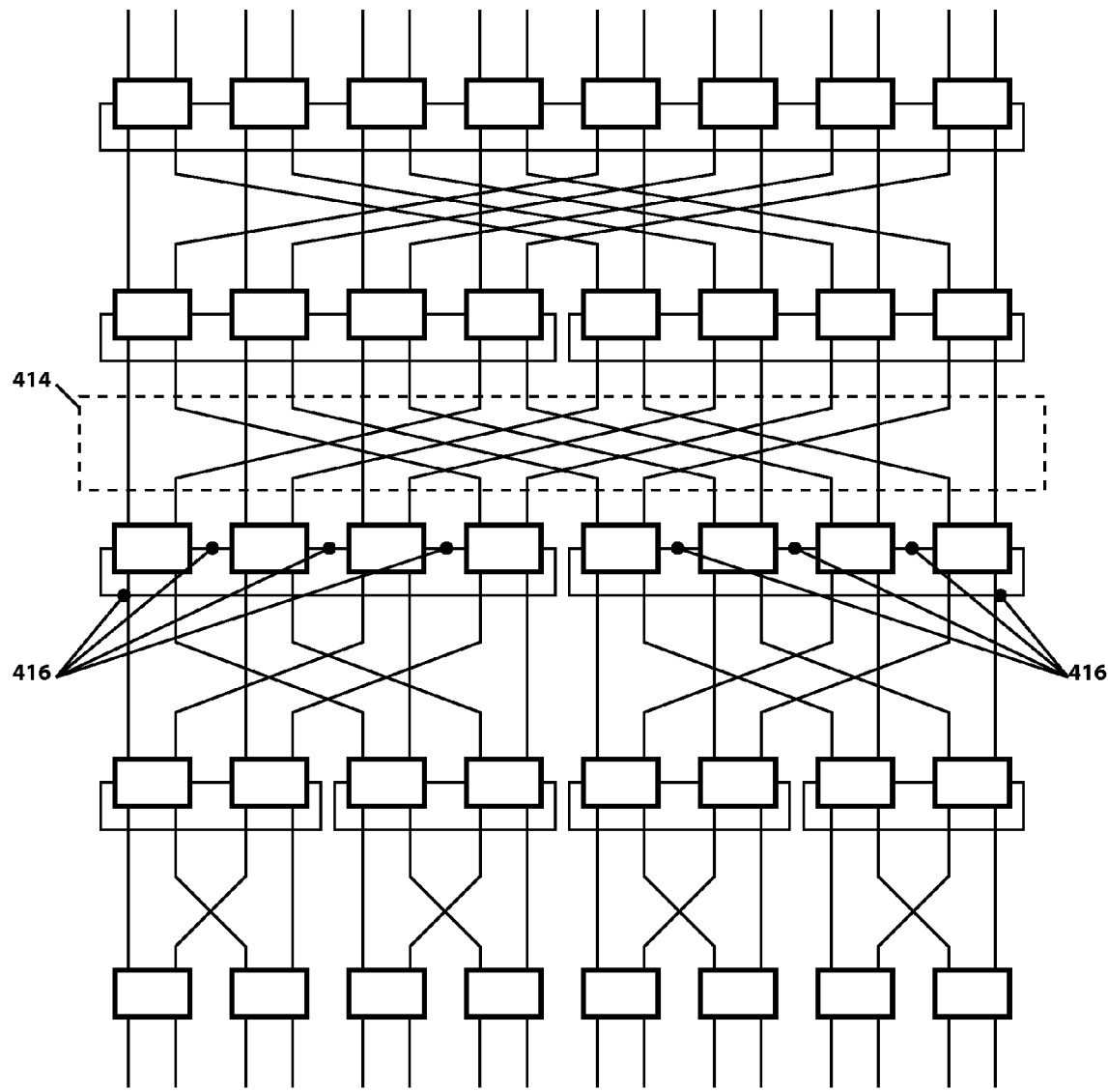
FIG. 4D is a diagram showing the completed upgraded network after intra-stage connections are added.
Figure 6:
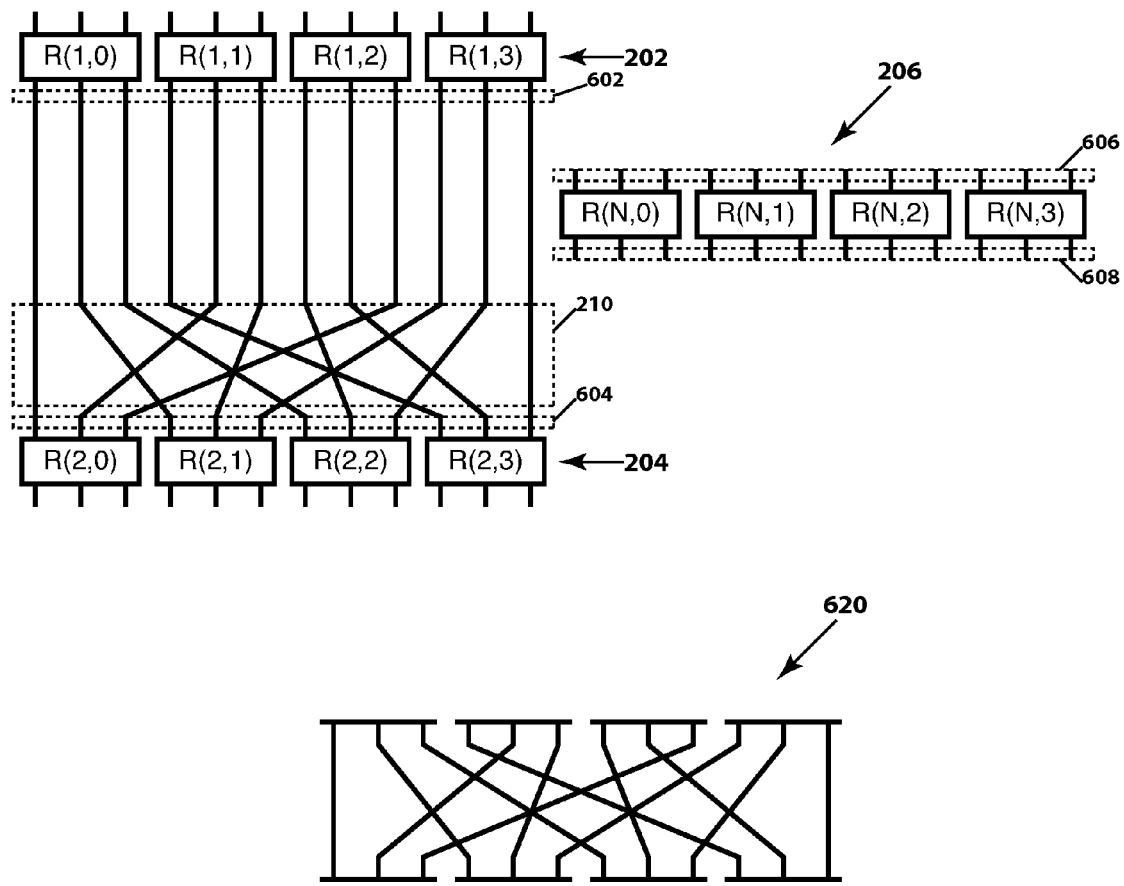
FIG. 6 is a diagram showing the relevant components involved in the process of upgrading a 24-port 4-stage RBCCG network to a 24-port 5-stage RBCCG network.

To illustrate an embodiment of the stage upgrade process, the example of upgrading the 24-port 4-stage RBCCG network of FIG. 2A is described. FIG. 6 shows stages 202 and 204 of the 24-port 4-stage RBCCG network, new stage 206, and interconnection network template 620 involved in the upgrade. For this example, the insertion point is selected between stage 202 and interconnection network 210. New stage 206 is to be inserted. The desired post-upgrade topology of the interconnection network above and below the new stage is shown as template 620. It should be noted that the pattern shown in template 620 matches interconnection network 210. For clarity, the placement of potential switching elements in relation to the interconnection network within template 620 are represented by the horizontal lines above and below the interconnection network. As a general observation, when upgrading by stage alone, that is no simultaneous width or fanout upgrade and no reconfiguration of interconnection networks, the desired topology template should match the interconnection network either above or below the insertion point. The insertion point generally can be any point below the topmost stage, and above the bottommost stage, although path diversity and redundancy tend to be at their greatest in the middle of the switching network.

For the purposes of describing the method in detail, the stage above the insertion point is referred to as upper_stage, the stage below the insertion point is referred to as lower_stage, the inserted_stages are referred to as inserted_stages. Ports 602 are referred to as bottom ports of upper_stage, ports 604 are referred to as top ports of lower_stage, ports 606 are referred to as top ports of inserted_stages, ports 608 are referred to as the bottom ports of inserted_stages. In other upgrade examples, more then one stage can be inserted, so top ports of inserted_stages are the top ports of the uppermost stage being inserted, and bottom ports of inserted_stages are the bottom ports of the lowermost stage being inserted. One should note that if the diagram is turned upside down, the roles of top ports of lower_stage and bottom ports of upper_stage are reversed. Likewise, the role of top ports and bottom ports of inserted_stages are reversed.

Figure 7A:
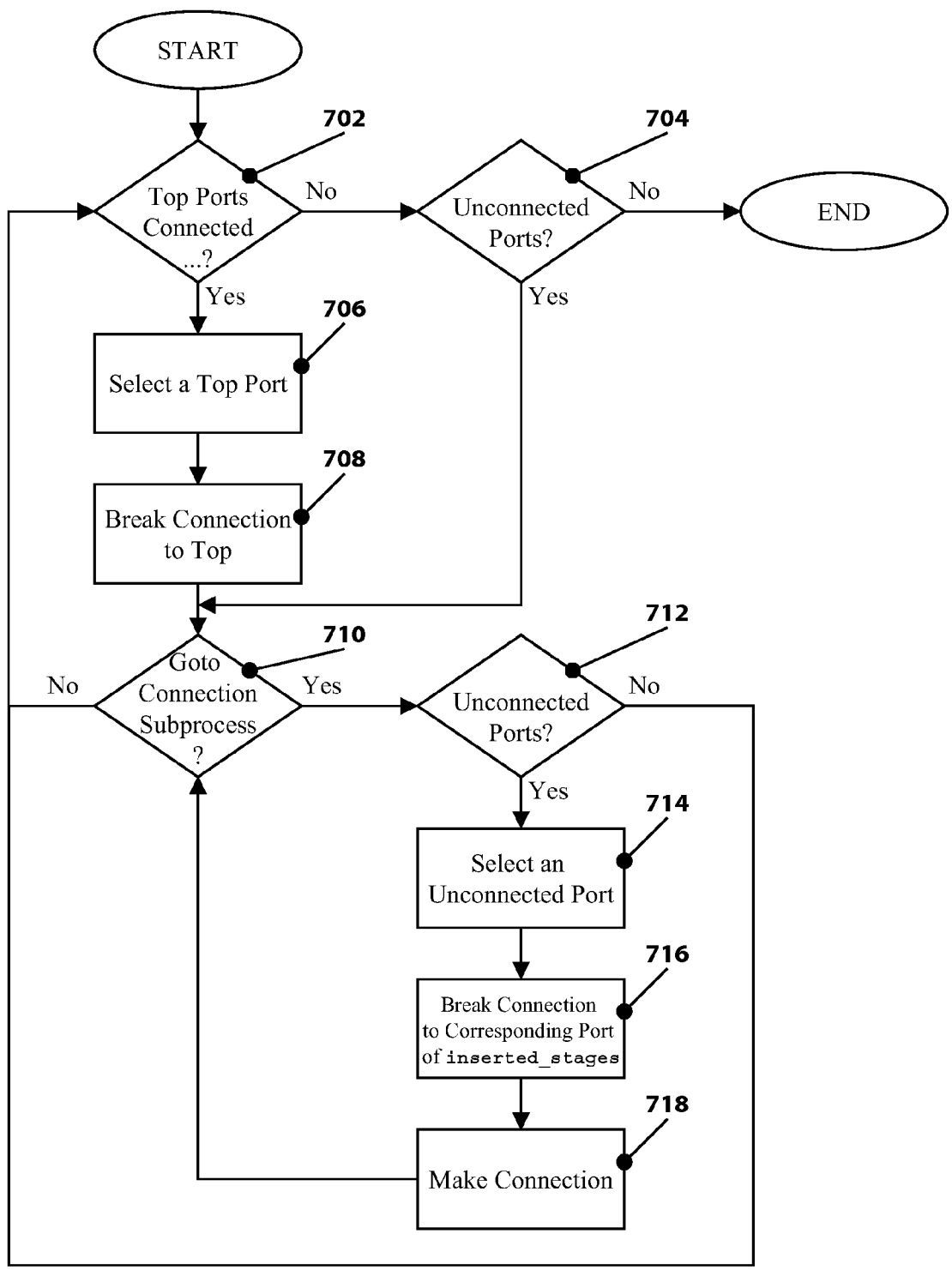
FIGS. 7A and 7B are flowcharts describing the stage upgrade procedure.

FIG. 7A is a flow chart describing the general form of stage upgrade algorithm. At step 702, a determination is made as to whether there are any top ports of lower_stage connected to a bottom port of upper_stage (or conversely any bottom port of upper_stage connected to a top port of lower_stage). If not, at step 704, a determination is made as to whether there are any top ports of lower_stage or bottom ports of upper_stage not connected. If not, the upgrade is complete, if so the upgrade jumps to step 710. If at step 702, there is a top port of lower_stage connected to a bottom port of upper_stage, the upgrade proceeds to step 706. At step 706, one of the top ports of lower_stage that is connected to a bottom port of upper_stage is selected. At step 708, the connection between the selected top port of lower_stage and the bottom port of upper_stage to which it is connected is disconnected. In some embodiments of the upgrade process, traffic is diverted from the selected top port and the bottom port to which it is connected, prior to breaking the connection. At step 710, a determination is made as to whether to proceed to the connection subprocess. This step is intended to offer flexibility in the upgrade process. While the decision made can be to proceed to the connection subprocess or not to proceed. In order to complete the upgrade process, eventually, the upgrade process must proceed to the connection subprocess. If the decision is to not proceed, the process returns to step 702.

Step 712 marks the beginning of the connection subprocess. At step 712 a determination is made as to whether there are any top ports of lower_stage or bottom ports of upper_stage that are not connected. If all top ports of lower_stage and bottom ports of upper_stage are connected, the process returns to step 702. If there are any top ports of lower_stage or bottom ports of upper_stage that are not connected, one of these ports is selected at step 714. Each selected port has a corresponding port of inserted_stages as determined by the desired post-upgrade topology. For instance, if a top port of lower_stage were selected, the corresponding port of inserted_stages would be a bottom port of inserted_stages. Conversely if a bottom port of upper_stage were selected, the corresponding port of inserted_stages would be a top port of inserted_stages. In either case, the specific port of inserted_stages is determined by the desired post-upgrade topology. At step 716, if the port of inserted_stages corresponding to the selected port has a connection to it, for example if a sacrificial connection were added prior to the upgrade procedure, that connection is disconnected. Traffic can be diverted away from the endpoints of that connection. At step 718, a connection is made between the selected port and the corresponding port of inserted_stages in accordance with the desired post-upgrade topology. In some embodiments of the upgrade process, after the connection is made, traffic is allowed to resume through the two newly connected ports, which might require an active action taken such as updating of a routing table. After the connection is made, the process. returns to step 710.

In practice, if the decision at step 710 is to always proceed to the connection subprocess for every connection broken at step 708, two connections can be formed during two iterations of the connection subprocess at step 718. For example, suppose top port of lower_stage, which is labeled "A", is connected to bottom port of upper_stage, which is labeled "B". Suppose according to the desired topology of the interconnection network below the bottom ports of lower_stage port "A" is to be connected to bottom port "C" of inserted_stages and according to the desired topology of the interconnection network above the top ports of lower_stage, port "B" is to be connected to top port "D" of inserted_stages. Then one iteration of the upgrade process can look like the following. Port "A" is selected in step 706. The connection is disconnected from port "B" satisfying step 708. The connection is then reconnected to port "C" which completes a connection between port "A" and "C". A new connection is connected between port "B" and port "D". While the description of step 708 and step 718 call for connections to be disconnected and new connections to be made. In practice, each connection may comprise a physical connection such as an optical fiber. In which case, streamlining can take place by not disconnecting a connection completely, but merely disconnection one end and subsequently moving the disconnected end to another port to establish a new connection.

The selection process in step 714 generally is arbitrary if the decision at step 710 is to proceed to the connection subprocess, because the connection process repeats until all connections that can be made are made before breaking another connection at step 708, so the impact of the choice of connections is minimal. However, the selection process in step 706 should consider the impact of the potential breaking of the selected connection in step 708 would have on the performance of the network, such as path redundancy and full connectivity. Examples of the selection process are described below.

Figure 7B:
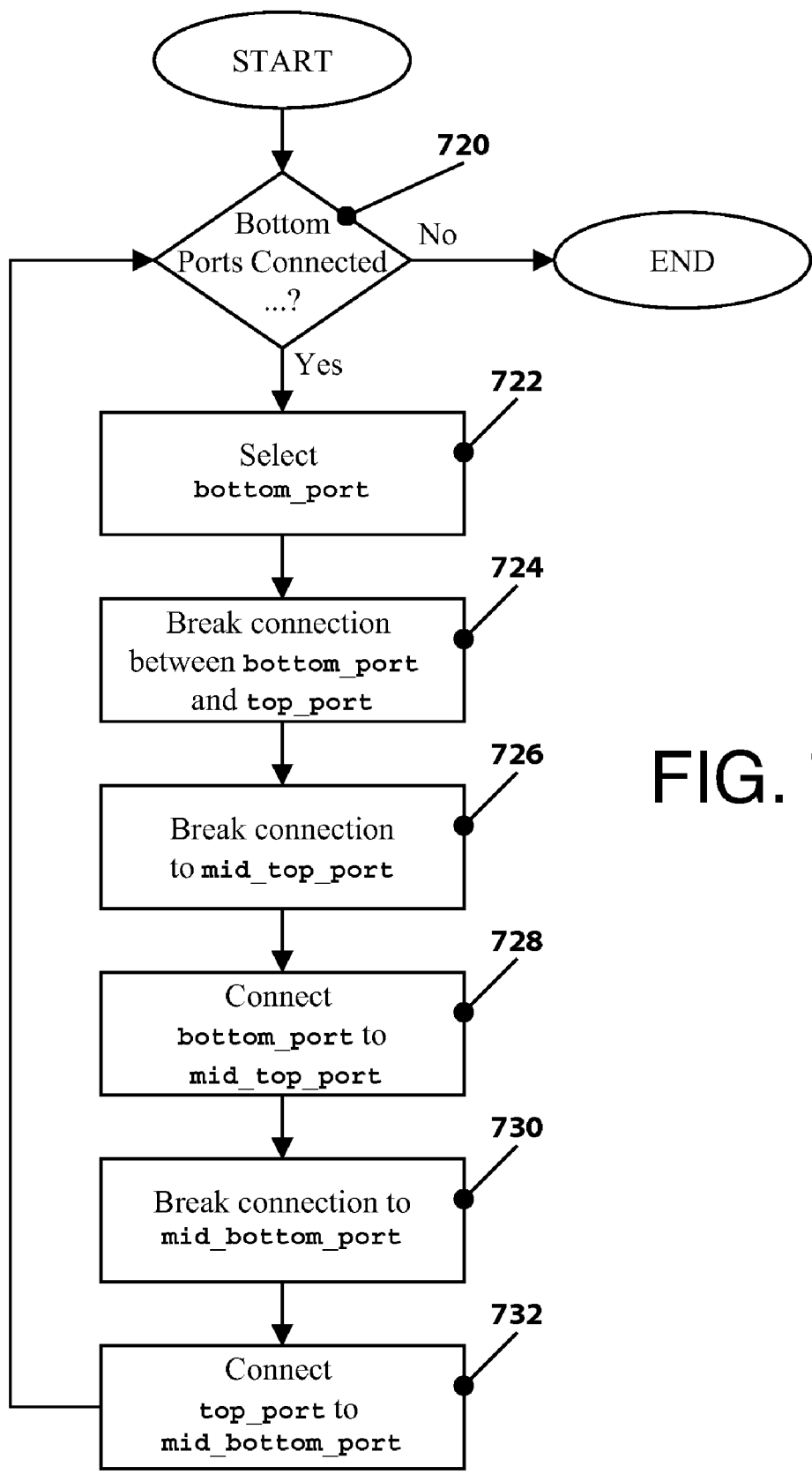

FIG. 7B shows a more specific embodiment of the upgrade process. For example, the decision at step 710 is eliminated and the process always proceeds to the connection subprocess. Because of this there are always two connections made in the connection subprocess. The revised algorithm is described in FIG. 7B and begins at step 720 where a determination is made as to whether there are any bottom ports of upper_stage connected to a top port of lower_stage. This is the inverted selection process of step 702 to show the equivalence of using bottom ports of upper_stage as the selection class rather than top ports of lower_stage. If there are none remaining, the stage upgrade is completed. Otherwise, at step 722 one of the bottom ports of upper_stage connected to a top port of lower_stage is selected. For notational convenience, upon selection the following ports are determined, bottom_port is the selected bottom port of upper_stage, top_port is the top port of lower_stage connected to bottom_port, mid_top_port is the corresponding top port of inserted_stages which should be connected to bottom_port in accordance with the desired post-upgrade topology, and mid_bottom port is the corresponding bottom port of inserted_stages which should be connected to top_port in accordance with the desired post-upgrade topology.

As an example of these terms, referring to FIG. 6, suppose bottom port 1 of R(1,1) is selected. then bottom_port is bottom port 1 of R(1,1) and top_port is top port 1 of R(2,0), because top_port is connected to bottom_port. Using template 620 as a guide, bottom_port should be connected to top port 1 of R(N,0) so mid_top_port is top port 1 of R(N,0), and top_port should be connected to bottom port 1 of R(N,1) so mid_bottom_port is bottom port 1 of R(N,1).

At step 724, the connection between bottom_port and top_port is disconnected. At step 726, any connection, which is connected to mid_top_port, is disconnected. At step 728, bottom_port is connected to mid_top_port. At step 730, any connection, which is connected to mid_bottom_port, is disconnected. At step 732, top_port is connected to mid_bottom_port. The process then repeats by returning to step 720.

It should be noted that at step 716 of FIG. 7A and steps 726 and 730 of FIG. 7B, connections to top ports and bottom ports of lower_stage would only need to be broken if connections exist to them that are not in accordance with the desired post-upgrade topology. One such example is when sacrificial connections are added as described below. If no connections are added to the new stage(s) unless they conform to the desired post-upgrade topology, then steps 716, 726 and 730 can be eliminated. It should also be clear that the skilled artisan can shuffle the order of some of these steps to yield a workable upgrade process.

In FIG. 7B and the examples to follow, detailed steps related to traffic diversion, which are known, to skilled artisans are omitted. For simplicity, the process is described totally in terms of disconnecting a connection and making a connection. However, whenever a connection is broken traffic can be diverted away from those ports connected by the connection, and whenever a new connection is made traffic can be allowed to flow through the new connection. Practical issues such as moving a connection as discussed above can be applied where applicable, but are not described in FIG. 7B and the foregoing examples.

Notationally, the switching elements are labeled as "R(stage, column)", where stage can be a number or "N" for new and column is a number where the columns are numbered starting with 0 from left to right. Also, "R(n,*)" is a shorthand referring to stage n. As mentioned above, ports for each switching element are numbered from 0 starting from left to right.

FIGS. 8A-8L show the intermediate steps of upgrading the network shown in FIG. 2A. For clarity, only the stages involved in the upgrade are shown. To show the equivalent roles of top ports of lower_stage and bottom ports of upper_stage, the selection process described here is based on bottom ports of upper_stage. Basically, the selection process scans bottom ports of upper_stage from right to left and selects the first bottom port, which is connected to a top port of lower_stage. In this example, upper_stage is R(1,*), and lower_stage is R(2,*) and the ports are labeled 0, 1 and 2 from left to right.

Figure 8A:
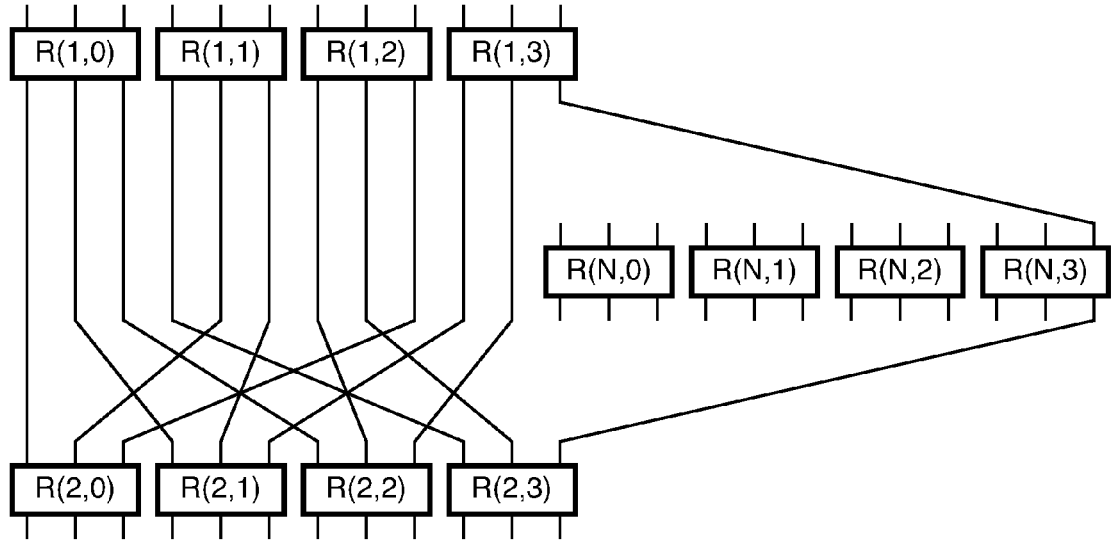
FIGS. 8A-8L is a sequence of diagrams showing the iteration-by-iteration sequence of intermediate topologies that occur during the stage upgrade procedure from a 24-port 4-stage RBCCG network to a 24-port 5-stage RBCCG network.

In FIG. 8A, scanning from right to left, bottom port 2 of switching element R(1,3) is the rightmost bottom port of stage R(1,*) connected to a top port of stage R(2,*) so bottom port 2 of switching element R(1,3) is selected. The connection between bottom port 2 of switching element R(1,3) and top port 2 of switching element R(2,3) is disconnected. In accordance with the interconnection network of desired post-upgrade topology above stage R(N,*) shown with template 620, a connection is made between top port 2 of switching element R(2,3) and bottom port 2 of switching element R(N,3) is made. In accordance with the interconnection network of desired post-upgrade topology below stage R(N,*) also shown with template 620, a connection is made between bottom port 2 of switching element R(1,3) and top port 2 of switching element R(N,3).

Figure 8B:
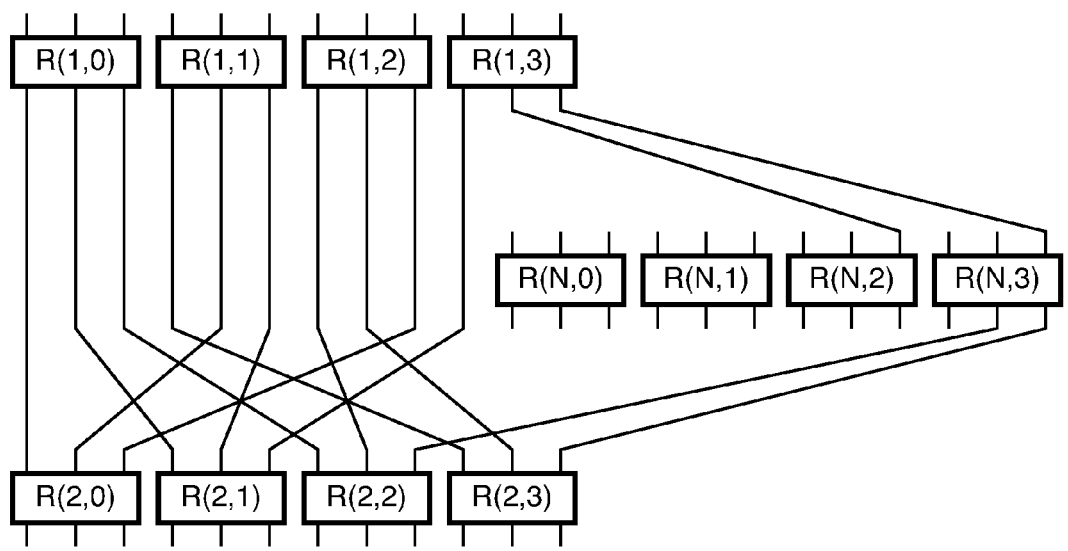

In FIG. 8B, scanning from right to left, bottom port 1 of switching element R(1,3) is the rightmost bottom port of stage R(1,*) connected to a top port of stage R(2,*) so bottom port 1 of switching element R(1,3) is selected. The connection between bottom port 1 of switching element R(1,3) and top port 2 of switching element R(2,2) is disconnected. In accordance with the interconnection network of desired post-upgrade topology above stage R(N,*) shown with template 620, a connection is made between top port 2 of switching element R(2,2) and bottom port 1 of switching element R(N,3) is made. In accordance with the interconnection network of desired post-upgrade topology below stage R(N,*) also shown with template 620, a connection is made between bottom port 1 of switching element R(1,3) and top port 2 of switching element R(N,2).

Figure 8C:
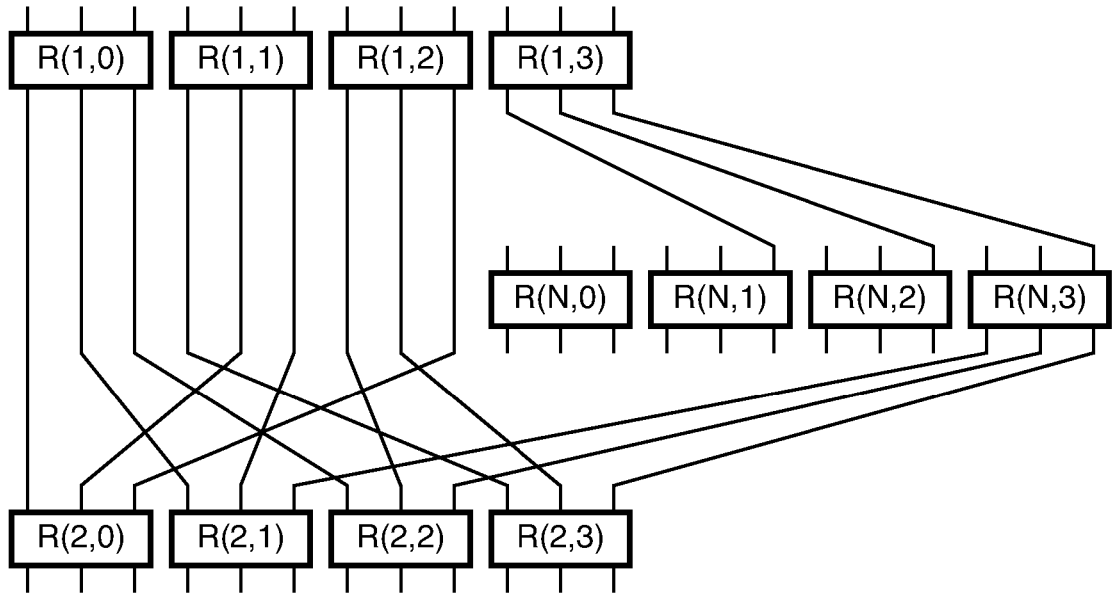

In FIG. 8C, scanning from right to left, bottom port 0 of switching element R(1,3) is the rightmost bottom port of stage R(1,*) connected to a top port of stage R(2,*) so bottom port 0 of switching element R(1,3) is selected. The connection between bottom port 0 of switching element R(1,3) and top port 2 of switching element R(2,1) is disconnected. In accordance with the interconnection network of desired post-upgrade topology above stage R(N,*) shown with template 620, a connection is made between top port 2 of switching element R(2,1) and bottom port 0 of switching element R(N,3) is made. In accordance with the interconnection network of desired post-upgrade topology below stage R(N,*) also shown with template 620, a connection is made between bottom port 0 of switching element R(1,3) and top port 2 of switching element R(N,1)

Figure 8D:
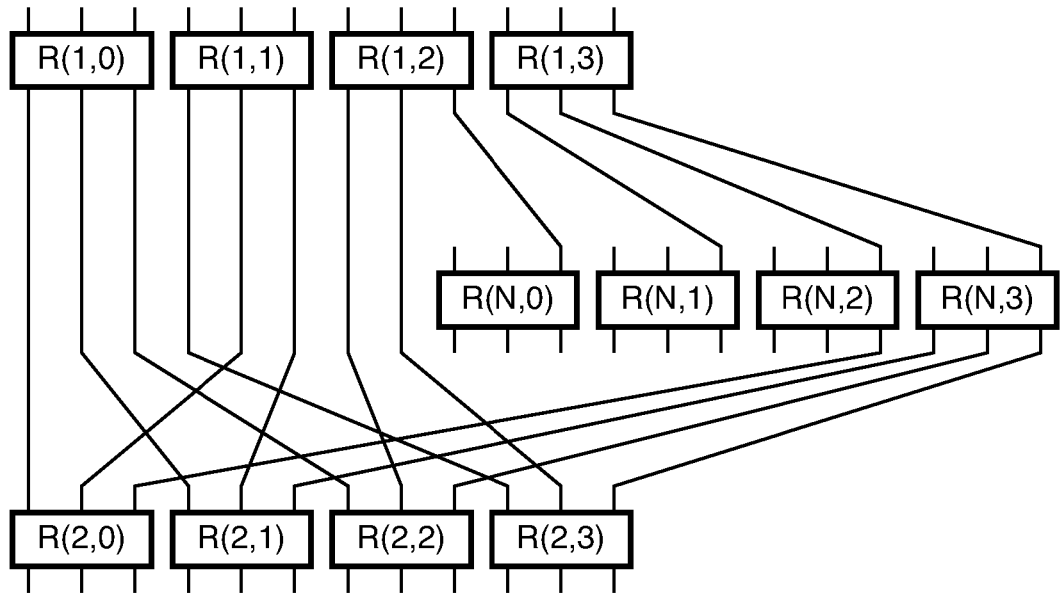

In FIG. 8D, scanning from right to left, bottom port 2 of switching element R(1,2) is the rightmost bottom port of stage R(1,*) connected to a top port of stage R(2,*) so bottom port 2 of switching element R(1,2) is selected. The connection between bottom port 2 of switching element R(1,2) and top port 2 of switching element R(2,0) is disconnected. In accordance with the interconnection network of desired post-upgrade topology above stage R(N,*) shown with template 620, a connection is made between top port 2 of switching element R(2,0) and bottom port 2 of switching element R(N,2) is made. In accordance with the interconnection network of desired post-upgrade topology below stage R(N,*) also shown with template 620, a connection is made between bottom port 2 of switching element R(1,2) and top port 2 of switching element R(N,0).

Figure 8E:
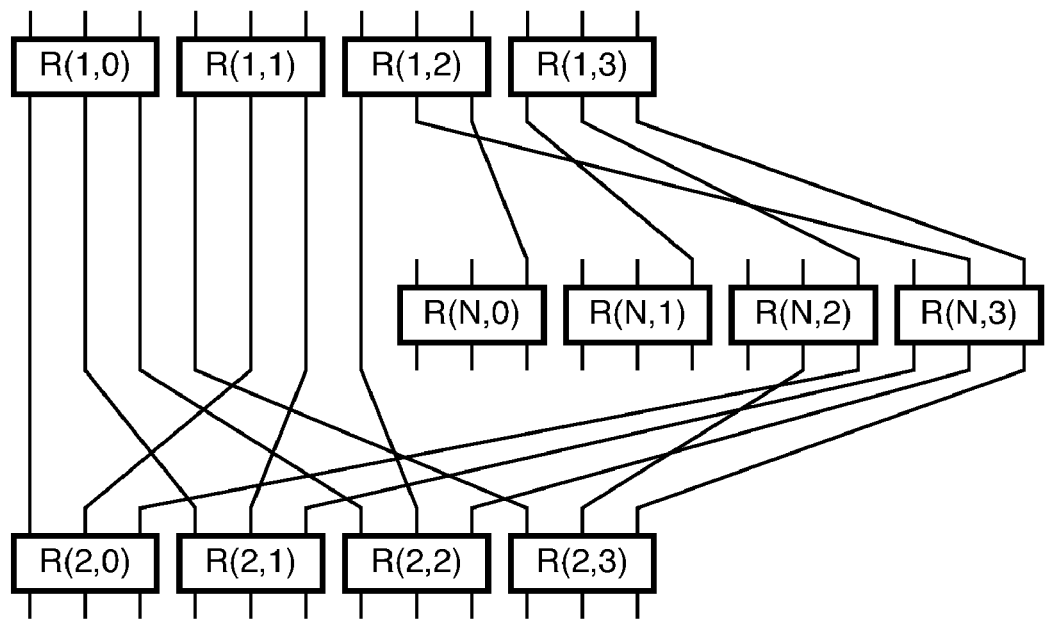

In FIG. 8E, scanning from right to left, bottom port 1 of switching element R(1,2) is the rightmost bottom port of stage R(1,*) connected to a top port of stage R(2,*) so bottom port 1 of switching element R(1,2) is selected. The connection between bottom port 1 of switching element R(1,2) and top port 1 of switching element R(2,3) is disconnected. In accordance with the interconnection network of desired post-upgrade topology above stage R(N,*) shown with template 620, a connection is made between top port 1 of switching element R(2,3) and bottom port 1 of switching element R(N,2) is made. In accordance with the interconnection network of desired post-upgrade topology below stage R(N,*) also shown with template 620, a connection is made between bottom port 1 of switching element R(1,2) and top port 1 of switching element R(N,3).

Figure 8F:
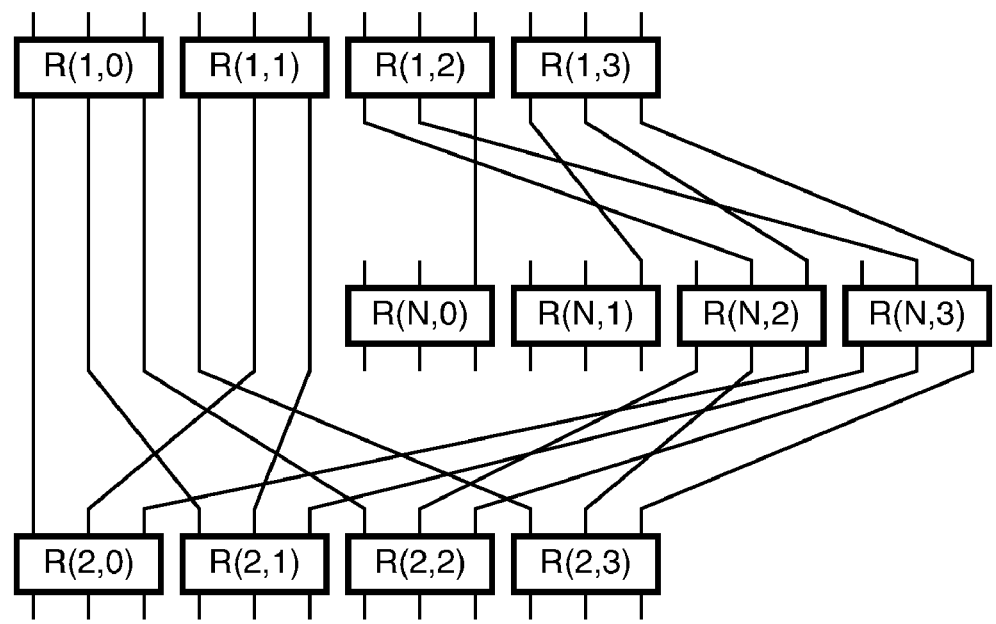

In FIG. 8F, scanning from right to left, bottom port 0 of switching element R(1,2) is the rightmost bottom port of stage R(1,*) connected to a top port of stage R(2,*) so bottom port 0 of switching element R(1,2) is selected. The connection between bottom port 0 of switching element R(1,2) and top port 1 of switching element R(2,2) is disconnected. In accordance with the interconnection network of desired post-upgrade topology above stage R(N,*) shown with template 620, a connection is made between top port 1 of switching element R(2,2) and bottom port 0 of switching element R(N,2) is made. In accordance with the interconnection network of desired post-upgrade topology below stage R(N,*) also shown with template 620, a connection is made between bottom port 0 of switching element R(1,2) and top port 1 of switching element R(N,2).

Figure 8G:
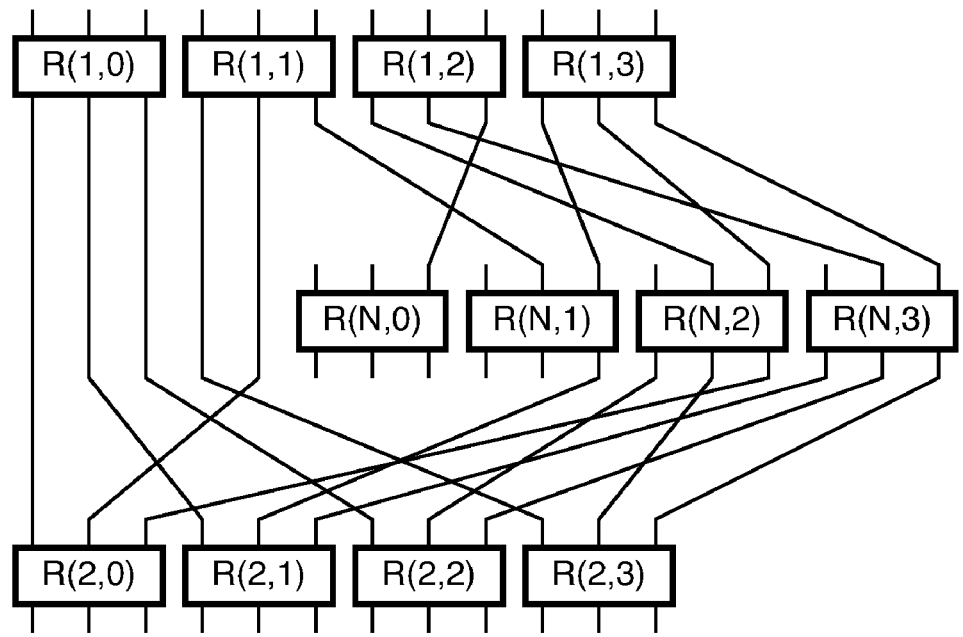

In FIG. 8G, scanning from right to left, bottom port 2 of switching element R(1,1) is the rightmost bottom port of stage R(1,*) connected to a top port of stage R(2,*) so bottom port 2 of switching element R(1,1) is selected. The connection between bottom port 2 of switching element R(1,1) and top port 1 of switching element R(2,1) is disconnected. In accordance with the interconnection network of desired post-upgrade topology above stage R(N,*) shown with template 620, a connection is made between top port 1 of switching element R(2,1) and bottom port 2 of switching element R(N,1) is made. In accordance with the interconnection network of desired post-upgrade topology below stage R(N,*) also shown with template 620, a connection is made between bottom port 2 of switching element R(1,1) and top port 1 of switching element R(N,1).

Figure 8H:
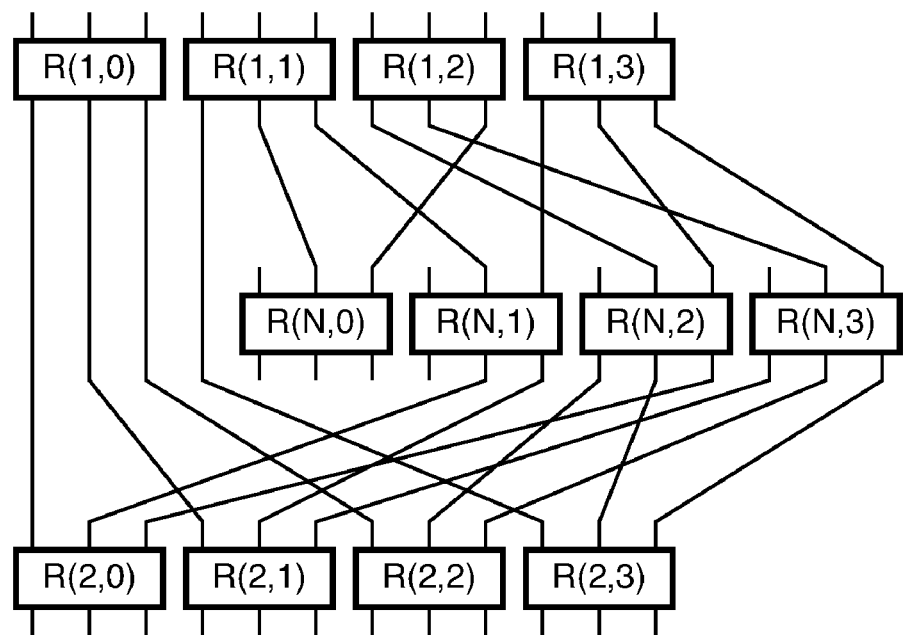

In FIG. 8H, scanning from right to left, bottom port 1 of switching element R(1,1) is the rightmost bottom port of stage R(1,*) connected to a top port of stage R(2,*) so bottom port 1 of switching element R(1,1) is selected. The connection between bottom port 1 of switching element R(1,1) and top port 1 of switching element R(2,0) is disconnected. In accordance with the interconnection network of desired post-upgrade topology above stage R(N,*) shown with template 620, a connection is made between top port 1 of switching element R(2,0) and bottom port 1 of switching element R(N,1) is made. In accordance with the interconnection network of desired post-upgrade topology below stage R(N,*) also shown with template 620, a connection is made between bottom port 1 of switching element R(1,1) and top port 1 of switching element R(N,0).

Figure 8I:
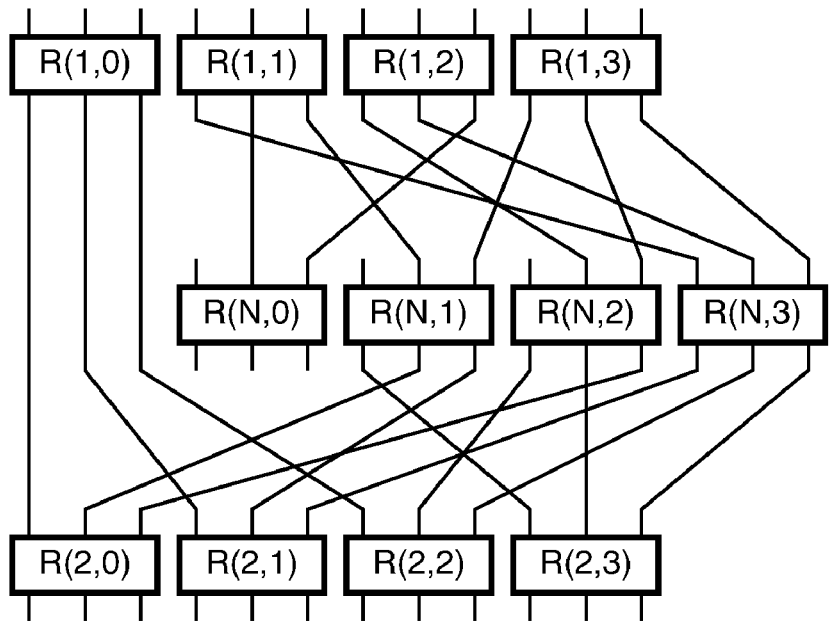

In FIG. 8I, scanning from right to left, bottom port 0 of switching element R(1,1) is the rightmost bottom port of stage R(1,*) connected to a top port of stage R(2,*) so bottom port 0 of switching element R(1,1) is selected. The connection between bottom port 0 of switching element R(1,1) and top port 0 of switching element R(2,3) is disconnected. In accordance with the interconnection network of desired post-upgrade topology above stage R(N,*) shown with template 620, a connection is made between top port 0 of switching element R(2,3) and bottom port 0 of switching element R(N,1) is made. In accordance with the interconnection network of desired post-upgrade topology below stage R(N,*) also shown with template 620, a connection is made between bottom port 0 of switching element R(1,1) and top port 0 of switching element R(N,3).

Figure 8J:
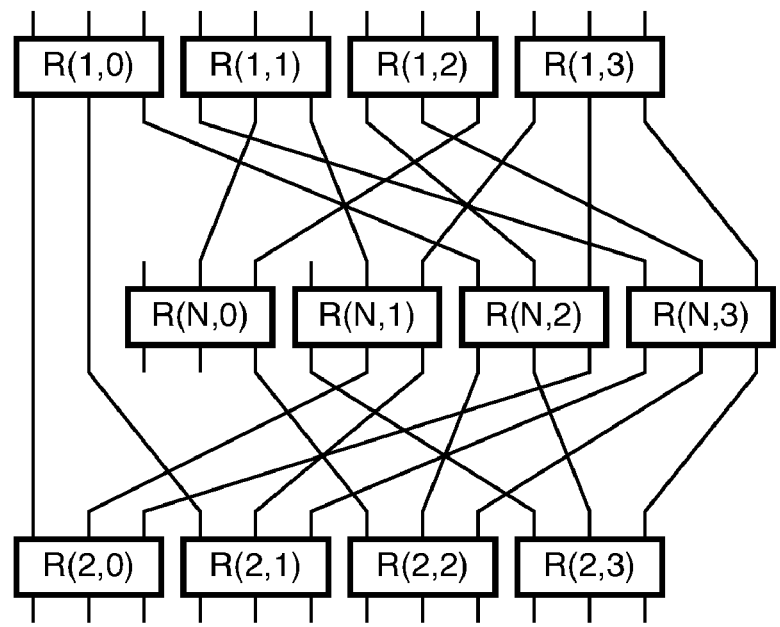

In FIG. 8J, scanning from right to left, bottom port 2 of switching element R(1,0) is the rightmost bottom port of stage R(1,*) connected to a top port of stage R(2,*) so bottom port 2 of switching element R(1,0) is selected. The connection between bottom port 2 of switching element R(1,0) and top port 0 of switching element R(2,2) is disconnected. In accordance with the interconnection network of desired post-upgrade topology above stage R(N,*) shown with template 620, a connection is made between top port 0 of switching element R(2,2) and bottom port 2 of switching element R(N,0) is made. In accordance with the interconnection network of desired post-upgrade topology below stage R(N,*) also shown with template 620, a connection is made between bottom port 2 of switching element R(1,0) and top port 0 of switching element R(N,2).

Figure 8K:
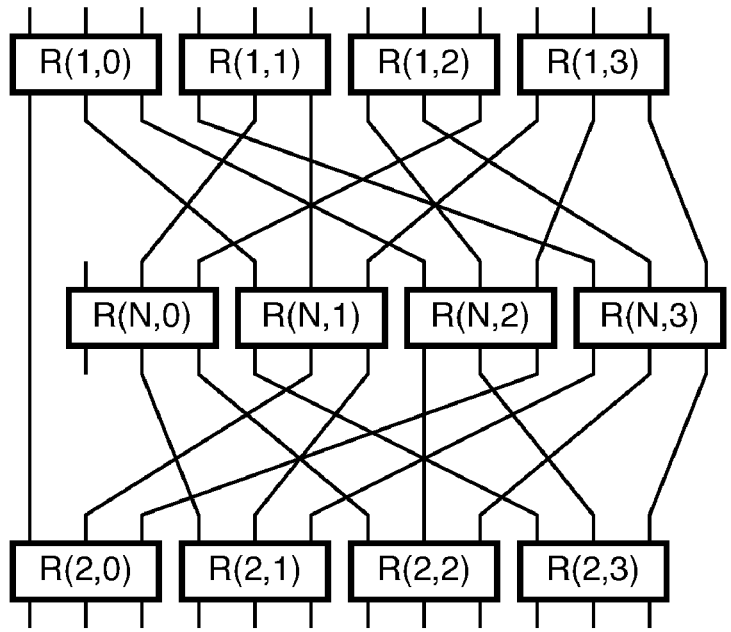

In FIG. 8K, scanning from right to left, bottom port 1 of switching element R(1,0) is the rightmost bottom port of stage R(1,*) connected to a top port of stage R(2,*) so bottom port 1 of switching element R(1,0) is selected. The connection between bottom port 1 of switching element R(1,0) and top port 0 of switching element R(2,1) is disconnected. In accordance with the interconnection network of desired post-upgrade topology above stage R(N,*) shown with template 620, a connection is made between top port 0 of switching element R(2,1) and bottom port 1 of switching element R(N,0) is made. In accordance with the interconnection network of desired post-upgrade topology below stage R(N,*) also shown with template 620, a connection is made between bottom port 1 of switching element R(1,0) and top port 0 of switching element R(N,1).

Figure 8L:
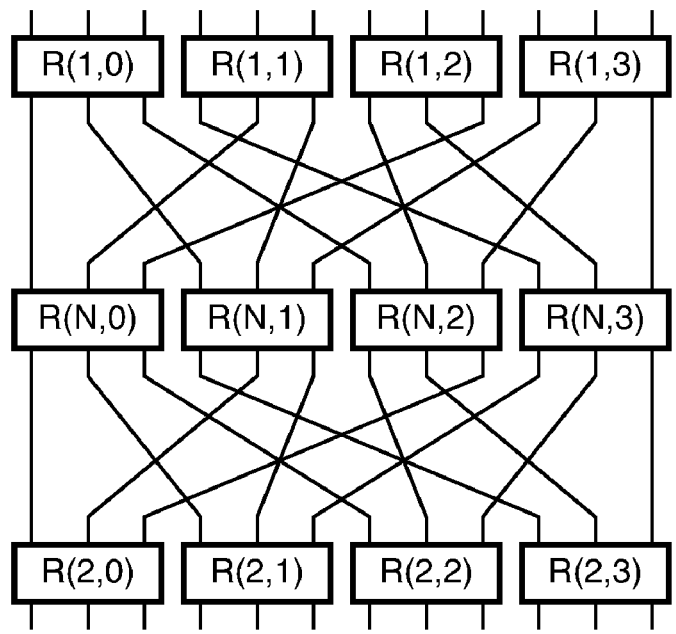

In FIG. 8L, scanning from right to left, bottom port 0 of switching element R(1,0) is the rightmost bottom port of stage R(1,*) connected to a top port of stage R(2,*) so bottom port 0 of switching element R(1,0) is selected. The connection between bottom port 0 of switching element R(1,0) and top port 0 of switching element R(2,0) is disconnected. In accordance with the interconnection network of desired post-upgrade topology above stage R(N,*) shown with template 620, a connection is made between top port 0 of switching element R(2,0) and bottom port 0 of switching element R(N,0) is made. In accordance with the interconnection network of desired post-upgrade topology below stage R(N,*) also shown with template 620, a connection is made between bottom port 0 of switching element R(1,0) and top port 0 of switching element R(N,0).

Since there are no more bottom ports of stage R(1,*) connected to top ports of stage R(2,*) the upgrade process is completed.

Figure 9:
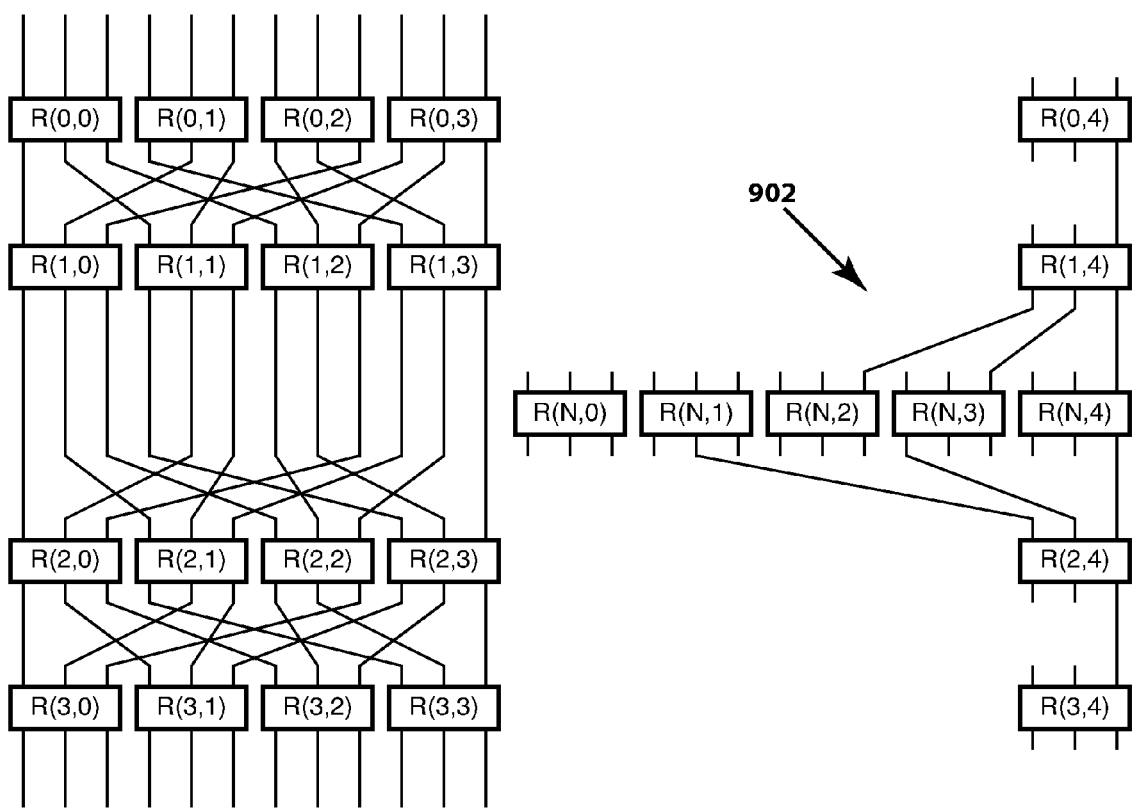
FIG. 9 is a diagram showing a 24-port 4-stage RBCCG network and hardware needed to upgrade it to a 30-port 5-stage RBCCG network.

FIG. 9 shows a 24-port 4-stage RBCCG network, like the one shown in FIG. 2A, and hardware 902 needed to upgrade it to a 30-port 5-stage RBCCG network. Hardware 902 has been preconnected with connections that can be made in accordance with the desired post-upgrade topology. This is described as the pre-connecting phase of the '874 application.

Figure 10A:
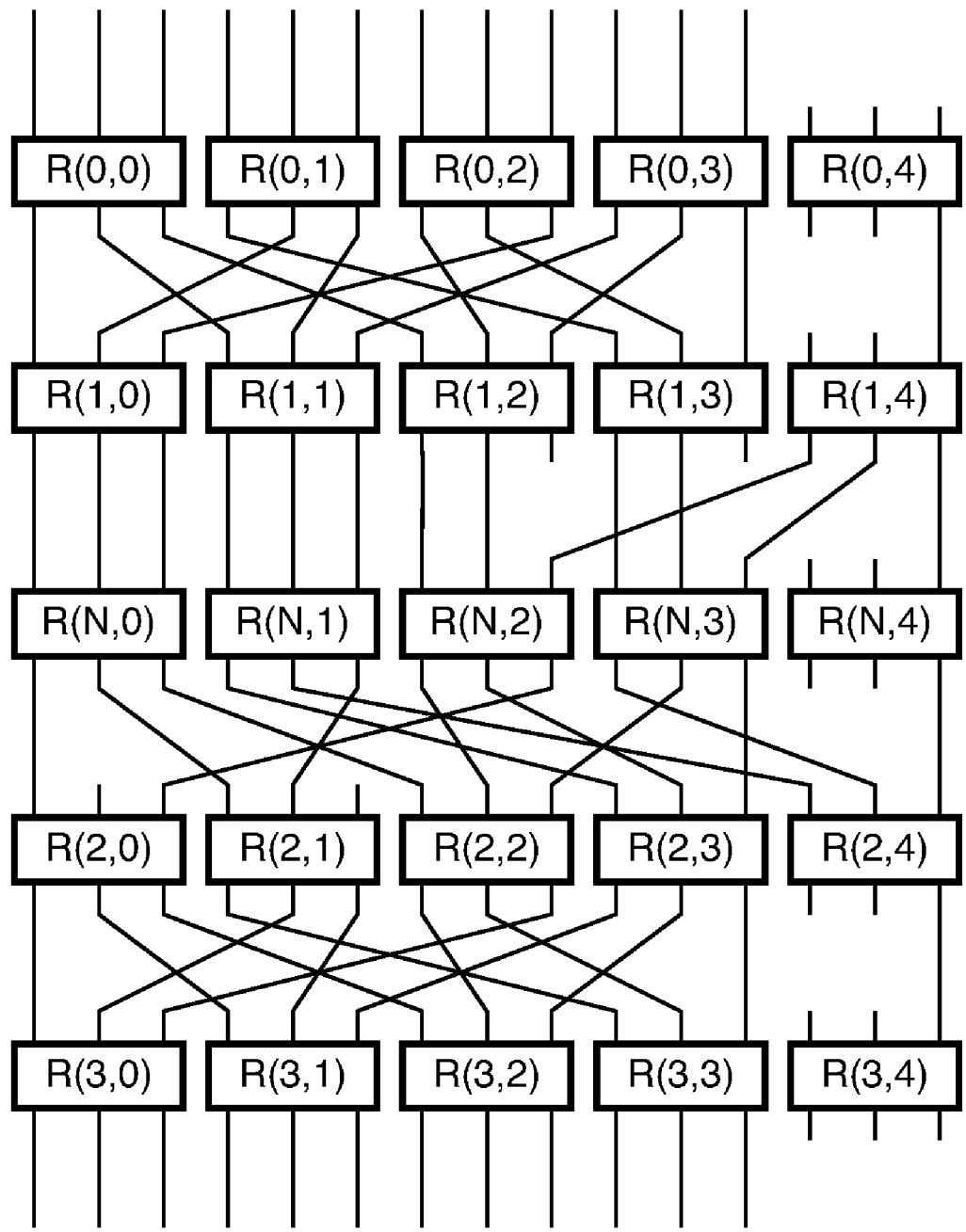
FIG. 10A is a diagram showing the resultant network after the splicing phase described in the '874 application.
Figure 10B:
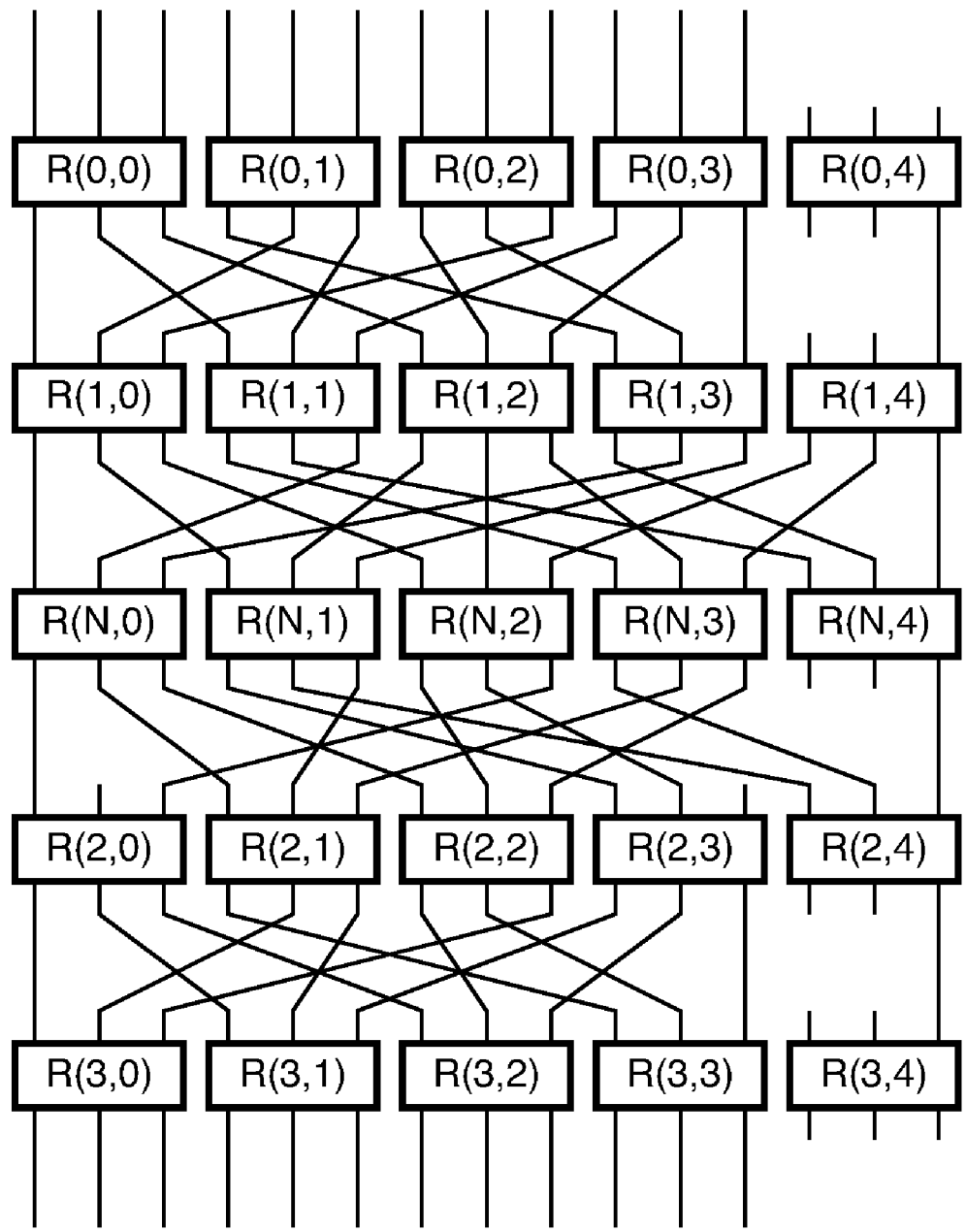
FIG. 10B and 10C are diagrams showing the resultant network after the first and second rewire phases shown in the '874 application.
Figure 10C:
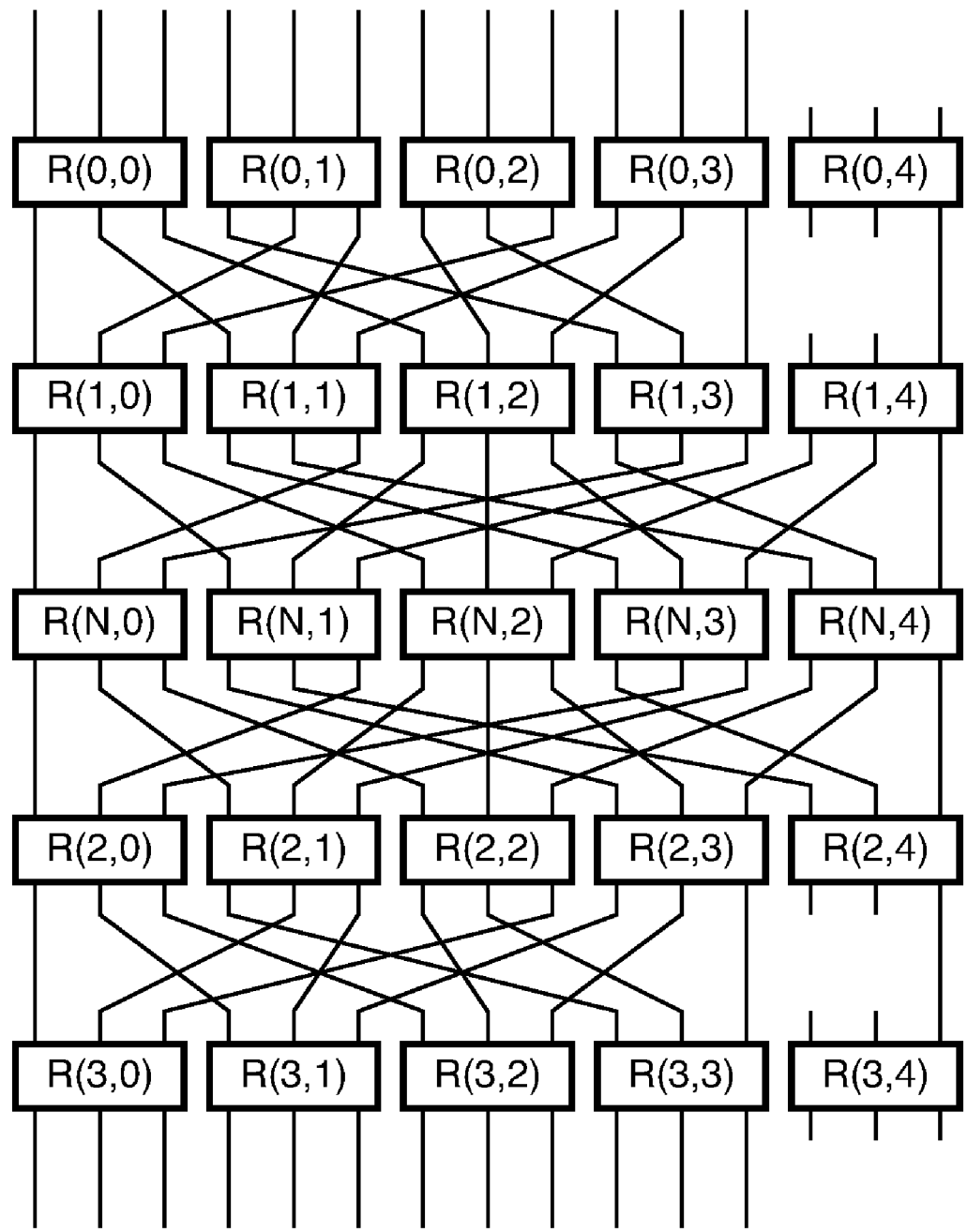

In the '874 application, Lu and Huang use the same example to demonstrate a simultaneous width and stage upgrade. FIG. 10A shows the result of the splicing phase which corresponds to the first phase of the stage upgrade procedure of the '263 application. FIG. 10B shows the result of rewiring the interconnection network between stage R(1,*) and stage R(N,*) in accordance with the desired post-upgrade topology, which corresponds to the rewire phase described in the '263 application. FIG. 10C shows the result of rewiring the interconnection network between stage R(N,*) and stage R(2,*). The skilled artisan would note that there are a number of ports, which are disconnected, connected, disconnected and reconnected again, greatly increasing the number of steps required.

Figure 11:
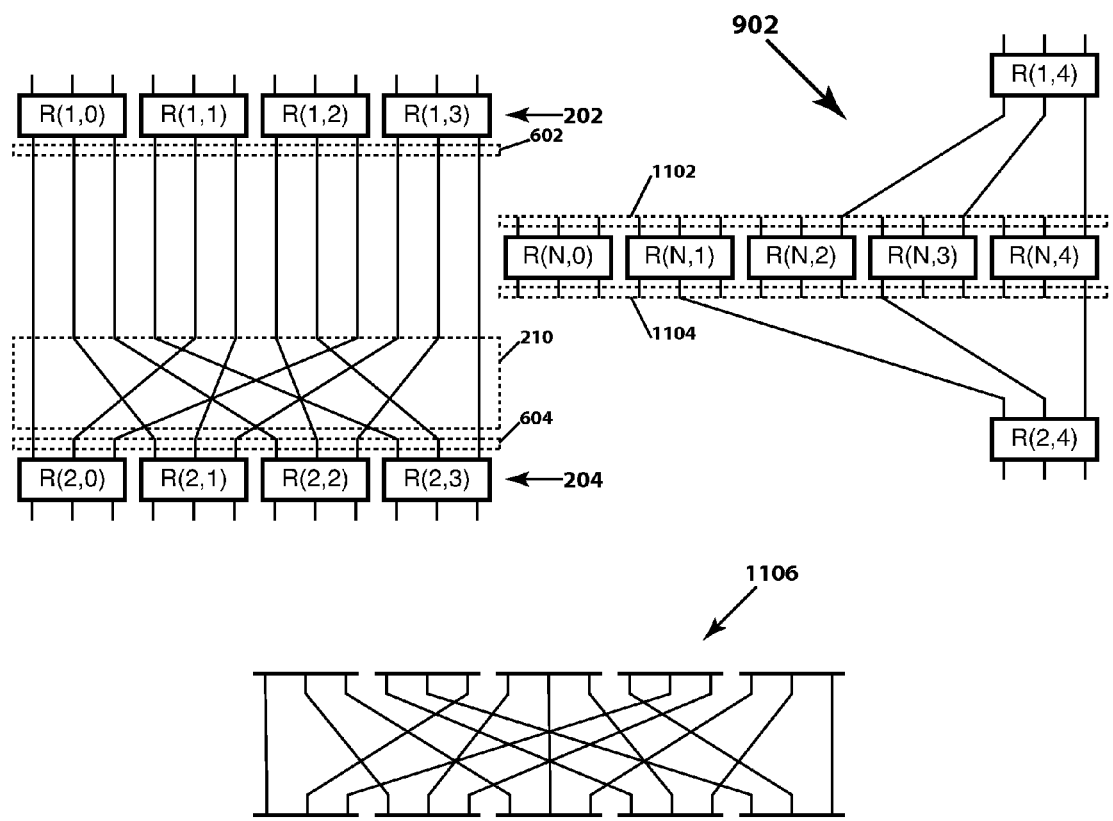
FIG. 11 is a diagram illustrating the relevant components involved in the process of upgrading a 24-port 4-stage RBCCG network to a 30-port 5-stage RBCCG network.

FIG. 11 shows the stages of the 24-port 4-stage RBCCG network, like the one shown in FIG. 2A, relevant portions of new hardware 902, and interconnection network template 1106 involved in the upgrade. Ports 602 are referred to as bottom ports of upper_stage, ports 604 are referred to as top ports of lower_stage, ports 1102 are referred to as top ports of inserted_stages, ports 1104 are referred to as the bottom ports of inserted_stages. Template 1106 shows the desired post-upgrade topology of both the interconnection network above and below stage R(N,*). It should be noted that since a simultaneous width and stage upgrade is taking place template 1106 does not match the topology of interconnection network 210, unlike the example of FIG. 6.

Since the topology of both the interconnection network below and above inserted_stages is changed, care must be taken in selecting the bottom port of upper_stage. The criteria for the selection of the port is based on its impact to the current topology of the network. To simplify the description of the criteria, the term iterating on a selection means the result of disconnecting the connection connected to the selected port, connecting the selected port to a port of inserted_stages in accordance with the desired post-upgrade topology, and connecting the port that was connected to the selected port to a port of inserted_stages in accordance with the desired post-upgrade topology. This term corresponds to a complete iteration of the process outlined in FIG. 7B.

The six selection criteria used in this example are listed below.

Criterion 1: Iterating on the selected bottom port creates two connections to the same switching element in stage R(N,*). Meeting criterion 1, insures that the topology will not effectively change when iterating on the selection of the bottom port. In the terms of FIG. 7B, a bottom port meets criterion 1 if mid_top_port and mid_bottom_port belong to the same switching element.

Criterion 2: Iterating on the selected bottom port creates a connection to a switching element in stage R(N,*) with connections using one side of the switching element (that is uses only top ports or bottom ports) and where the new connection connects to a port on the opposite side of the switching element to the ports used by the existing connections. For example, if only top port 3 of switching element R(N,2) is connected and iterating on a selected bottom port of R(*,1) would produce a connection to a bottom port of switching element R(N,2). That selected bottom port would meet criterion 2. This insures that we limit the number of "dead end" switching elements.

Criterion 3: Iterating on the selected bottom port creates a connection to a switching element in stage R(N,*) having four or fewer connections where the number of top ports used exceeds the number of bottom ports used or vice versa and where the new connection connects to a port on the opposite side of the switching element to the side used by the majority of the ports used by the existing connections. For example, if only two top ports and one bottom of switching element R(N,3) are connected and iterating on selected bottom port of R(*,1) would produce a connection to a bottom port of switching element R(N,3). That selected bottom port meet criterion 3. Basically, where the new connection created tends to balance out the port usage on an inserted switching element.

Criterion 4: Iterating on the selected bottom port creates a connection to a switching element in stage R(N,*) having exactly two existing connections.

Criterion 5: Iterating on the selected bottom port creates a connection to a switching element in stage R(N,*) having exactly four existing connections.

Criterion 6: Any bottom port of upper_stage.

It is worth noting that these six criteria can be extended to arbitrary fanouts. The highest priority criterion selects bottom ports that when iterated introduce connections to the same switching element in the inserted stage. The next priority criterion are bottom ports when iterated introduce connections which tend to balance both sides of switching elements in terms of connected ports. The next priority which can be intermingled with the preceding one are bottom port when iterated introduce connections to switching elements with the fewest number of connections.

The above criteria work best when a single stage is inserted. For multiple stage insertion, it is likely simpler criteria can be used since between these stages interconnection networks should be preconfigured prior to performing the stage upgrade. These preconfigured connections can introduce a great deal of path redundancy during the upgrade process. For the following example, after each iteration, the connections created in that iteration are depicted in the sequences of figures with bold connections.

Figure 12A:
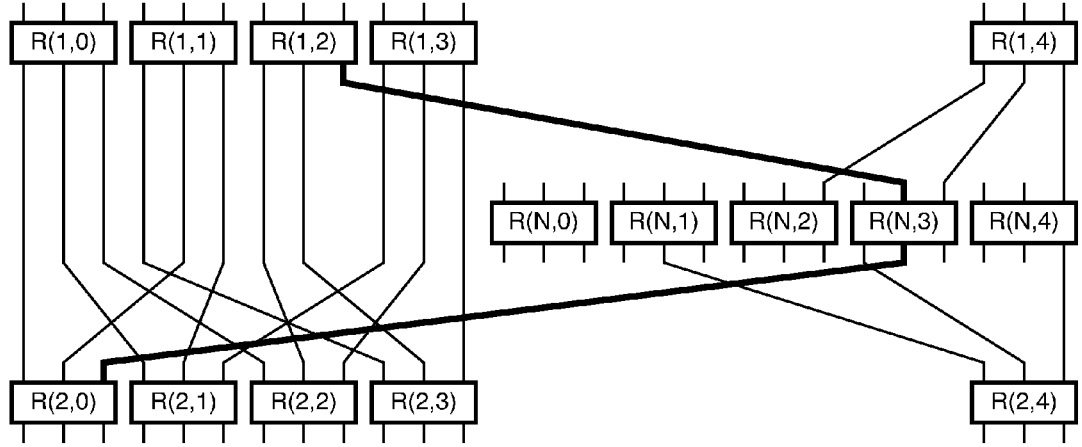

In FIG. 12A, bottom port 2 of switching element R(1,2) is selected because iterating on the selection of bottom port 2 of switching element R(1,2) produces a connection to top port 1 of switching element R(N,3) and a connection to bottom port 1 of switching element R(N,3) meeting criterion 1. The connection between bottom port 2 of switching element R(1,2) and top port 2 of switching element R(2,0) is disconnected. In accordance with the interconnection network of desired post-upgrade topology above stage R(N,*) shown with template 1106, a connection is made between top port 2 of switching element R(2,0) and bottom port 1 of switching, element R(N,3) is made. In accordance with the interconnection network of desired post-upgrade topology below stage R(N,*) also shown with template 1106, a connection is made between bottom port 2 of switching element R(1,2) and top port 1 of switching element R(N,3).

Figure 12B:
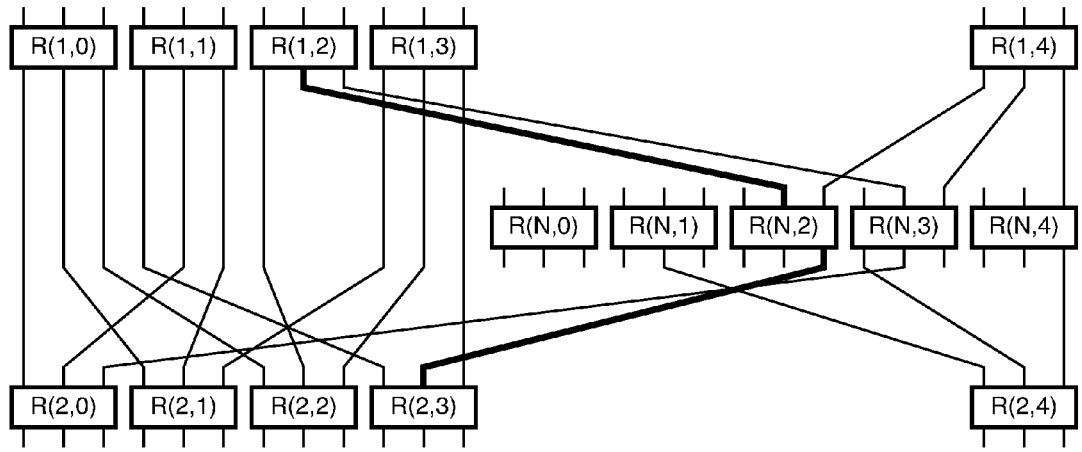

In FIG. 12B, bottom port 1 of switching element R(1,2) is selected because it because iterating on the selection of bottom port 1 of switching element R(1,2) produces a connection to top port 1 of switching element R(N,2) and a connection to bottom port 2 of switching element R(N,2) meeting criterion 1. The connection between bottom port 1 of switching element R(1,2) and top port 1 of switching element R(2,3) is disconnected. In accordance with the interconnection network of desired post-upgrade topology above stage R(N,*) shown with template 1106, a connection is made between top port 1 of switching element R(2,3) and bottom port 2 of switching element R(N,2) is made. In accordance with the interconnection network of desired post-upgrade topology below stage R(N,*) also shown with template 1106, a connection is made between bottom port 1 of switching element R(1,2) and top port 1 of switching element R(N,2).

Figure 12C:
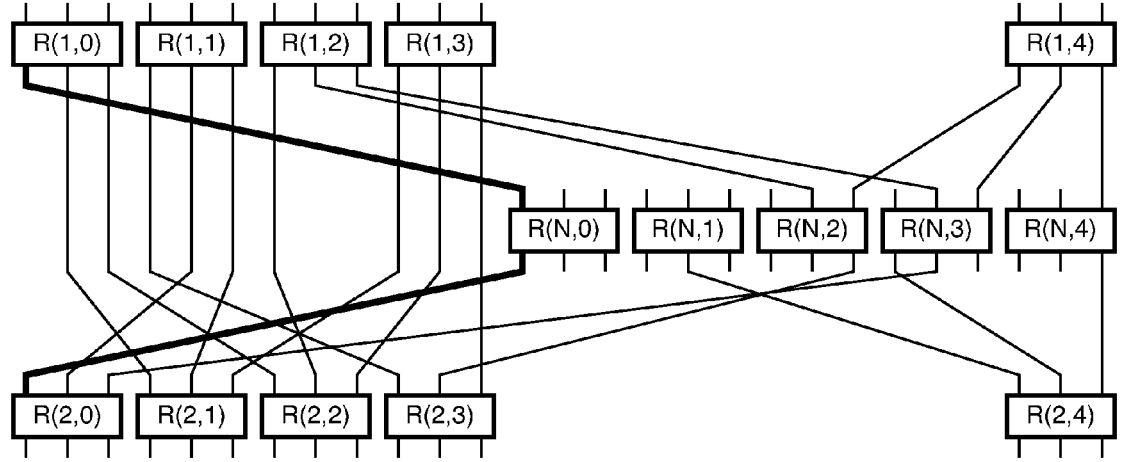

In FIG. 12C, bottom port 0 of switching element R(1,0) is selected because it because iterating on the selection of bottom port 0 of switching element R(1,0) produces a connection to top port 0 of switching element R(N,0) and a connection to bottom port 0 of switching element R(N,0) meeting criterion 1. The connection between bottom port 0 of switching element R(1,0) and top port 0 of switching element R(2,0) is disconnected. In accordance with the interconnection network of desired post-upgrade topology above stage R(N,*) shown with template 1106, a connection is made between top port 0 of switching element R(2,0) and bottom port 0 of switching element R(N,0). In accordance with the interconnection network of desired post-upgrade topology below stage R(N,*) also shown with template 1106, a connection is made between bottom port 0 of switching element R(1,0) and top port 0 of switching element R(N,0) is made.

Figure 12D:
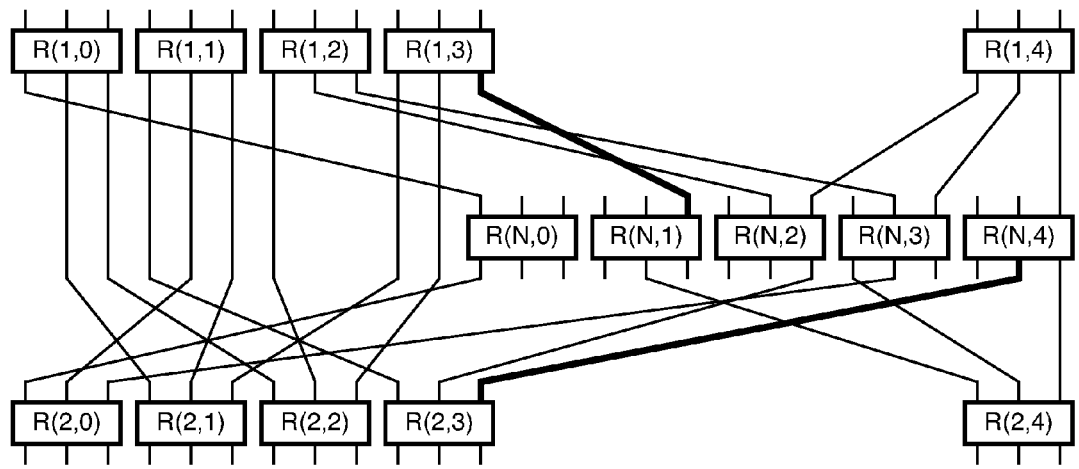

No more ports meet criterion 1. In FIG. 12D, bottom port 2 of switching element R(1,3) is selected because switching element R(N,1) has one connection using bottom port 1. Iterating on the selection of bottom port 2 of switching element R(1,3) produces a connection to top port 2 of switching element R(N,1) meeting criterion 2. The connection between bottom port 2 of switching element R(1,3) and top port 2 of switching element R(2,3) is disconnected. In accordance with the interconnection network of desired post-upgrade topology above stage R(N,*) shown with template 1106, a connection is made between top port 2 of switching element R(2,3) and bottom port 1 of switching element R(N,4) is made. In accordance with the interconnection network of desired post-upgrade topology below stage R(N,*) also shown with template 1106, a connection is made between bottom port 2 of switching element R(1,3) and top port 2 of switching element R(N, 1).

Figure 12E:
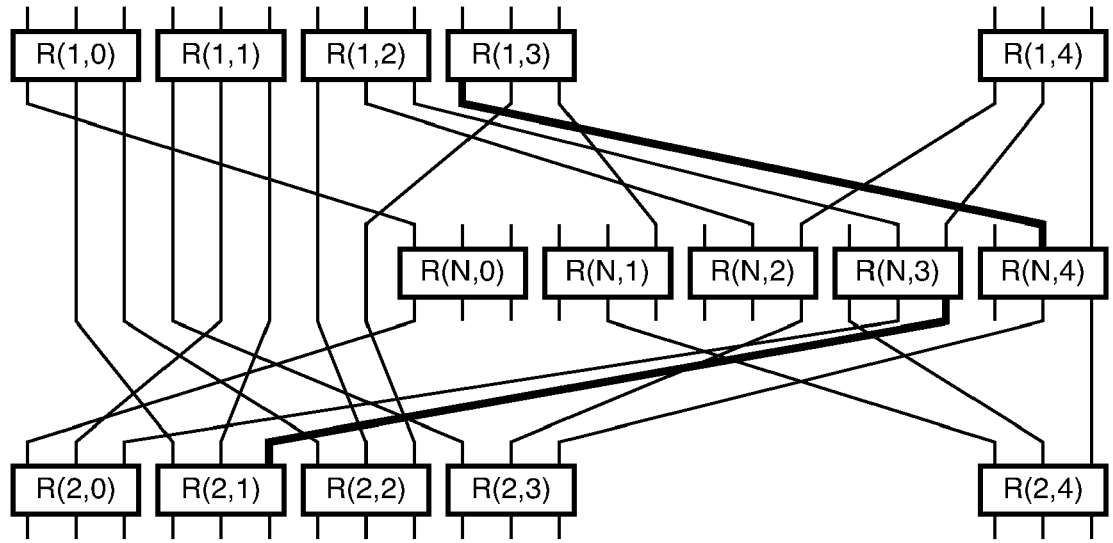

No more ports meet criterion 2. In FIG. 12E, bottom port 0 of switching element R(1,3) is selected because switching element R(N,4) has one top port in use and two bottom ports in use. Iteration on the selection of bottom port 0 of switching element R(1,3) produces a connection to top port 1 of switching element R(N,4) meeting criterion 3. The connection between bottom port 0 of switching element R(1,3) and top port 2 of switching element R(2,1) is disconnected. In accordance with the interconnection network of desired post-upgrade topology above stage R(N,*) shown with template 1106, a connection is made between top port 2 of switching element R(2,1) and bottom port 2 of switching element R(N, 3) is made. In accordance with the interconnection network of desired post-upgrade topology below stage R(N,*) also shown with template 1106, a connection is made between bottom port 0 of switching element R(1,3) and top port 1 of switching element R(N,4).

Figure 12F:
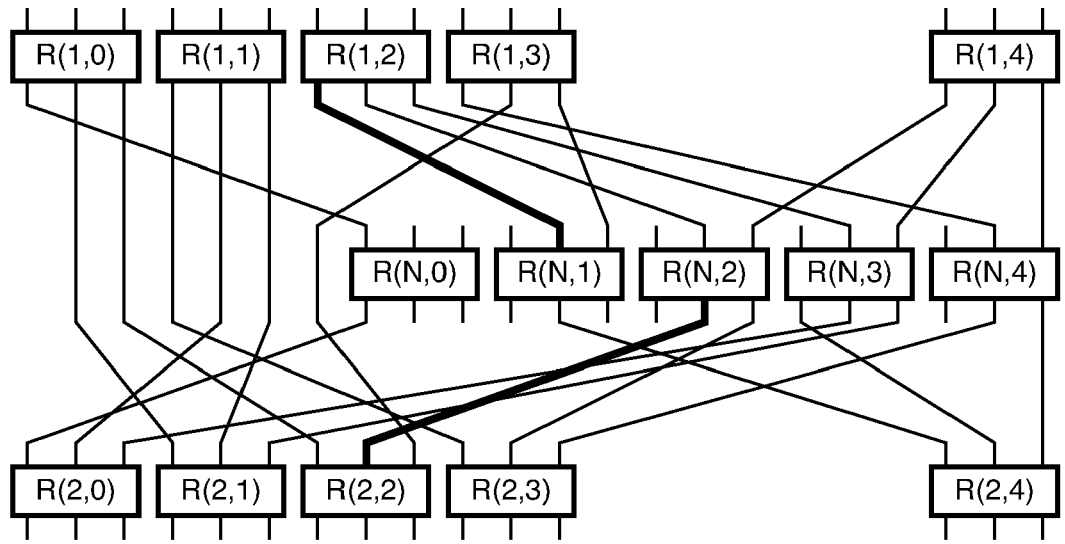

In FIG. 12F, bottom port 0 of switching element R(1,2) is selected because switching element R(N,2) has one two ports in use and one bottom port in use. Iteration on the selection of bottom port 0 of switching element R(1,2) produces a connection to bottom port 1 of switching element R(N,2) meeting criterion 3. The connection between bottom port 0 of switching element R(1,2) and top port 1 of switching element R(2,2) is disconnected. In accordance with the interconnection network of desired post-upgrade. topology above stage R(N,*) shown with template 1106, a connection is made between top port 1 of switching element R(2,2) and bottom port 1 of switching element R(N,2) is made. In accordance with the interconnection network of desired post-upgrade topology below stage R(N,*) also shown with template 1106, a connection is made between bottom port 0 of switching element R(1,2) and top port 1 of switching element R(N,1).

Figure 12G:
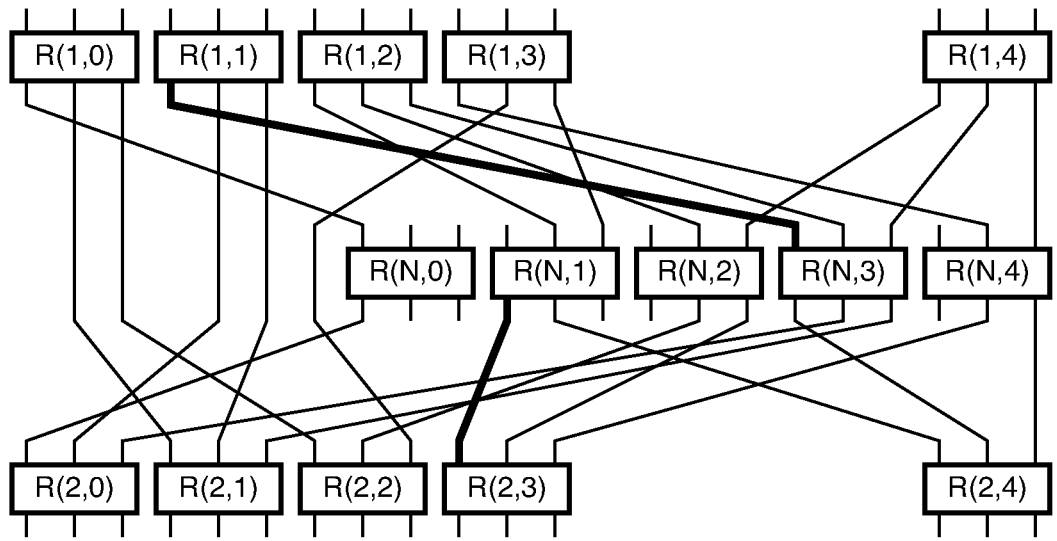

In FIG. 12G, bottom port 0 of switching element R(1,1) is selected because switching element R(N,1) has two top ports in used and one bottom port in used. Iteration on the selection of bottom port 0 of switching element R(1,1) produces a connection to bottom port 0 of switching element R(N,1) meeting criterion 3. The connection between bottom port 0 of switching element R(1,1) and top port 0 of switching element R(2,3) is disconnected. In accordance with the interconnection network of desired post-upgrade topology above stage R(N,*) shown with template 1106, a connection is made between top port 0 of switching element R(2,3) and bottom port 0 of switching element R(N,1) is made. In accordance with the interconnection network of desired post-upgrade topology below stage R(N,*) also shown with template 1106, a connection is made between bottom port 0 of switching element R(1,1) and top port 0 of switching element R(N,3).

Figure 12H:
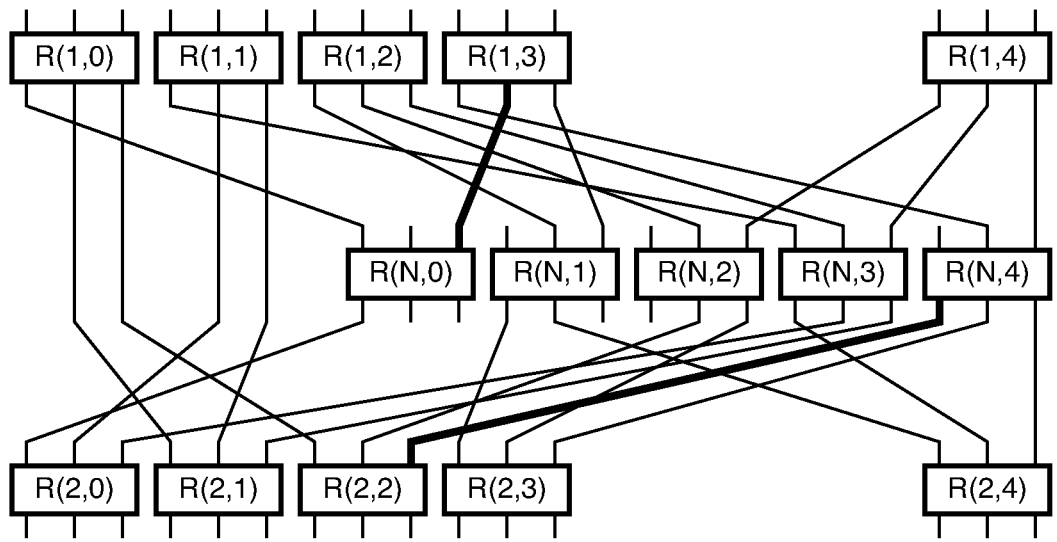

No more ports meet criterion 3. In FIG. 12H, bottom port 1 of switching element R(1,3) is selected because switching element R(N,0) has exactly two ports in use. Iteration on the selection of bottom port 1 of switching element R(1,3) produces a connection to top port 2 of switching element R(N,0) meeting criterion 4. The connection between bottom port 1 of switching element R(1,3) and top port 2 of switching element R(2,2) is disconnected. In accordance with the interconnection network of desired post-upgrade topology above stage R(N,*) shown with template 1106, a connection is made between top port 2 of switching element R(2,2) and bottom port 0 of switching element R(N,4) is made. In accordance with the interconnection network of desired post-upgrade topology below stage R(N,*) also shown with template 1106, a connection is made between bottom port 1 of switching element R(1,3) and top port 2 of switching element R(N,0).

Figure 12I:
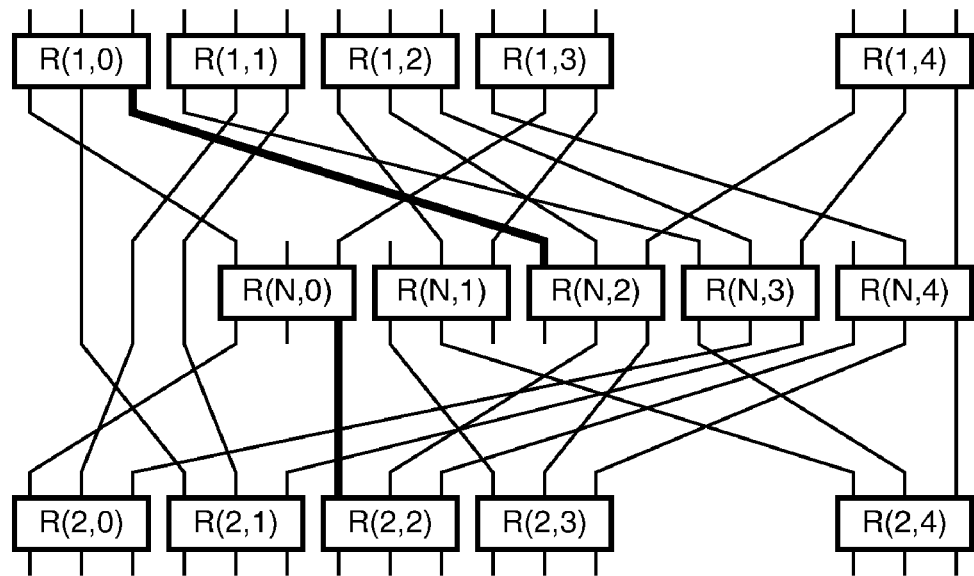

In FIG. 12I, because of the previous step, bottom port 2 of switching element R(1,0) meets criterion 3 because switching element R(N,0) has two top ports in use and one bottom port in used. Iteration on the selection of bottom port 2 of switching element R(1,0) produces a connection to bottom port 2 of switching element R(N,0) meeting criterion 3. The connection between bottom port 2 of switching element R(1,0) and top port 0 of switching element R(2,2) is disconnected. In accordance with the interconnection network of desired post-upgrade topology above stage R(N,*) shown with template 1106, a connection is made between top port 0 of switching element R(2,2) and bottom port 2 of switching element R(N,0) is made. In accordance with the interconnection network of desired post-upgrade topology below stage R(N,*) also shown with template 1106, a connection is made between bottom port 2 of switching element R(1,0) and top port 0 of switching element R(N,2).

Figure 12J:
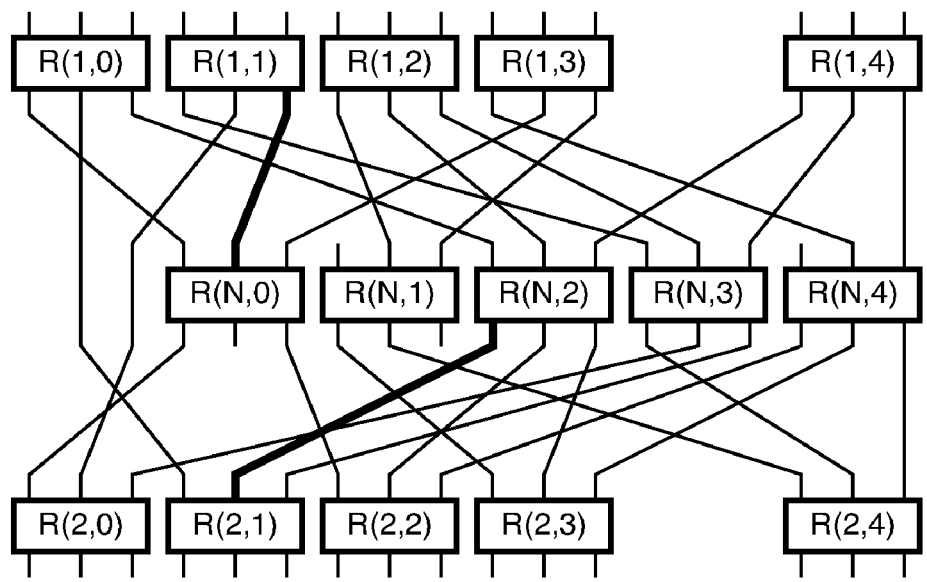

No more ports meet criterion 3 or 4. In FIG. 12J bottom port 2 of switching element R(1,1) is selected because switching element R(N,0) has exactly four ports in use. Iteration on the selection of bottom port 2 of switching element R(1,1) produces a connection to top port 1 of switching element R(N,0) meeting criterion 5. The connection between bottom port 2 of switching element R(1,1) and top port 1 of switching element R(2,1) is disconnected. In accordance with the interconnection network of desired post-upgrade topology above stage R(N,*) shown with template 1106, a connection is made between top port 1 of switching element R(2,1) and bottom port 0 of switching element R(N,2) is made. In accordance with the interconnection network of desired post-upgrade topology below stage R(N,*) also shown with template 1106, a connection is made between bottom port 2 of switching element R(1,1) and top port 1 of switching element R(N,0).

No more ports meet criteria 1-5. In FIG. 12K bottom port 1 of switching element R(1,1) is selected meeting criterion 6. The connection between bottom port 1 of switching element R(1,1) and top port 1 of switching element R(2,0) is disconnected. In accordance with the interconnection network of desired post-upgrade topology above stage R(N,*) shown with template 1106, a connection is made between top port 1 of switching element R(2,0) and bottom port 2 of switching element R(N,1) is made. In accordance with the interconnection network of desired post-upgrade topology below stage R(N,*) also shown with template 1106, a connection is made between bottom port 1 of switching element R(1,1) and top port 0 of switching element R(N,4).

No more ports meet criteria 1-5. In FIG. 12L bottom port 1 of switching element R(1,0) is selected meeting criterion 6. The connection between bottom port 1 of switching element R(1,0) and top port 0 of switching element R(2,1) is disconnected. In accordance with the interconnection network of desired post-upgrade topology above stage R(N,*) shown with template 1106, a connection is made between top port 0 of switching element R(2,1) and bottom port 1 of switching element R(N,0) is made. In accordance with the interconnection network of desired post-upgrade topology below stage R(N,*) also shown with template 1106, a connection is made between bottom port 1 of switching element R(1,0) and top port 0 of switching element R(N,1).

Figure 13:
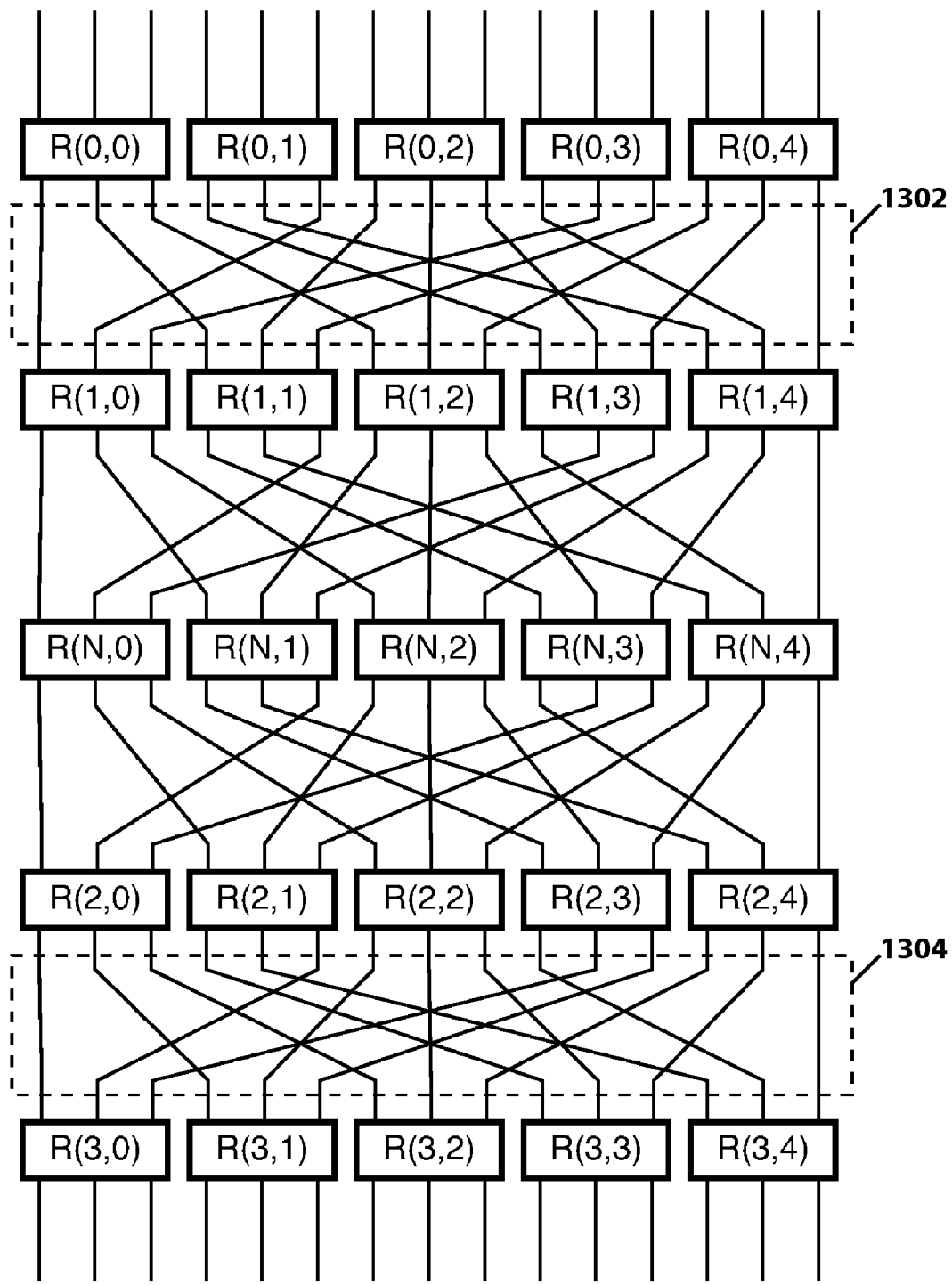
FIG. 13 is a diagram showing a fully upgraded 30-port 5-stage RBCCG network.

This completes the stage upgrade or splicing phase of the upgrade procedure in accordance with the new algorithm flowcharted in FIG. 7A and 7B. This results in the same topology as shown in FIG. 10C. It is clear from FIG. 12L that interconnection network 1202 and interconnection network 1204 need to be rewired into the desired post-upgrade topology. Any of the rewiring algorithms taught by Lu and Huang in the '874 application can now be applied to interconnection network 1202 and 1204 resulting in interconnection networks 1302 and 1304 respectively. FIG. 13 shows a completely upgraded 30-port 5-stage RBCCG network. Finally, any new external ports can be activated such as the top ports of switching element R(0,4) and the bottom ports of switching element R(3,4). While traffic can be passed through those ports during the upgrade, it is not recommended since until the upgrade is complete, the connectivity to and from those new external ports will be limited. This example illustrates how the stage upgrade disclosed can be integrated into a more complex upgrade procedure by replacing the splicing phase described by Lu and Huang in the '874 application.

It is worth noting that the six criteria enumerated above is one of countless possibilities As is seen below, different upgrades can call for different criteria. Although generally, criterion 1 or variations of it has proven to provide a method of increasing the redundancy in intermediate topologies during an upgrade with minimal impact on network traffic.

Figure 14A:
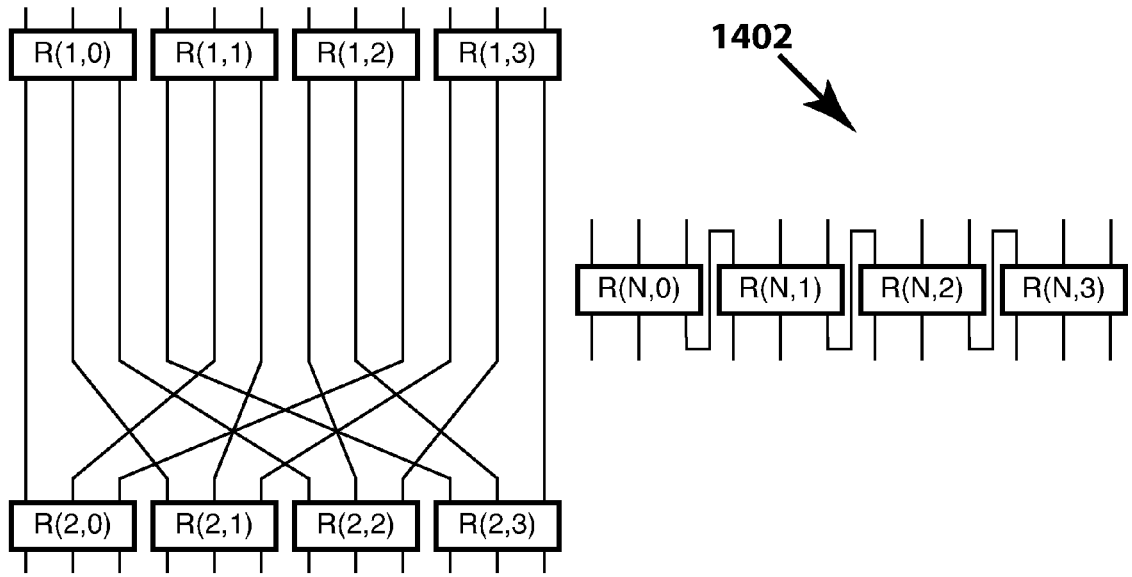
FIGS. 14A-14J is a sequence of diagrams showing intermediate topologies that occur during another example of a stage upgrade procedure from a 24-port 4-stage RBCCG network to a 24-port 5-stage RBCCG network where sacrificial connections are made to the inserted hardware prior to performing the upgrade.

Returning to the example of an upgrade from a 24-port 4-stage RBCCG network to a 24-port 5-stage RBCCG network of FIG. 6. The amount of connectivity within the new hardware is zero. As shown in FIG. 14A, one method to insure additional connectivity is to add sacrificial connectivity to the new hardware. For example, new hardware 1402 has the new switching elements chained, that is a new connection is added between adjacent switching elements. For example, bottom port 2 of switching element R(N,0) is connected to top port 0 of switching element R(N,1).

The selection criterion for this example is as follows. Criterion 1 is as above where iteration on the selection leads to new connections to the same switching element without the need for breaking a sacrificial connection. An extension to this could be that if the new connections preserve the original connectivity through a sacrificial path, the extension to the criterion is met. However, because the sacrificial connections will ultimately be broken, the criterion extension is not used. Criterion 2 is met if iteration on the selection does not require a sacrificial connection be broken. Criterion 3 is met by any selection.

It should be noted before proceeding to the specifics of the upgrade process, that both the desired interconnection networks above and below R(N,*), in accordance with the desired post-upgrade topology are given by template 620 in FIG. 6.

Figure 14B:
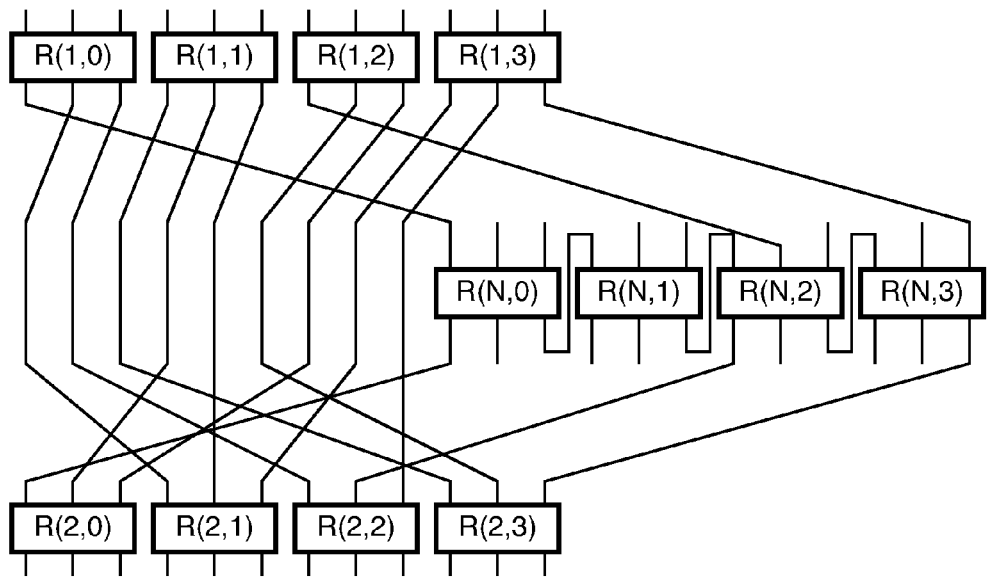

FIG. 14B shows the resultant topology. after iterating on bottom port 0 of switching element R(1,0), bottom port 0 of switching element R(1,2) and bottom port 2 of switching element R(1,3). The three ports meeting criterion 1. The connection between bottom port 2 of switching element R(1,3) and top port 2 of switching element R(2,3) is disconnected. In accordance with the interconnection network of desired post-upgrade topology above stage (N,*) shown with template 620, a connection is made between top port 2 of switching element R(2,3) and bottom port 2 of switching element R(N,3) is made. In accordance with the interconnection network of desired post-upgrade topology below stage R(N,*) also shown with template 620, a connection is made between bottom port 2 of switching element R(1,3) and top port 2 of switching element R(N,3). The connection between bottom port 0 of switching element R(1,2) and top port 1 of switching element R(2,2) is disconnected. In accordance with the interconnection network of desired post-upgrade topology above stage (N,*) shown with template 620, a connection is made between top port 1 of switching element R(2,2) and bottom port 0 of switching element R(N,2) is made. In accordance with the interconnection network of desired post-upgrade topology below stage R(N,*) also shown with template 620, a connection is made between bottom port 0 of switching element R(1,2) and top port 1 of switching element R(N,2). The connection between bottom port 0 of switching element R(1,0) and top port 0 of switching element R(2,0) is disconnected. In accordance with the interconnection network of desired post-upgrade topology above stage (N,*) shown with template 620, a connection is made between top port 0 of switching element R(2,0) and bottom port 0 of switching element R(N,0) is made. In accordance with the interconnection network of desired post-upgrade topology below stage R(N,*) also shown with template 620, a connection is made between bottom port 0 of switching element R(1,0) and top port 0 of switching element R(N,0).

Figure 14C:
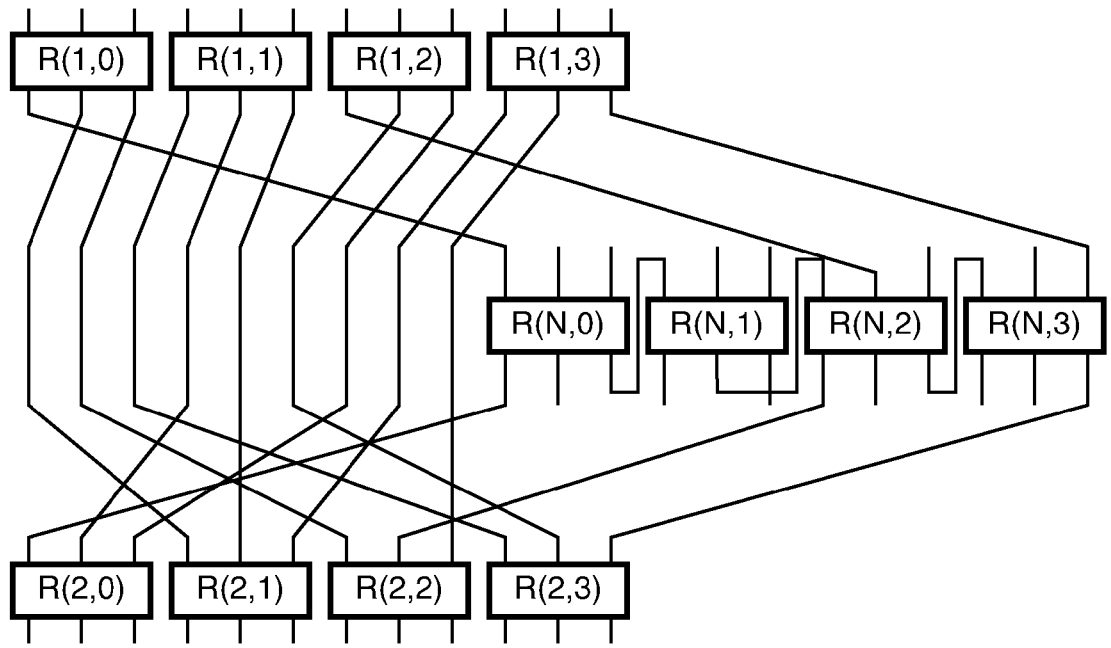

One should note that bottom port 1 of switching element R(1,1) would meet criterion 1 except it would require a connection to be made to port 2 of switching element R(N,1) which currently has a sacrificial connection made to it. There are several alternatives. Bottom port 1 of switching element R(1,1) could just be considered a criterion 2 or 3 port depending on the topology at each stage. One alternative is to pre-connect bottom port 1 of switching element R(N,1) to top port 0 of switching element R(N,2) prior to the upgrade process. Finally, if the port assignments are logical the labels for bottom ports 1 and 2 of switching element R(N,1) can be exchanged. This is discussed in more detail in the '874 application. For this example, the last option is exercised as shown in FIG. 14C.

Figure 14D:
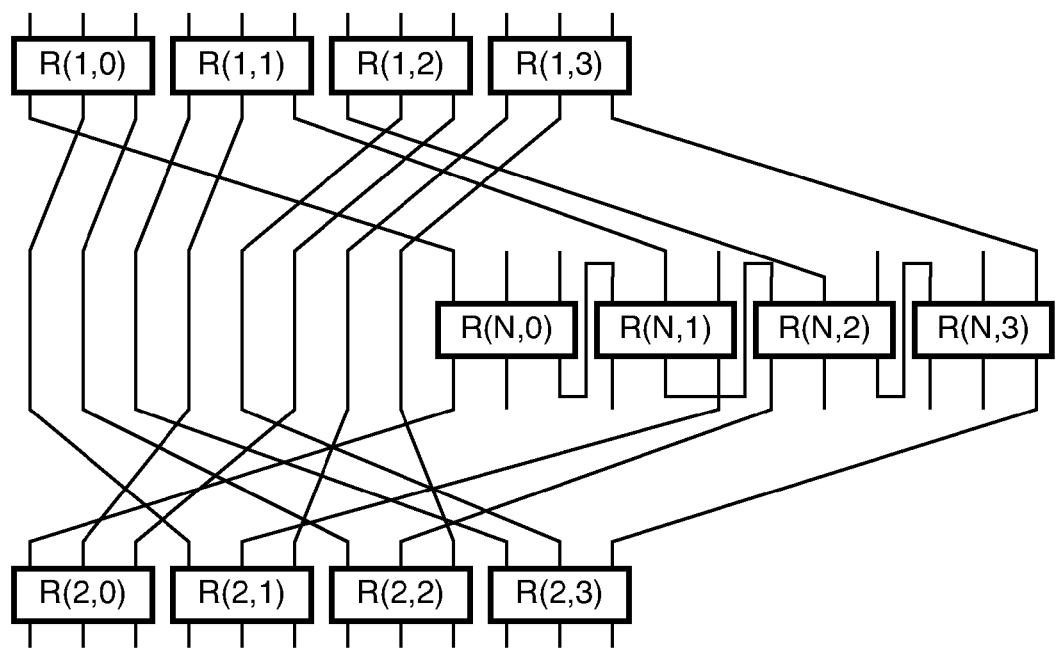

As a result of the relabelling, bottom port 1 of switching element R(1,1) now meets criterion 1. FIG. 14D shows the resultant topology after iterating on bottom port 1 of switching element R(1,1). The connection between bottom port 2 of switching element R(1,1) and top port 1 of switching element R(2,1) is disconnected. In accordance with the interconnection network of desired post-upgrade topology above stage (N,*) shown with template 620, a connection is made between top port 1 of switching element R(2,1) and bottom port 2 of switching element R(N,1) is made. In accordance with the interconnection network of desired post-upgrade topology below stage R(N,*) also shown with template 620, a connection is made between bottom port 2 of switching element R(1,1) and top port 1 of switching element R(N,1).

Figure 14E:
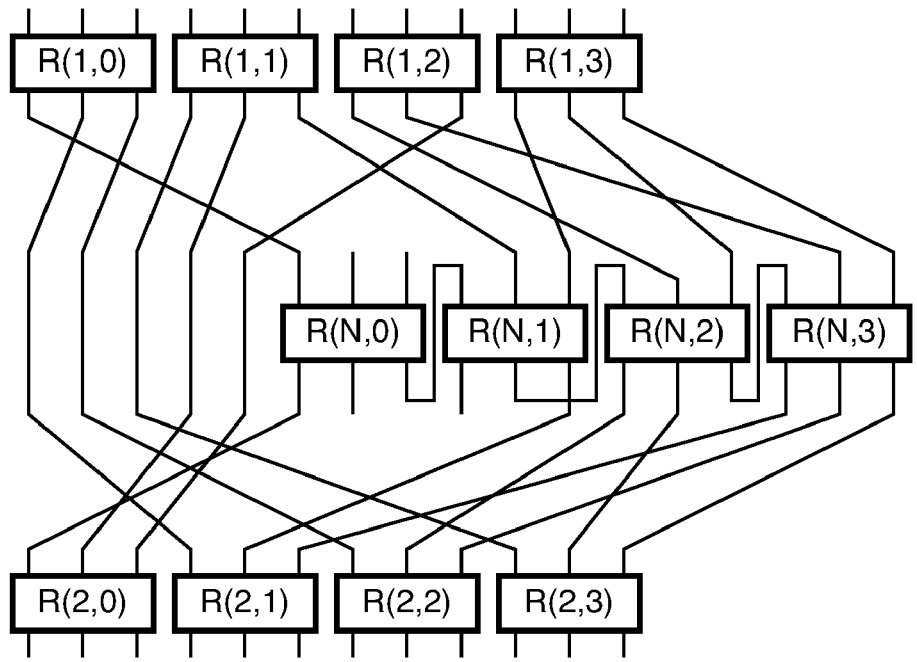
Figure 14F:
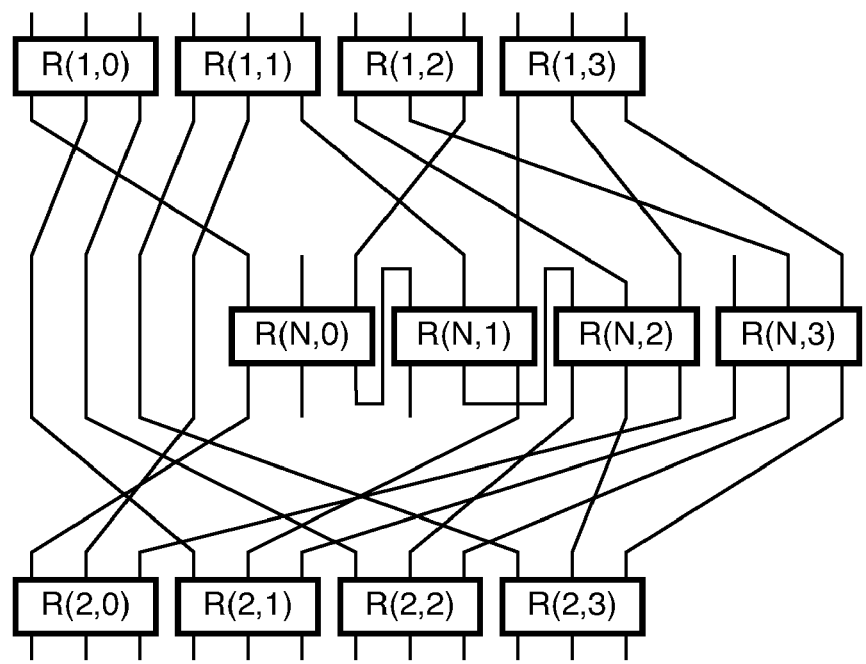

FIG. 14E shows the resultant topology after iterating on bottom ports 0 and 1 of switching element R(1,3) and bottom port 1 of switching element R(1,2), the ports which meets criterion 2. The connection between bottom port 1 of switching element R(1,3) and top port 2 of switching element R(2,2) is disconnected. In accordance with the interconnection network of desired post-upgrade topology above stage (N,*) shown with template 620, a connection is made between top port 2 of switching element R(2,2) and bottom port 1 of switching element R(N,3) is made. In accordance with the interconnection network of desired post-upgrade topology below stage R(N,*) also shown with template 620, a connection is made between bottom port 1 of switching element R(1,3) and top port 2 of switching element R(N,2). The connection between bottom port 0 of switching element R(1,3) and top port 2 of switching element R(2,1) is disconnected. In accordance with the interconnection network of desired post-upgrade topology above stage (N,*) shown with template 620, a connection is made between top port 2 of switching element R(2,1) and bottom port 0 of switching element R(N,3) is made. In accordance with the interconnection network of desired post-upgrade topology below stage R(N,*) also shown with template 620, a connection is made between bottom port 0 of switching element R(1,3) and top port 2 of switching element R(N,1). The connection between bottom port 1 of switching element R(1,2) and top port 1 of switching element R(2,3) is disconnected. In accordance with the interconnection network of desired post-upgrade topology above stage (N,*) shown with template 620, a connection is made between top port 1 of switching element. R(2,3) and bottom port 1 of switching element R(N,2) is made. In accordance with the interconnection network of desired post-upgrade topology below stage R(N,*) also shown with template 620, a connection is made between bottom port 1 of switching element R(1,2) and top port 1 of switching element R(N,3). Since no ports meet criterion 1 or 2, bottom port 2 of switching element R(1,2) is selected. FIG. 14F shows the resultant topology after iterating on the selection. The connection between bottom port 2 of switching element R(1,2) and top port 2 of switching element R(2,0) is disconnected. The sacrificial connection between bottom port 2 of R(N,2) and top port 0 of R(N,3) is also disconnected. In accordance with the interconnection network of desired post-upgrade topology above stage (N,*) shown with template 620, a connection is made between top port 2 of switching element R(2,0) and bottom port 2 of switching element R(N,2) is made. In accordance with the interconnection network of desired post-upgrade topology below stage R(N,*) also shown with template 620, a connection is made between bottom port 2 of switching element R(1,2) and top port 2 of switching element R(N,0).

Figure 14G:
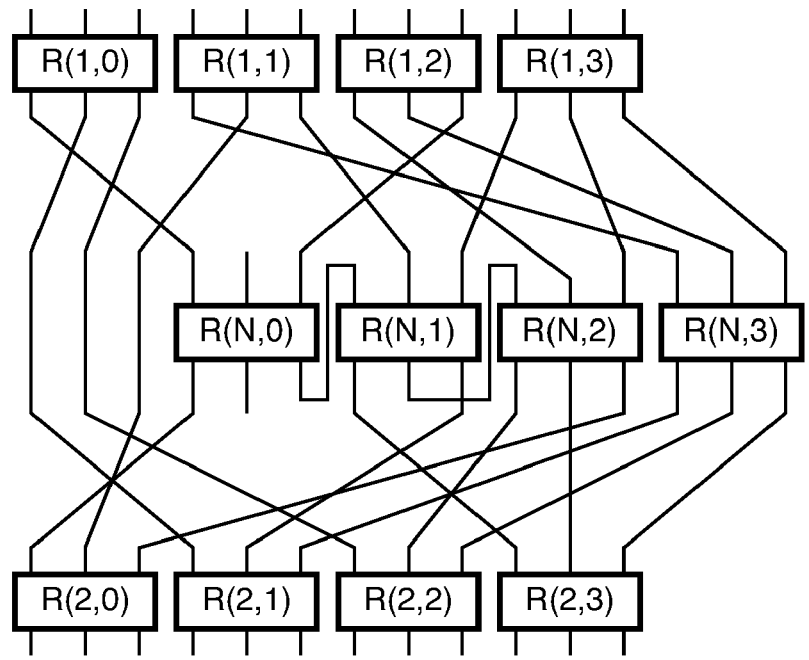

Because of the previous step bottom port 0 of switching element R(1,1) now meets criterion 2. FIG. 14G shows the resultant topology after iterating on bottom port 0 of switching element R(1,1). The connection between bottom port 0 of switching element R(1,1) and top port 0 of switching element R(2,3) is disconnected. In accordance with the interconnection network of desired post-upgrade topology above stage (N,*) shown with template 620, a connection is made between top port 0 of switching element R(2,3) and bottom port 0 of switching element R(N,1) is made. In accordance with the interconnection network of desired post-upgrade topology below stage R(N,*) also shown with template 620, a connection is made between bottom port 0 of switching element R(1,1) and top port 0 of switching element R(N,3).

Figure 14H:
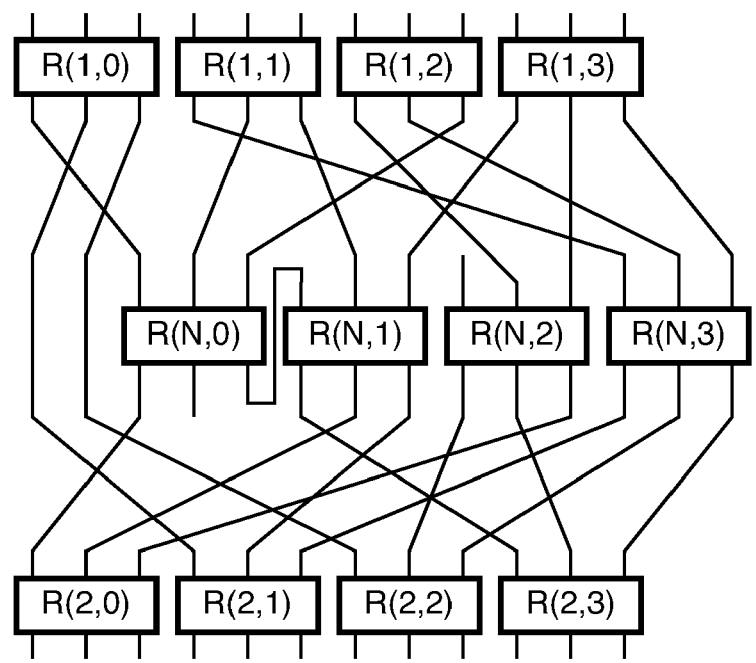

Since no ports meet criterion 1 or 2, bottom port 1 of switching element R(1,1) is selected. FIG. 14H shows the resultant topology after iterating on the selection. The connection between bottom port 1 of switching element R(1,1) and top port 1 of switching element R(2,0) is disconnected. The sacrificial connection between bottom port 1 of R(N,1) and top port 0 of R(N,2) is also disconnected. In accordance with the interconnection network of desired post-upgrade topology above stage (N,*) shown with template 620, a connection is made between top port 1 of switching element R(2,0) and bottom port 1 of switching element R(N,1) is made. In accordance with the interconnection network of desired post-upgrade topology below stage R(N,*) also shown with template 620, a connection is made between bottom port 1 of switching element R(1,1) and top port 1 of switching element R(N,0).

Figure 14I:
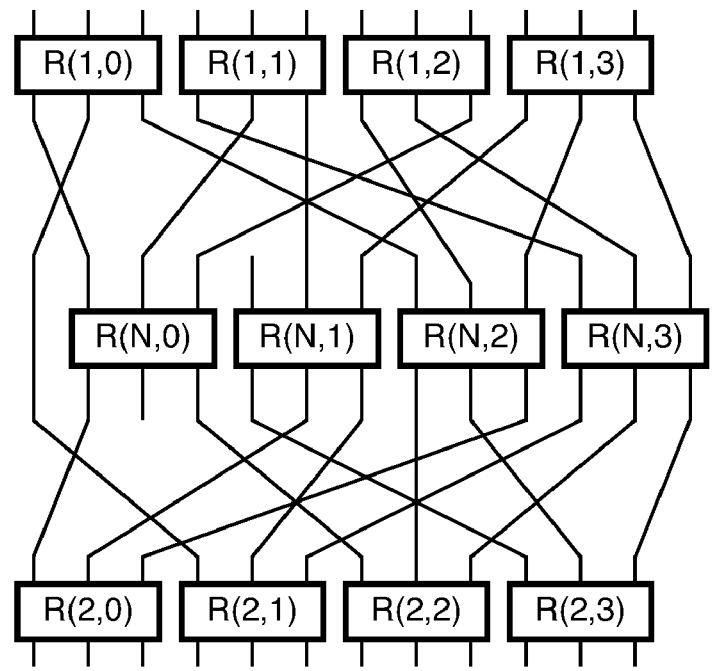

Since no ports meet criterion 1 or 2, bottom port 2 of switching element R(1,0) is selected. FIG. 14I shows the resultant topology after iterating on the selection. The connection between bottom port 2 of switching element R(1,0) and top port 0 of switching element R(2,2) is disconnected. The sacrificial connection between bottom port 2 of R(N,0) and top port 0 of R(N,1) is also disconnected. In accordance with the interconnection network of desired post-upgrade topology above stage (N,*) shown with template 620, a connection is made between top port 0 of switching element R(2,2) and bottom port 2 of switching element R(N,0) is made. In accordance with the interconnection network of desired post-upgrade topology below stage R(N,*) also shown with template 620, a connection is made between bottom port 2 of switching element R(1,0) and top port 0 of switching element R(N,2).

Figure 14J:
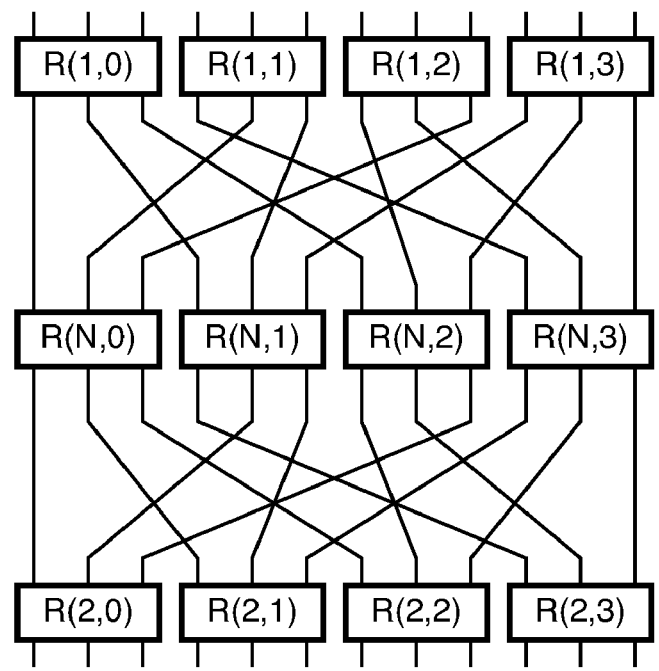

Bottom port 1 of switching element R(1,0) is the last remaining bottom port of switching element R(1,0) to be selected. FIG. 14J shows the completed upgrade after iterating on the selection. The connection between bottom port 1 of switching element R(1,0) and top port 0 of switching element R(2,1) is disconnected. In accordance with the interconnection network of desired post-upgrade topology above stage (N,*) shown with template 620, a connection is made between top port 0 of switching element R(2,1) and bottom port 1 of switching element R(N,*) is made. In accordance with the interconnection network of desired post-upgrade topology below stage R(N,*) also shown with template 620, a connection is made between bottom port 1 of switching element R(1,0) and top port 0 of switching element R(N,1).

Although the sacrificial connections add redundancy during the upgrade process, they do introduce additional connection and disconnection of connections increasing the amount of steps required in the upgrade process. The number of sacrificial connections leads to a tradeoff between the robustness of the network during the upgrade process and complexity of the upgrade process itself.

Figure 15A:
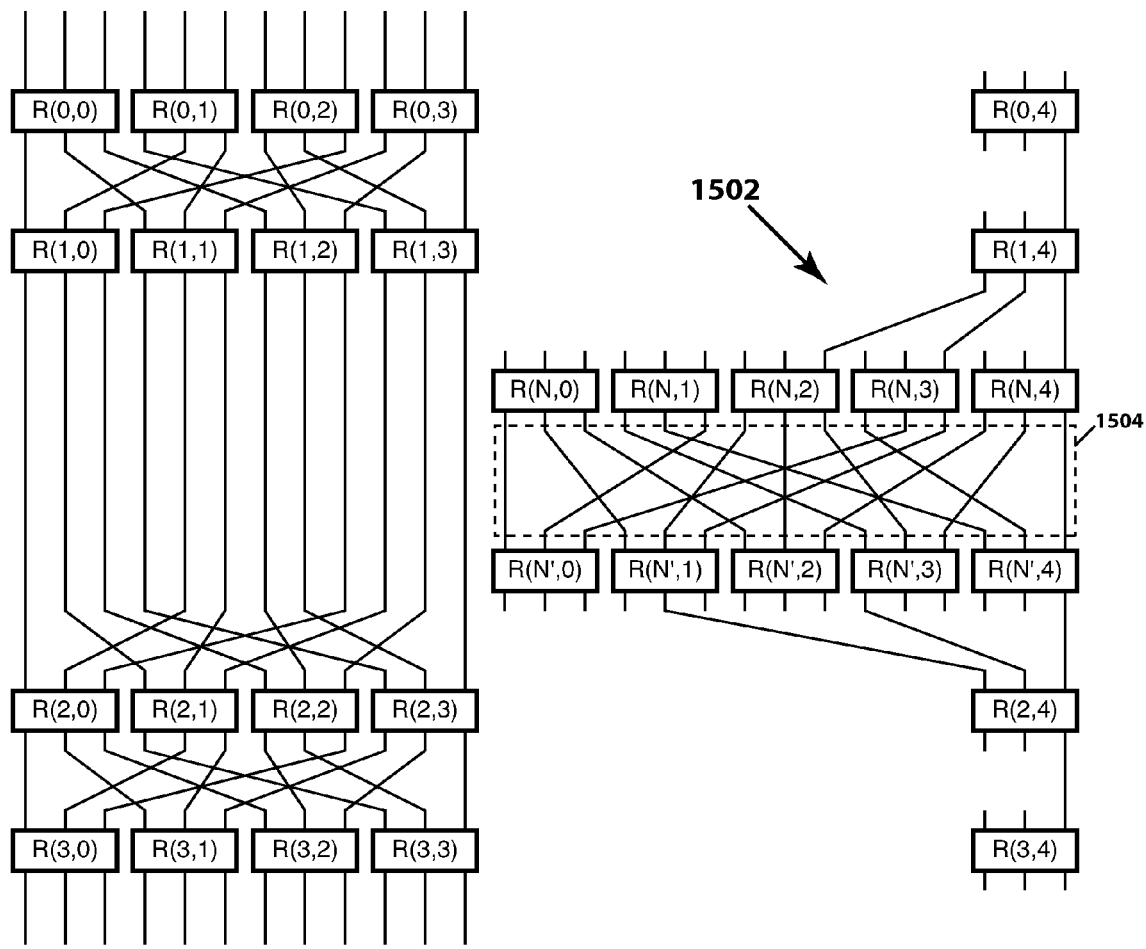
FIG. 15A is a diagram showing a 24-port 4-stage RBCCG network and hardware needed to upgrade it to a 30-port 6-stage RBCCG network.

FIG. 15A depicts a 24-port 4-stage RBCCG network and hardware 1502 needed to upgrade it to a 30-port 6-stage RBCCG network. Hardware 1502 has been preconnected with connections that can be made in accordance with the desired post-upgrade topology. This is described as the preconnecting phase of the '874 application. It should be noted if the preconnections are performed the stage upgrade greater pathwise redundancy exists during the upgrade process leading to better performance of the network as it is being upgraded. One should also note that in this example, interconnection network 1504 between stage R(N,*) and stage R(N',*) is a complete interconnection network as prescribed by the desired post-upgrade topology. Notationally, in this example, the bottom ports of inserted_stages are the bottom ports of stage R(N',*) and the top ports of inserted_stages are the top ports of stage R(N,*).

Detailed step by step description of the overall upgrade procedure is omitted here. A skilled artisan can take the description of the previous examples and derived the necessary steps.

The criteria for the selection of the bottom ports of upper_stage (or the top ports of lower_stage) can differ from the previous criteria. In the previous example, criterion 1 basically selects any connection, which can be broken and rewired "for free", that is after iterating on the selection, the topology preserves the connectivity of the original connection. The extended form of criterion 1 is met by a selected port if after iterating on the selection, the resultant topology preserves the connectivity of the original connection to the selected port. Because of the added interconnection network 1504 in hardware 1502, this extended form of criterion 1 is easier to meet.

Figure 15B:
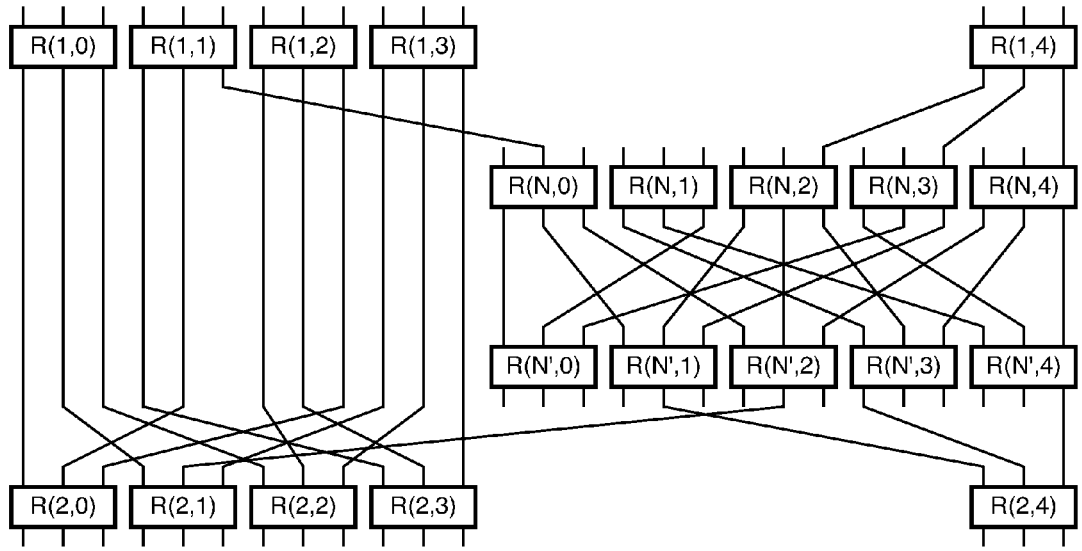
FIGS. 15B and 15C are diagrams showing the result of iterating on two different selection of ports.

For example, there is a connection between bottom port 2 of switching element R(1,1) and top port 1 of switching element R(2,1). FIG. 15B shows the topology resulting from iterating on the selection of bottom port 2 of switching element R(1,1). Bottom port 2 of switching element R(1,1) is now connected to top port 1 of switching element R(N,0) and top port 1 of switching element R(2,1) is connected to switching element R(N',2). However, because of interconnection network 1504, Bottom port 2 of switching element R(1,1) is still indirectly connected to top port 1 of switching element R(2,1), because bottom port 2 of switching, element R(1,1) is connected to top port 1 of switching element R(N,0) and bottom port 2 of switching element R(N,0) is connected to top port 0 of switching element R(N',2) and bottom port 1 of switching element R(N',2) is connected to top port 1 of switching element R(2, 1), thus preserving the original connectivity, hence meeting the extended form of criterion 1.

Figure 15C:
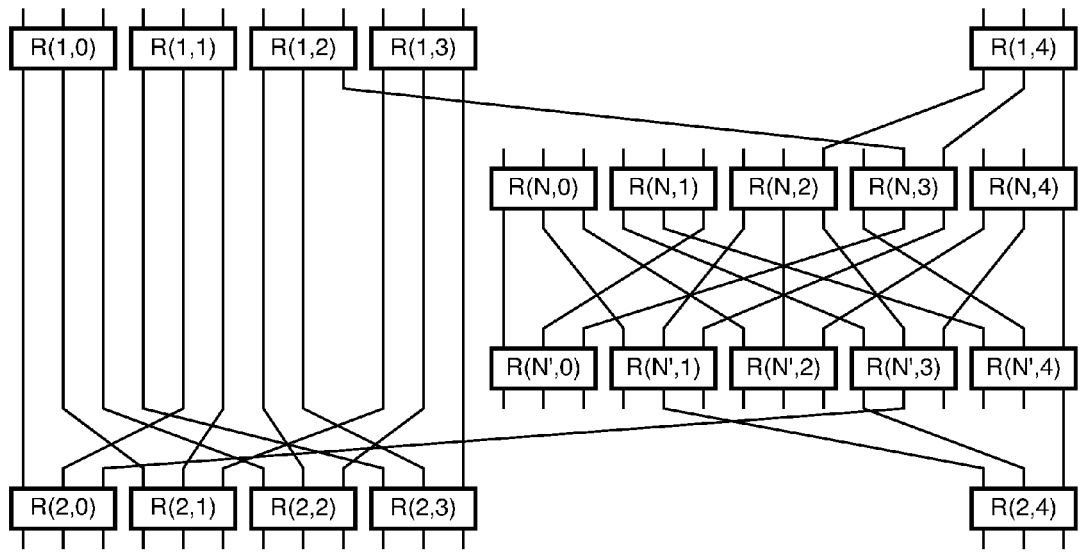

Conversely; FIG. 15C shows the topology resulting from iterating on the selection of bottom port 2 of switching element R(1,2) that is initially connected to top port 2 of switching element R(2,0). Bottom port 2 of switching element R(1, 2) is now connected to top port 1 of switching element R(N,3) and bottom port 1 of switching element R(N',3) is now connected to top port 2 of switching element R(2,0). However, there is no connection between switching element R(N,3) and switching element R(N',3). As iterating on the selection of bottom port 2 of switching element R(1,2) does not preserver the original connectivity between bottom port 2 of switching element R(1,2) and top port 2 of switching element R(2,0) and hence does not meet the extended form of criterion 1.

Generally speaking, all ports meeting criterion 1 or its extended form, collective referred to as "criterion 1 ports," should be selected first, because topologically there is minimal impact by making that selection first. The redundancy of the network increases as the stage upgrade process so that iterating on the selection of all criterion 1 ports leads to a more redundant network for supporting the remaining iterations. Because of the larger number of criterion 1 ports in this example and the redundancy added from interconnection network 1504, after all the iterations on the selection of the criterion 1 ports, the selection of the remaining ports can be arbitrary.

Figure 15D:
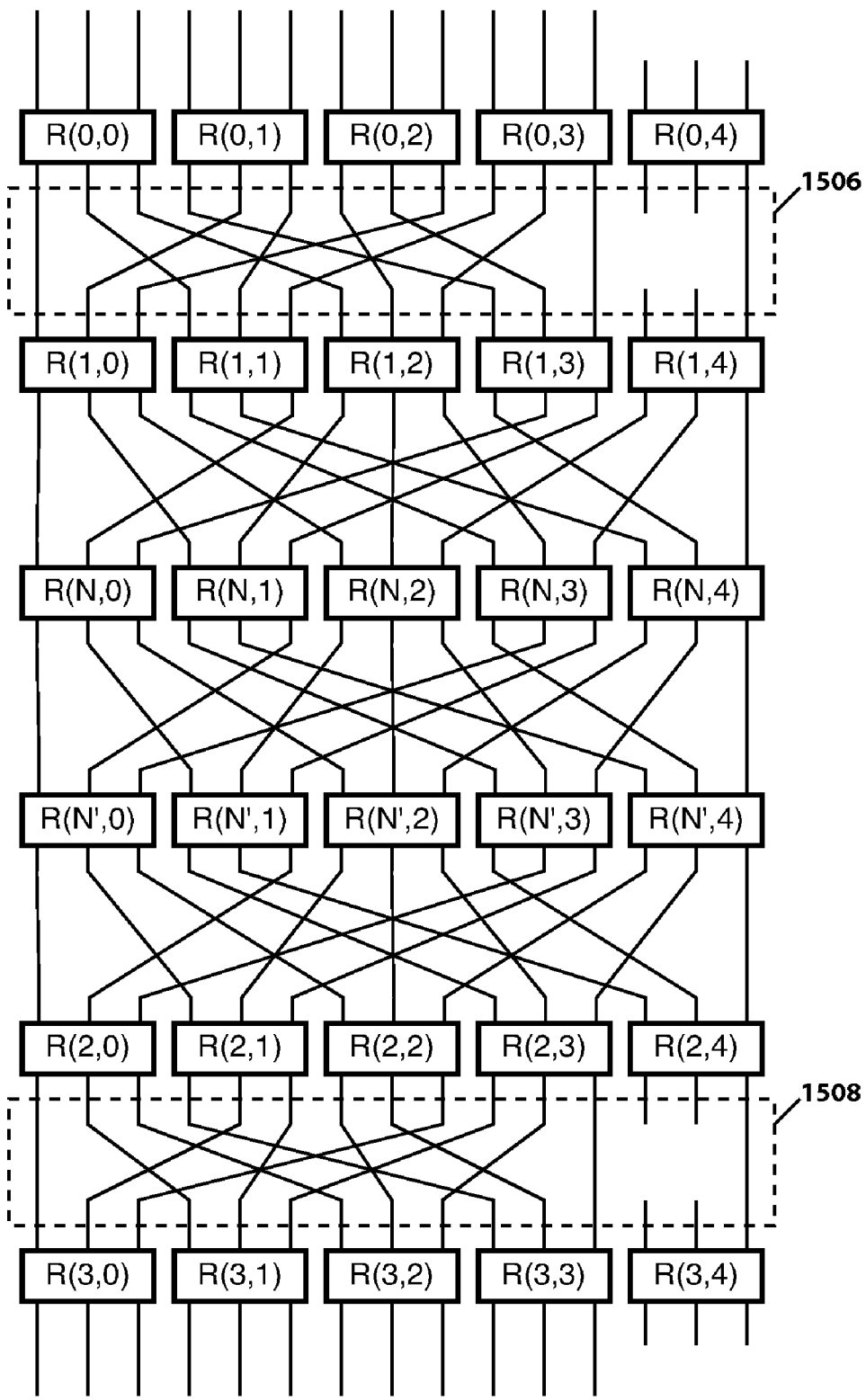
FIG. 15D is a diagram showing. the resultant network after the completion of the stage upgrade process.
Figure 15E:
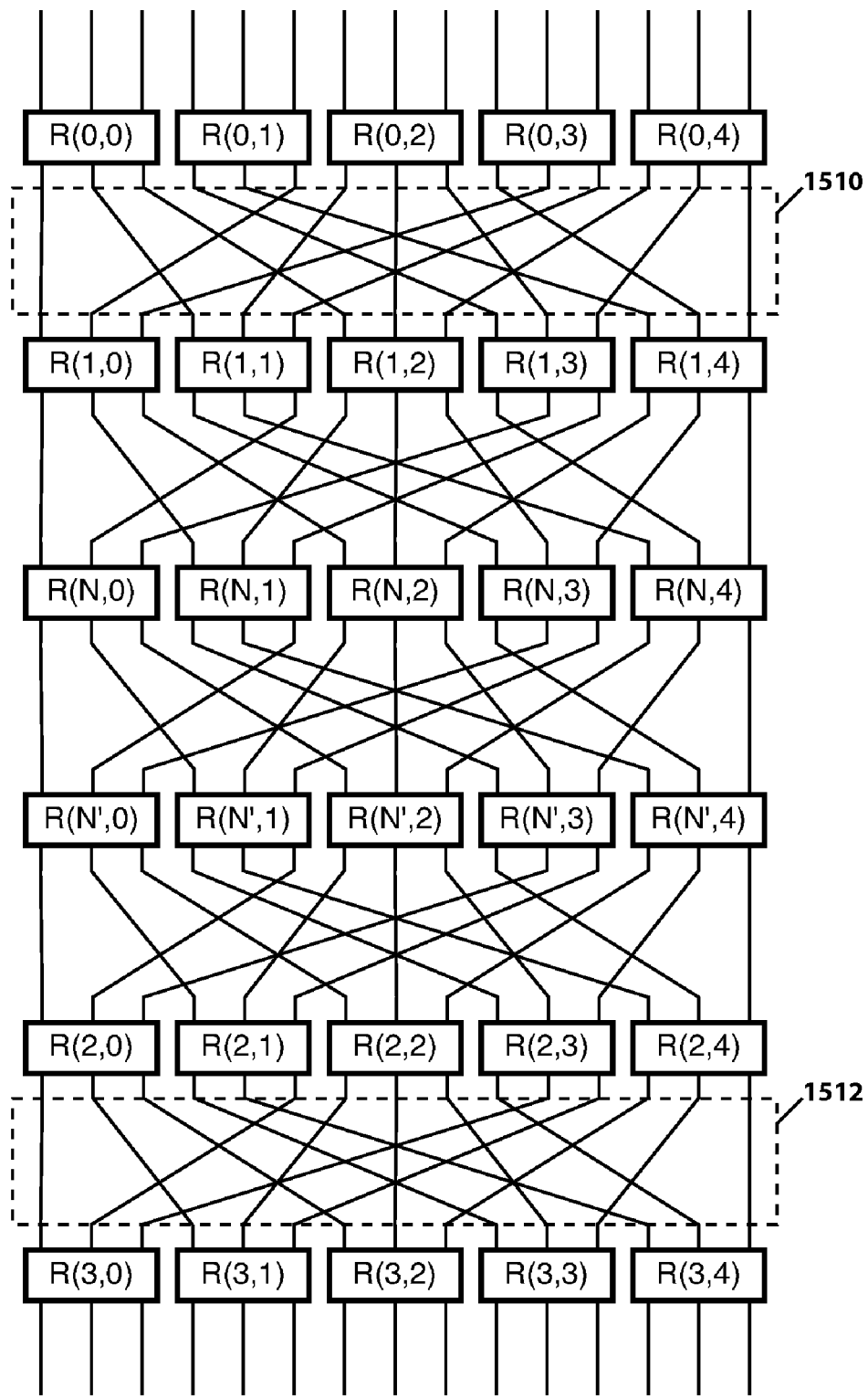
FIG. 15E is a diagram showing a fully upgraded 30-port 6-stage RBCCG network.

FIG. 15D shows the topology upon the conclusion of the stage upgrade or splicing phase. Interconnection networks 1506 and 1508, which were not involved in the stage upgrade, still require rewiring. Rewiring can be performed using a method such as one of the methods disclosed in the '874 application. FIG. 15E shows the resultant network after the complete upgrade has been performed.

Figure 16A:
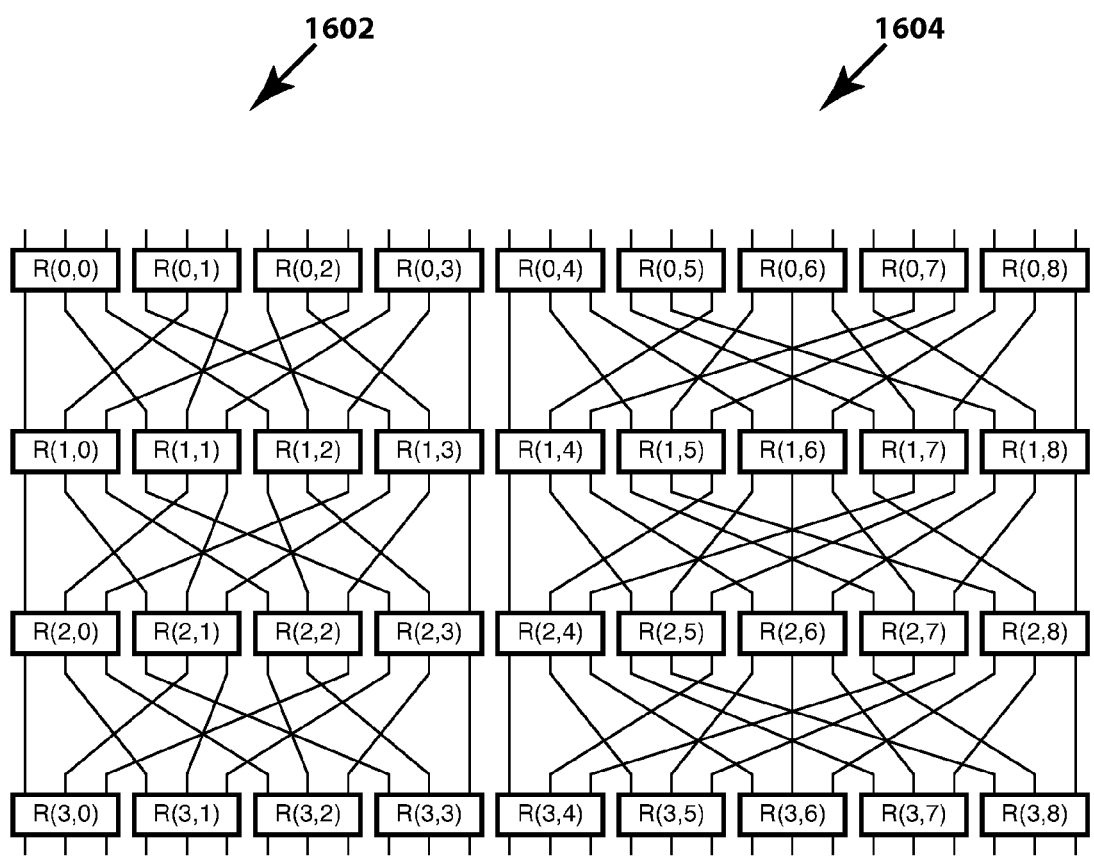
FIG. 16A is a diagram showing a 24-port 4-stage RBCCG network and a 30-port 4-stage RBCCG network.

Another example of a situation where a stage upgrade can be used is in the situation where two multistage interconnection networks are to be merged. FIG. 16A shows 24-port 4-stage RBCCG network 1602 next to a 30-port 4-stage RBCCG network 1604. If simply reconfigured to a 54-port 4-stage RBCCG network, the new network will lack path redundancies. As is typical in multistage interconnection networks, when the width of the network increases the path redundancies decrease. The addition of an extra stage counteracts this effect. As a result, rather than merging networks 1602 and 1604 into a 54-port 4-stage RBCCG network, a more practical application is to merge networks 1602 and 1604 into a 54-port 5-stage RBCCG network.

Figure 16B:
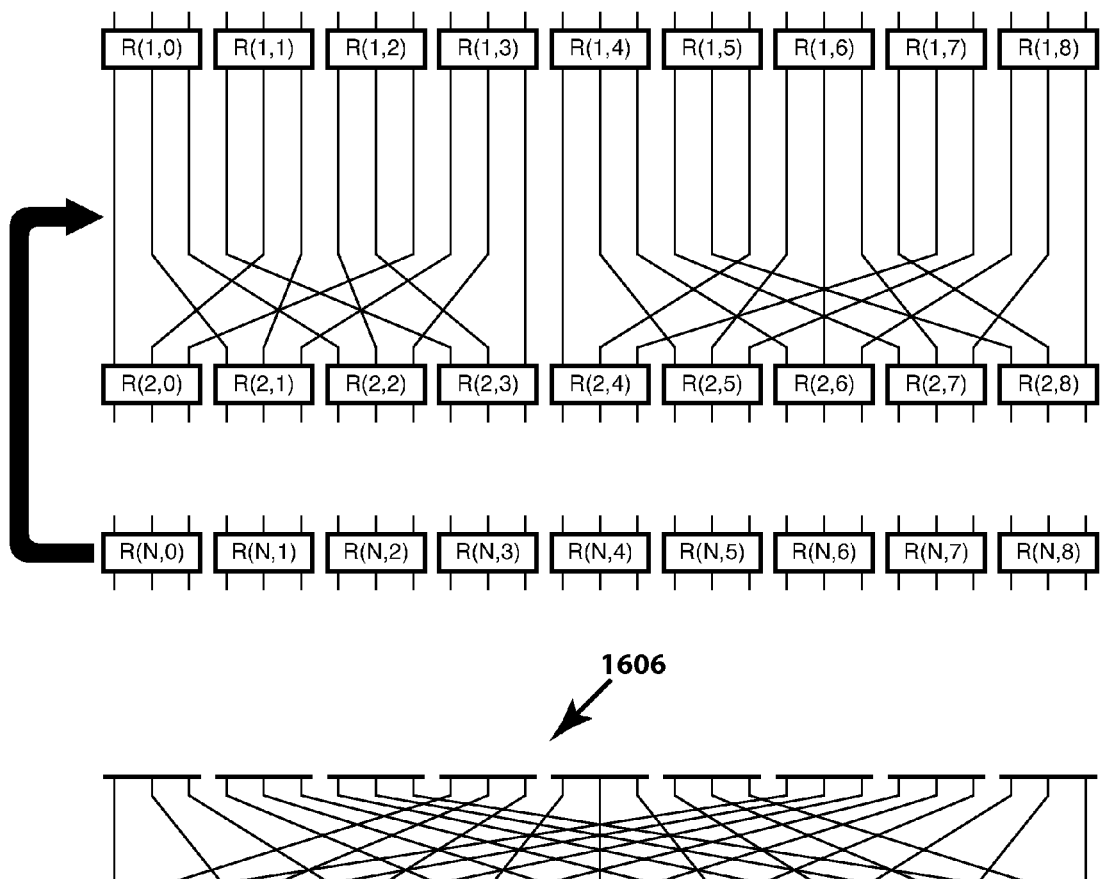
FIG. 16B is a diagram illustrating the relevant components involved in the process of merging the 24-port 4-stage and the 30-port 4-stage RBCCG network into a 54-port 5-stage RBCCG network.
Figure 16C:
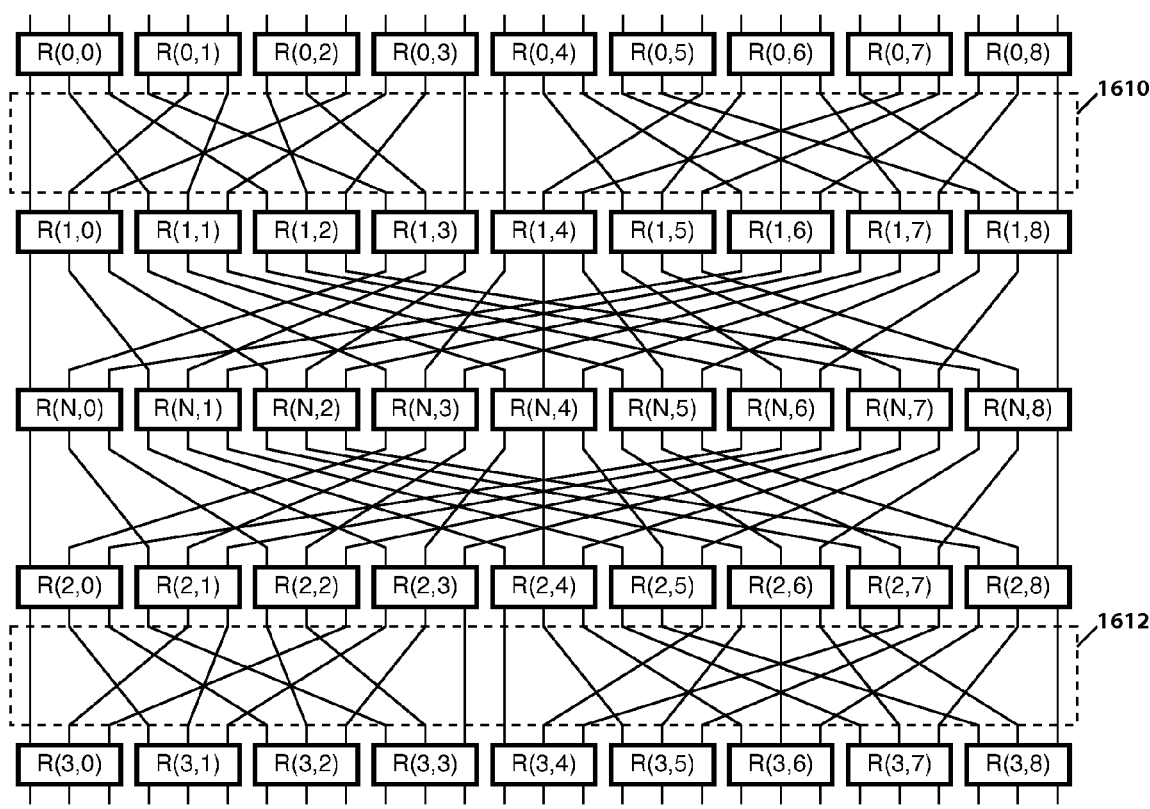
FIG. 16C is a diagram showing the resultant network after the completion of the stage upgrade process.
Figure 16D:
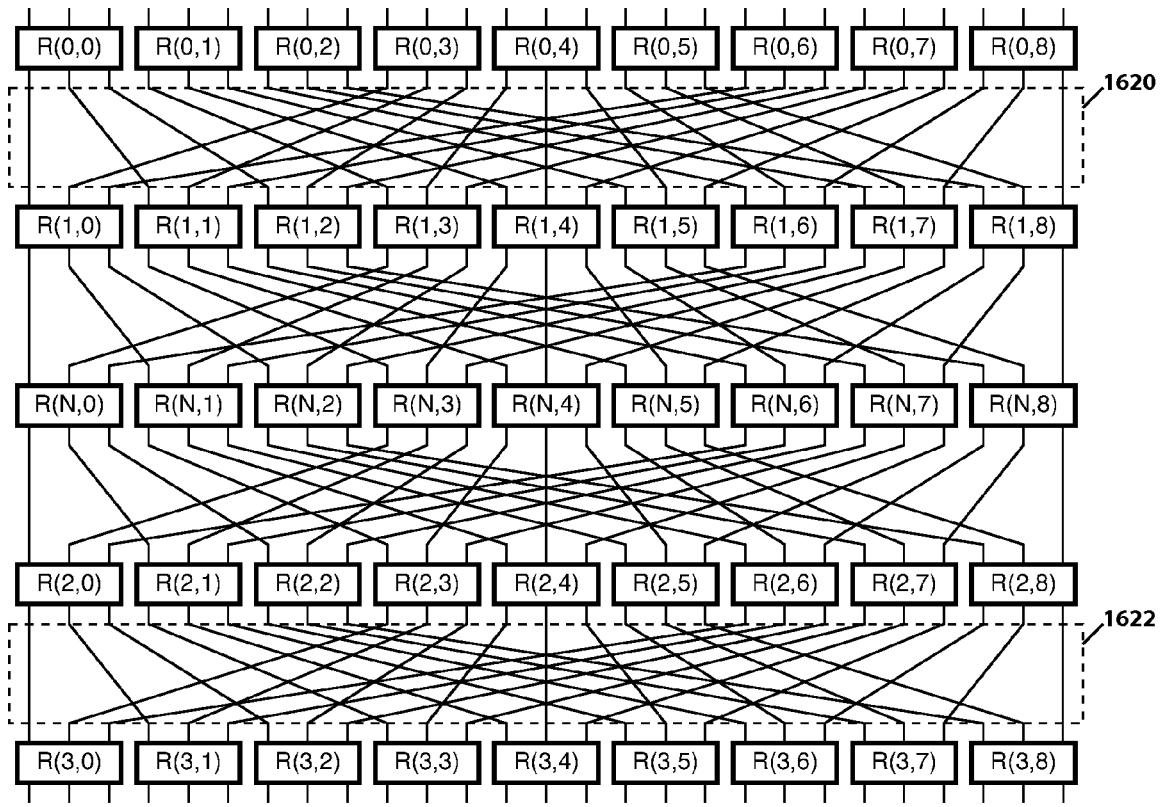
FIG. 16D is a diagram showing the resultant network after the rewiring of the two indicated interconnection networks completing the merging procedure.

FIG. 16B shows the strategy for a stage upgrade, which also merges networks 1602 and 1604. The insertion point is selected between stage R(2,*) and stage R(1,*) and stage R(N,*) is to be inserted. Template 1606, shows the interconnection network in the desired post-upgrade topology above and below stage R(N,*). After the completion of the upgrade procedure described above such as that in FIG. 7A or FIG. 7B, the network shown in FIG. 16C is the result. A complete merging is not complete until interconnection networks 1610 and 1612 are rewired into the interconnection networks as specified by the desired post-upgrade topology, which coincides with template 1606. Using the rewiring process taught by the '174 or '874 applications, interconnection networks 1610 and 1612 can be rewired into interconnection networks 1620 and 1622 as shown in FIG. 16D completing the merging process.

Figure 17A:
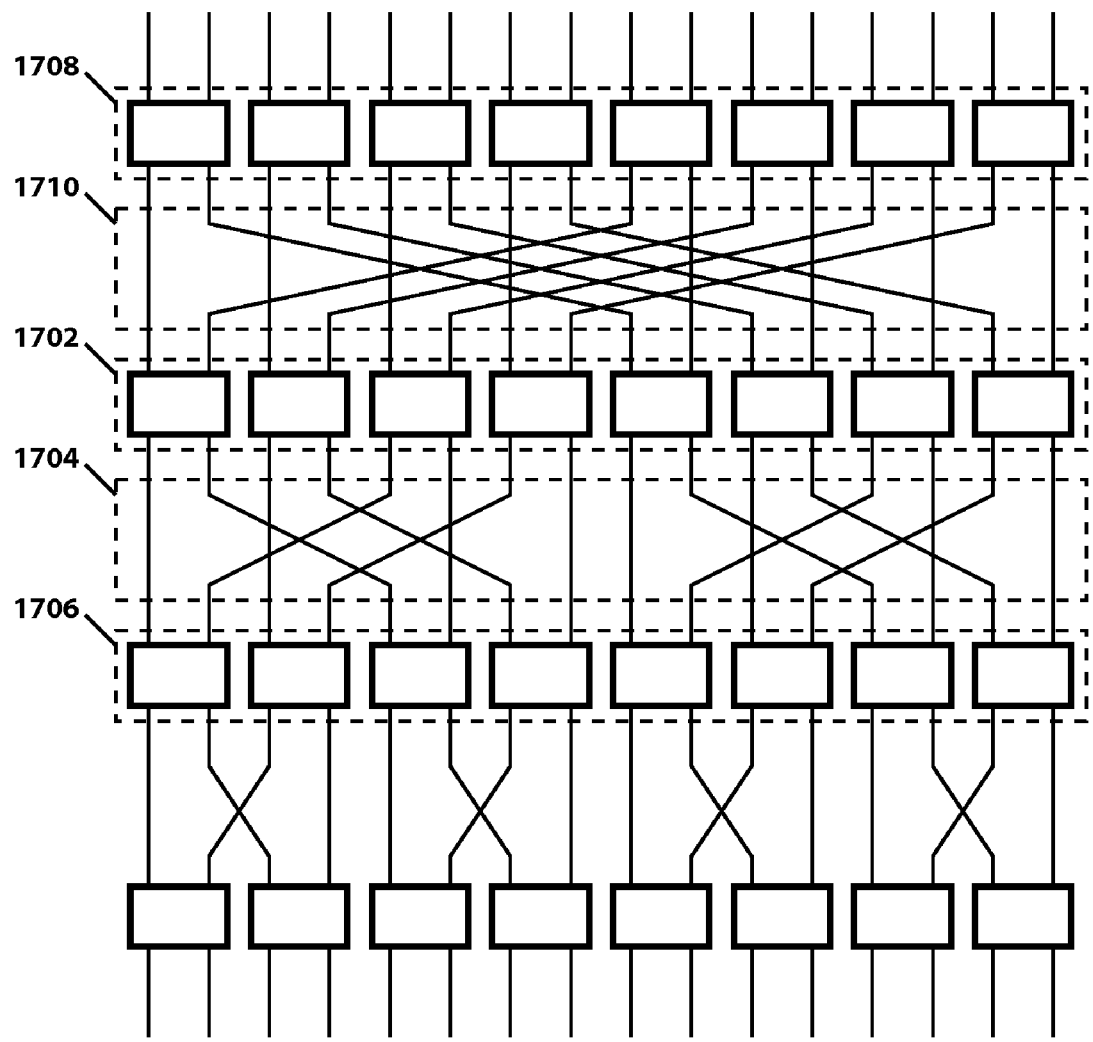
FIGS. 17A-17D are diagrams showing a stage upgrade of a 32-port Banyan network to an extended Banyan network.
Figure 17B:
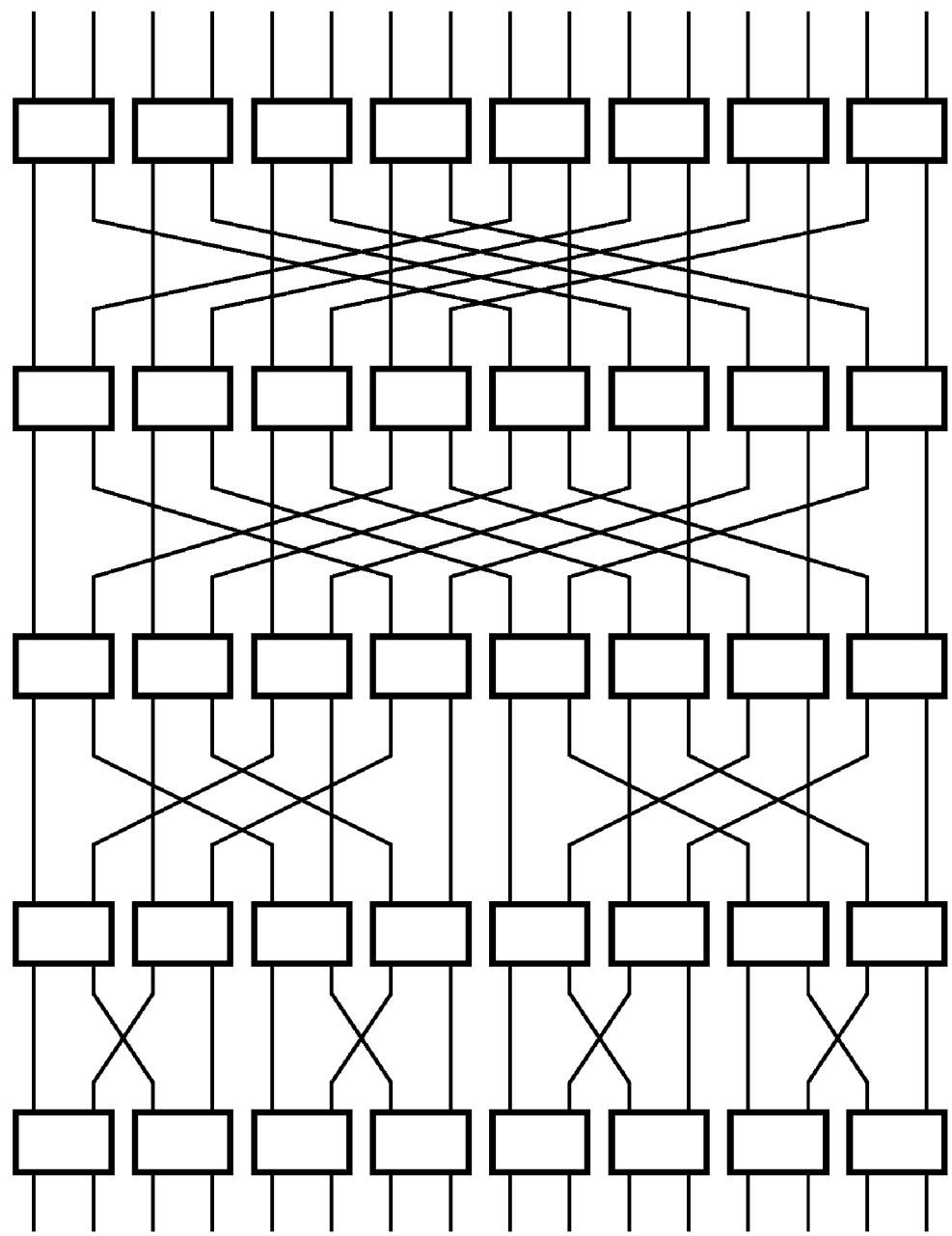

FIG. 17A shows a 32-port Banyan network. FIG. 17B shows a 32-port 5-stage generalized Banyan network. Though the Banyan network shown in FIG. 17A is not fault tolerant nor redundant, an upgrade to FIG. 17B is still possible using the methods disclosed here or in the '273 or '874 applications. Because the methods disclosed tend to minimize the disruption to network services, an upgrade of a non-redundant network using the stage upgrade method disclosed here minimizes the amount of service disruption. Because the network is not redundant, connectivity will at times be broken, a fact that is unavoidable in a non-redundant network.

Figure 17C:
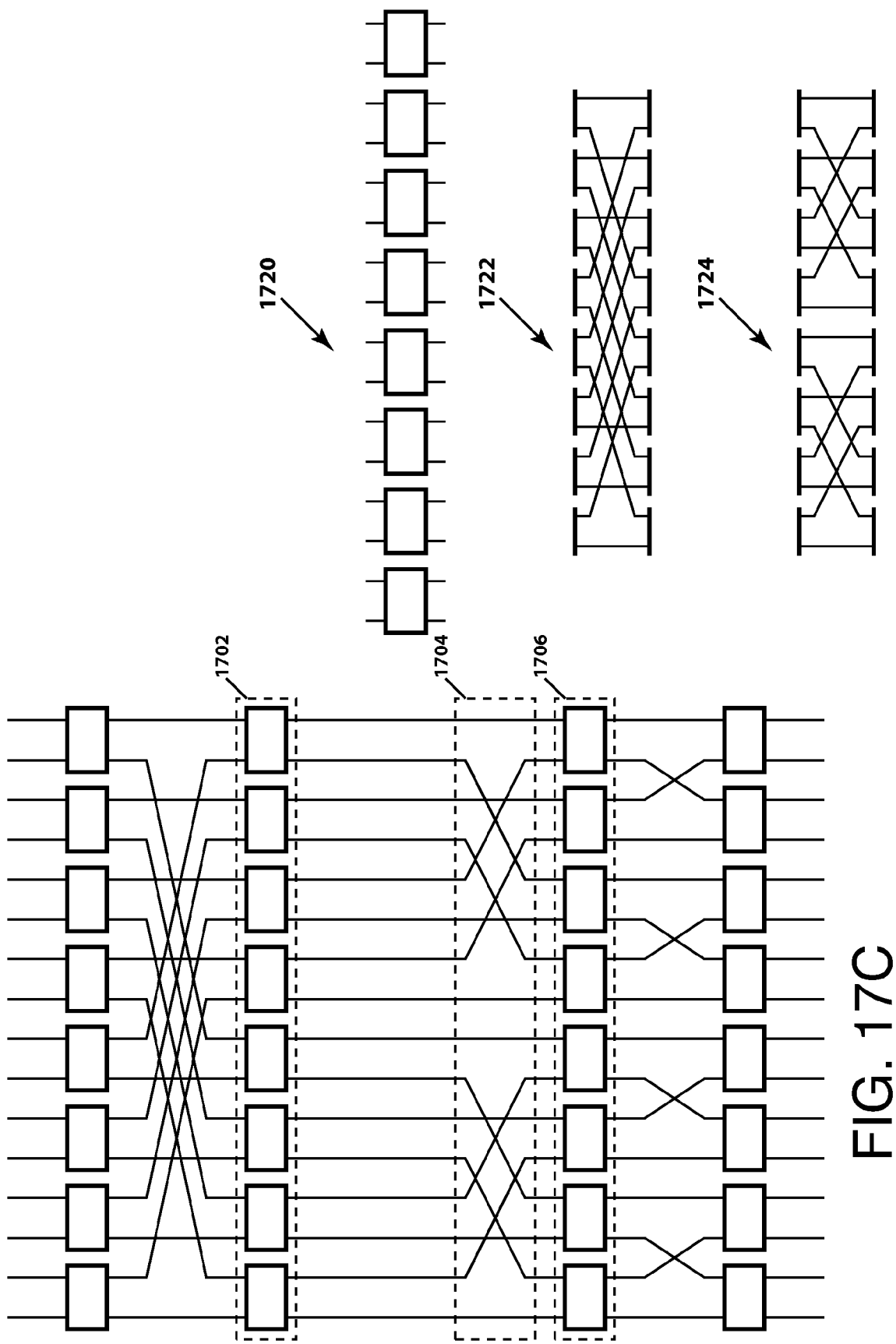

Logically, there are a couple of ways to insert the new stage to produce the network topology shown in FIG. 17B. For example, as shown in FIG. 17C, new stage 1720 can be inserted between stage 1702 and interconnection network 1704. The desired post-upgrade topology of the interconnection network above the inserted stage is shown by template 1722 and the desired post-upgrade topology of the interconnection network below the inserted stage is shown by template 1724. It should be noted in this case, the topology of interconnection network 1704 is identical to template 1724.

Figure 17D:
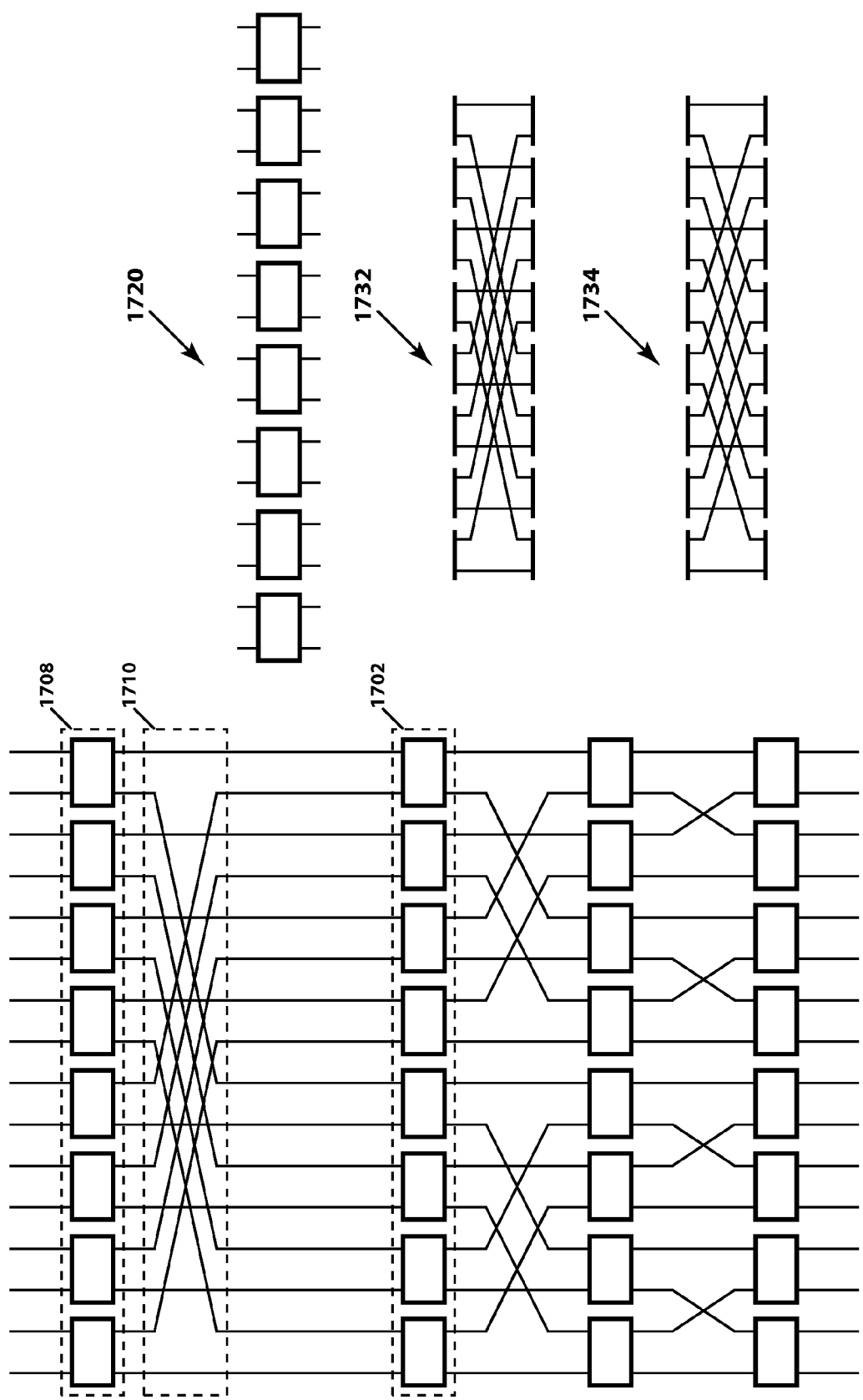

Another way to insert the new stage is to insert new stage 1720 between stage 1702 and interconnection network 1710 as shown in FIG. 17D. The desired post-upgrade topology of the interconnection network above the inserted stage is shown by template 1732 and the desired post-upgrade topology of the interconnection network below the inserted stage is shown by template 1734. It should be noted in this case the topology of interconnection 1710 is identical to template 1732.

Figure 18:
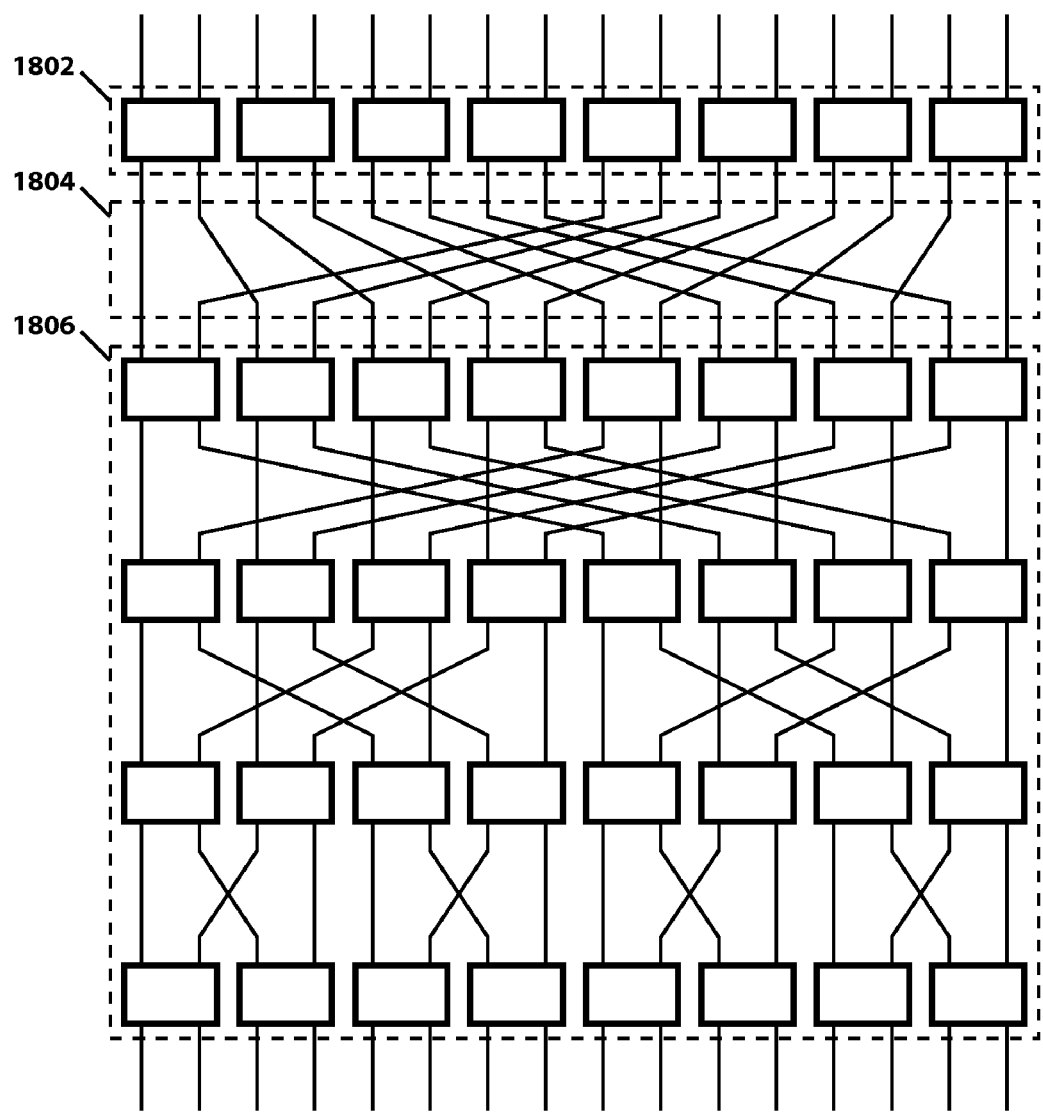
FIG. 18 is a diagram showing a 32-port hybrid Banyan network constructed from a Banyan based router and a stage of switching elements.

The insertion point of a new stage might be limited by constraints imposed by hardware. For example, FIG. 18 shows a 32-port 5-stage redundant Banyan hybrid having a cyclic group interconnection pattern in interconnection network 1804. Many router units comprise multistage interconnection networks internally which are not accessible by the network administrator. In the example of FIG. 18, a network administrator acquires a high power router 1806, which comprises many internal routers, which he has no access to. Because router 1806 consists of a classic Banyan network, it is susceptible to blocking, especially when subject to isochronous traffic. To alleviate blocking, the network administrator appends stage 1802 of individual routers to form his own redundant switching network. While this improvement has doubled the path redundancy, the network administrator needs more path redundancy to handle greater isochronous traffic, so he wants to upgrade by adding another stage. Since all the routers within router 1806 are sealed, he can not break any of the connections within the unit. As a result physically in this example, the insertion point must be between stage 1802 and router 1806. Logically, this leaves two choices for an insertion point either between stage 1802 and interconnection network 1804 or between interconnection network 1804 and router 1806.

Once the insertion point is selected, the network administrator can upgrade the network by adding another stage, which can redouble the path redundancy.

Figure 19A:
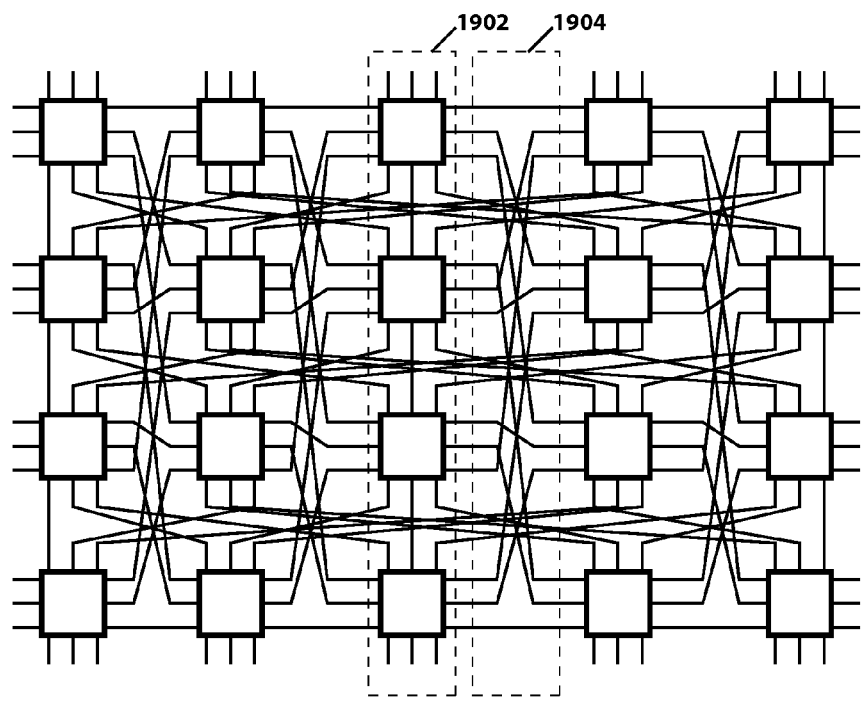
FIGS. 19A-19C are diagrams showing the upgrade procedure in upgrading a 5×4 double RBCCG overlaid network into a 6×4 double RBCCG overlaid network and the role of the stage upgrade procedure.

Another example of the application of the stage upgrade procedure, a 5×4 overlaid switching network is shown in FIG. 19A. Because the network is an overlay of two orthogonal redundant multistage interconnection networks, it can be upgraded by the insertion of a stage when viewed from top to bottom or from left to right.

Figure 19B:
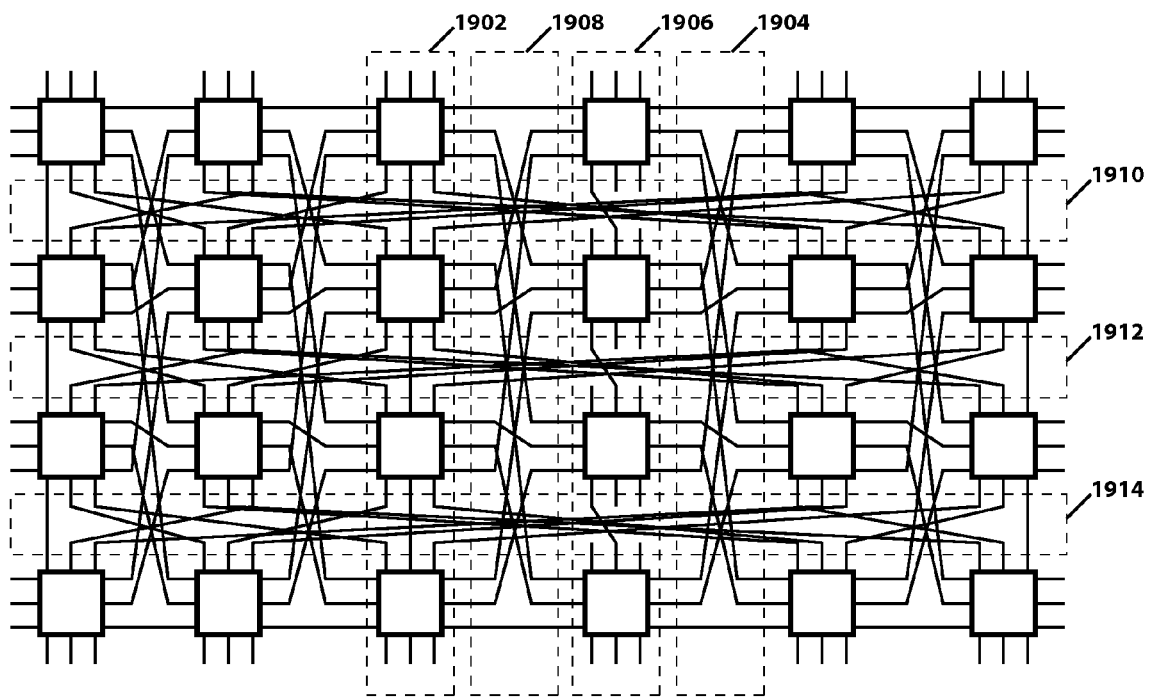
Figure 19C:
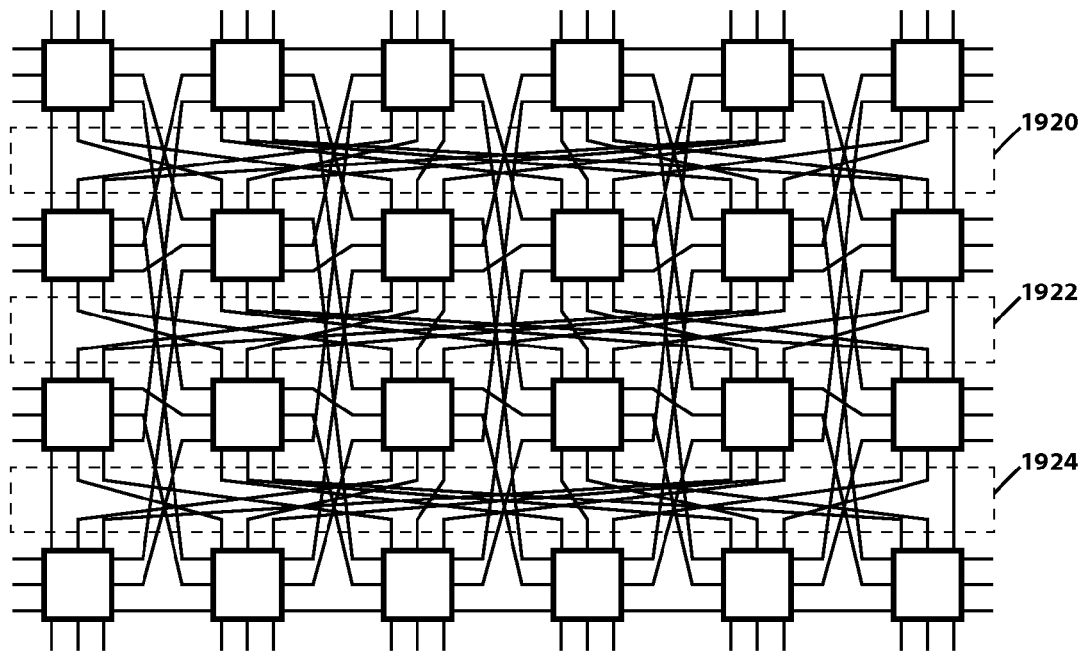

In the example shown the stage is viewed from left to right. New stage 1906 is to be inserted between stage 1902 and, interconnection network 1904. Any of the techniques described above can be applied. The result of the stage upgrade is shown in FIG. 19B where new stage 1906 has been inserted and with new interconnection network 1908 created as a result of the process. A full upgrade is not complete because interconnection networks 1910, 1912, and 1914 need to be rewired to account for the addition of the stage when viewed from top to bottom. This resembles a width upgrade as described by the '174 and '874 applications. When rewired according to the width upgrade procedures, interconnection network 1910, 1912, and 1914 in FIG. 19B are transformed into interconnection network 1920, 1922, and 1924 completed the upgrade as shown in FIG. 19C.

Figure 20A:
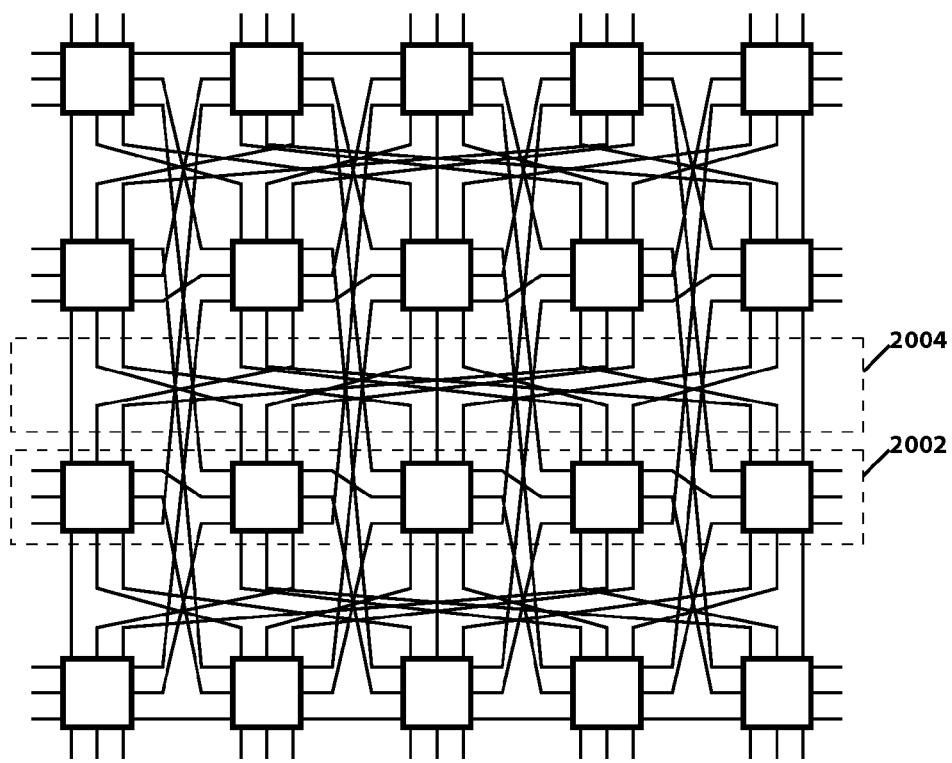
FIGS. 20A-20C are diagrams showing the upgrade procedure in upgrading a 5×4 double RBCCG overlaid network into a 5×5 double RBCCG overlaid network and the role of the stage upgrade procedure.
Figure 20B:
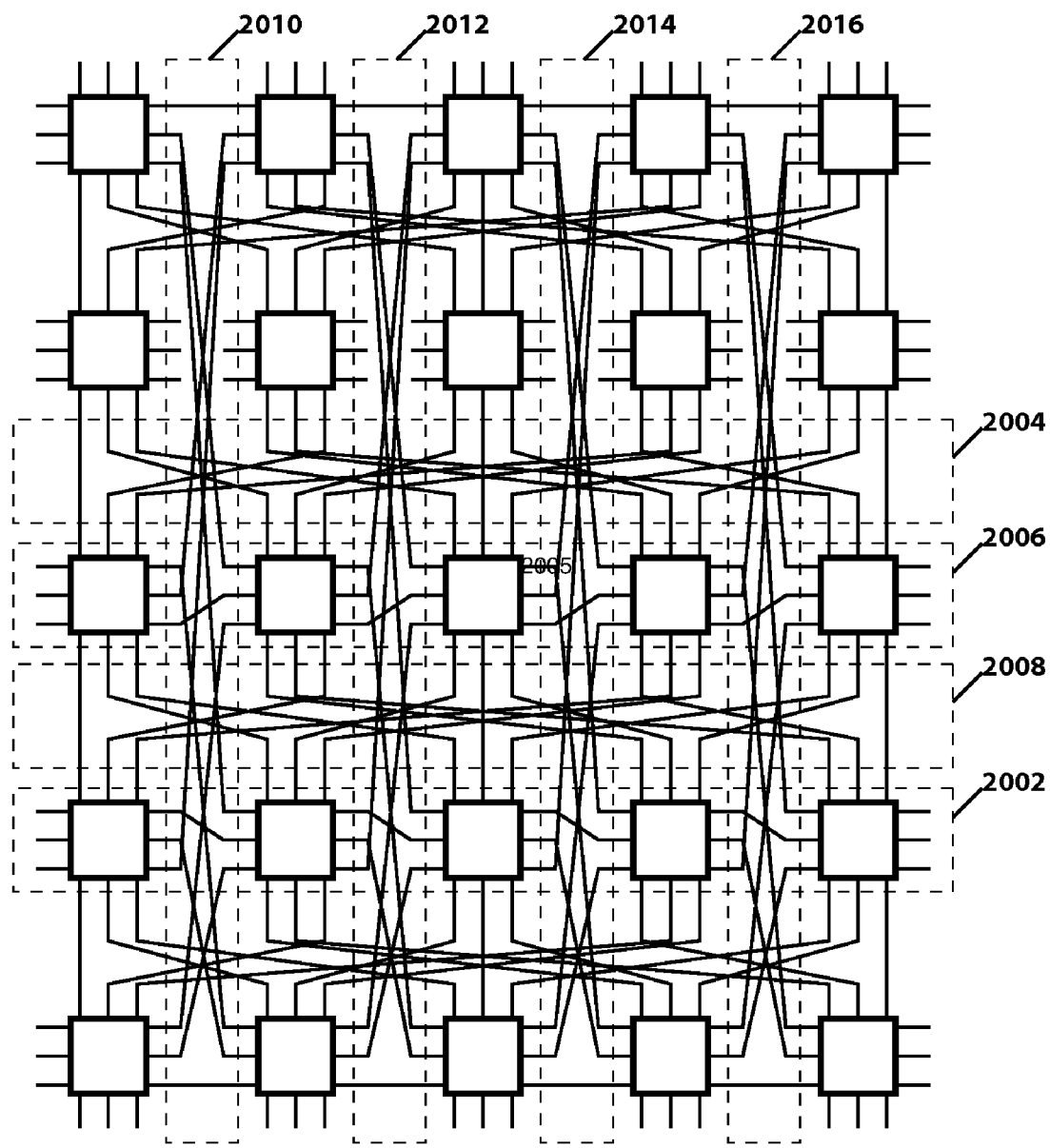
Figure 20C:
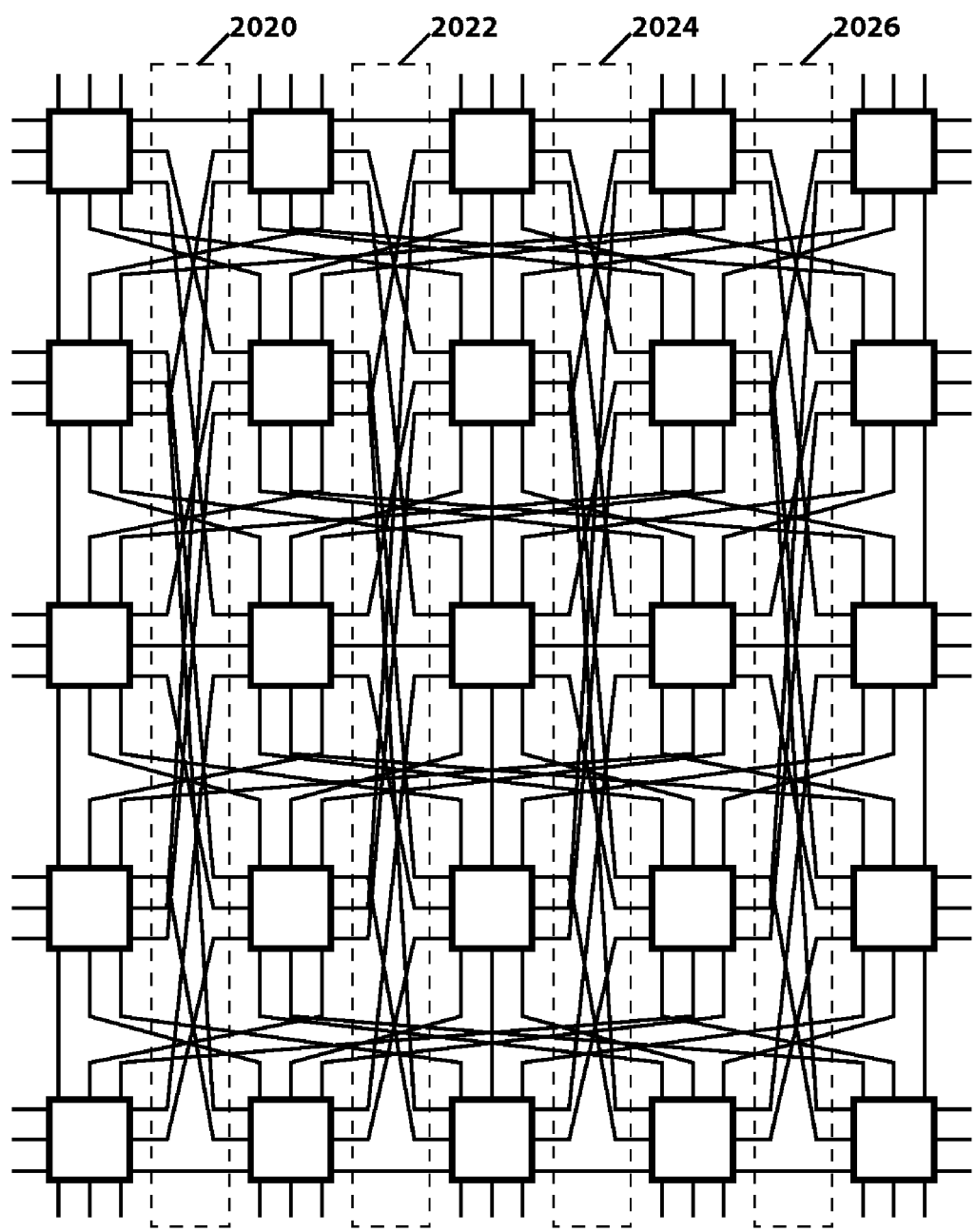

In the example shown in FIG. 20A. The same 5×4 overlaid switching network is upgraded by the insertion of a stage when viewed as a multistage interconnection network when viewed from top to bottom. New stage 2006 is to be inserted between stage 2002 and interconnection network 2004. Any of the techniques described above can be applied. The result of the stage upgrade is shown in FIG. 20B where new stage 2006 has been inserted and with new interconnection network 2008 created as a result of the process. A full upgrade is not complete because interconnection networks 2010, 2012, 2014, and 2016 need to be rewired to account for the addition of the stage when viewed from left to right. This resembles a width upgrade as described by the '174 and '874 applications. When rewired according to the width upgrade procedures, interconnection network 2010, 2012, 2014, and 2016 in FIG. 20B are transformed into interconnection network 2020, 2022, 2024 and 2026 completed the upgrade as shown in FIG. 20C.

While certain embodiments of the inventions have been described above, it will be understood that the embodiments described are by way of example only. Accordingly, the inventions should not be limited based on the described embodiments. Thus, the scope of the inventions described herein should only be limited in light of the claims that follow when taken in conjunction with the above description and accompanying drawings.

I claim:

1. An in-service method of adding stages comprising:
    designating a multistage switching network for adding stages, where the multistage switching network comprises a plurality of stages comprising a plurality of switching elements comprising a plurality of top ports and a plurality of bottom ports and the multistage switching network further comprises a plurality of connections each providing communications between two adjacent stages of switching elements and coupled to a bottom port of a switching element of the upper adjacent stage and a top port of a switching element of the lower adjacent stage;
    providing an insertable unit comprising at least one stages each comprising a plurality of switching elements comprising a plurality of top ports and a plurality of bottom ports, having an uppermost stage and lowermost stage;
    providing a desired topology having a first desired interconnection pattern above the uppermost stage of the insertable unit and a second desired interconnection pattern below the lowermost stage of the insertable unit;
    selecting a first stage of switching elements from the plurality of stages of the multistage switching network and a second stage of the multistage switching network of switching elements from the plurality of stages, where the second stage is adjacent to and below the first stage, and where the multistage switching network has a set of connections interconnecting the first stage and the second stage;
    making sacrificial connections prior to the insertion to provide better connectivity between switching elements within the same stage in the insertable unit; and
    inserting the insertable unit by concurrently:
        breaking the set of connections interconnecting the first stage and the second stage;
        making a set of connections between the first stage and the uppermost stage of the insertable unit having the first desired interconnection pattern; and
        making a set of connections between the lowermost stage of the insertable unit and the second stage having the second interconnection pattern.

2. The method of claim 1, wherein the first stage is
    r/2 if the number of stages in the multistage switching network is even; and
    (r−1)/2 or (r+1)/2 if the number of stages in the multistage switching network is odd;
    where the plurality of stages consists of r stages and the stages are referred to as stage 0 to stage r−1 respectively.

3. The method of claim 1, wherein the multistage switching network is a redundant multistage switching network.

4. The method of claim 1, wherein the multistage switching network is a redundant blocking compensated cyclic group multistage switching network.

5. The method of claim 1, wherein the multistage switching network is a double redundant blocking compensated cyclic group multistage overlaid network.

6. The method of claim 1, wherein the inserting the insertable unit comprises:
    a) proceeding to step (c) if there is a bottom port of a switching element in the first stage which are connected to a top port of a switching element in the second stage;
    b) terminating the inserting the insertable unit if each of the bottom ports of switching elements of the first stage and each of the top ports of switching elements in the second stage have a connection, or proceeding to step (e) otherwise;
    c) selecting a bottom port, bottom_port, from ports of a switching element in the first stage which is connected to a top port, top_port, of a switching element in the second stage;
    d) breaking the connection between top_port and bottom_port;
    e) returning to step (a) or proceeding to step (e);
    f) selecting a port, selected_port, from the group consisting of the bottom ports of all switching elements in the first stage which are not connected and the top ports of all switching elements in the second stage which are not connected;
    g) determining a corresponding top port, corresponding_port, of a switching element of the uppermost stage of the insertable unit in accordance with the first desired interconnection network, if selected_port is a bottom port of a switching element in the first stage;
    h) determining a corresponding bottom port, corresponding_port, of a switching element in the lowermost stage of the insertable unit in accordance with the second desired interconnection network, if selected_port is a top port of a switching element in the second stage;
    i) breaking any connection connected to corresponding_port;
    j) connecting selected_port to corresponding port;
    k) returning to step (e).

7. The method of claim 6 wherein step (c) is performed using a means for selecting a bottom port of a switching element in the first stage.

8. The method of claim 1, wherein the inserting the insertable unit comprises:
    a) selecting a bottom port, bottom_port, from ports of a switching element in the first stage which is connected to a top port, top_port, of a switching element in the second stage;
    b) breaking the connection between top_port and bottom_port;
    c) determining a top port, mid_top_port, of a switching element in the uppermost stage of the insertable unit corresponding to bottom_port in accordance with the first desired interconnection network;
    d) determining a bottom port, mid_bottom_port, of a switching element in the lowermost stage of the insertable unit corresponding to bottom_port in accordance with the second desired interconnection network;
    e) breaking any connection connected to mid_top_port
    f) breaking any connection connected to mid_bottom_port
    g) making a connection between bottom_port and mid_top_port;
    h) making a connection between top_port and mid_bottom_port;

i) repeating steps (a)-(h) until there are no bottom ports of ports of a switching element in the first stage which are connected to any top port of a switching element in the second stage.

9. The method of claim 8 wherein step (a) is performed using a means for selecting a bottom port of a switching element in the first stage.

10. The method of claim 1 wherein the at least one stage is a plurality of stages and the insertable unit further comprises a plurality of connections each providing communications between two adjacent stages of switching elements within the insertable unit and coupled to a bottom port of a switching element of the upper adjacent stage within the insertable unit and a top port of a switching element of the lower adjacent stage within the insertable unit.

11. An in-service method of merging two multistage switching networks comprising the in-service method of adding of stages of claim 1.

12. An in-service method of upgrading a multistage switching network by increasing the number of switching elements per stage and increasing the number of stages comprising the in-service method of adding of stages of claim 1.

13. An in-service method of upgrading a multistage switching network by increasing the number of ports per switching elements and increasing the number of stages comprising the in-service method of adding of stages of claim 1.

14. An in-service method of adding stages comprising:
designating a multistage switching network for adding stages, where the multistage switching network comprises a plurality of stages comprising a plurality of switching elements comprising a plurality of top ports and a plurality of bottom ports and the multistage switching network further comprises a plurality of connections each providing communications between two adjacent stages of switching elements and coupled to a bottom port of a switching element of the upper adjacent stage and a top port of a switching element of the lower adjacent stage;
providing an insertable unit comprising at least one stages each comprising a plurality of switching elements comprising a plurality of top ports and a plurality of bottom ports, having an uppermost stage and lowermost stage;
providing a desired topology having a first desired interconnection pattern above the uppermost stage of the insertable unit and a second desired interconnection pattern below the lowermost stage of the insertable unit;
making sacrificial connections prior to the insertion to provide better connectivity between switching elements within the same stage in the insertable unit;
selecting a first stage of switching elements from the plurality of stages of the multistage switching network and a second stage of the multistage switching network of switching elements from the plurality of stages, where the second stage is adjacent to and below the first stage, and where the multistage switching network has a set of connections interconnecting the first stage and the second stage; and
inserting the insertable unit by:
a) selecting a bottom port, bottom_port, from ports of a switching element in the first stage which is connected to a top port, top_port, of a switching element in the second stage;
b) breaking the connection between top_port and bottom_port;
c) determining a top port, mid_top_port, of a switching element in the uppermost stage of the insertable unit corresponding to bottom_port in accordance with the first desired interconnection network;
d) determining a bottom port, mid_bottom_port, of a switching element in the lowermost stage of the insertable unit corresponding to bottom_port in accordance with the second desired interconnection network;
e) breaking any connection connected to mid_top_port;
f) breaking any connection connected to mid_bottom_port;
g) making a connection between bottom_port and mid_top_port;
h) making a connection between top_port and mid_bottom_port;
i) repeating steps (a)-(h) until there are no bottom ports of ports of a switching element in the first stage which are connected to any top port of a switching element in the second stage.

15. The method of claim 14 wherein step (a) is performed with a means for selecting a bottom_port of a first stage.

16. The method of claim 14, wherein the first stage is
r/2 if the number of stages in the multistage switching network is even; and
(r−1)/2 or (r+1)/2 if the number of stages in the multistage switching network is odd;
where the plurality of stages consists of r stages and the stages are referred to as stage 0 to stage r−1 respectively.

17. The method of claim 14, wherein the multistage switching network is a redundant blocking compensated cyclic group multistage switching network.

18. The method of claim 1, wherein the sacrificial connections are broken during the inserting the insertable unit.

19. The method of claim 14, wherein the sacrificial connections are broken during the inserting the insertable unit.

* * * * *